United States Patent
Kasai et al.

(10) Patent No.: US 6,879,388 B2
(45) Date of Patent: Apr. 12, 2005

(54) OPTICAL APPARATUS, OPTICAL APPARATUS ADJUSTMENT METHOD, AND STORAGE MEDIUM RECORDED WITH A PROCESSING PROGRAM THAT EXECUTES SAID ADJUSTMENT METHOD

(75) Inventors: Yuji Kasai, Ibaraki (JP); Masahiro Murakawa, Ibaraki (JP); Taro Itatani, Ibaraki (JP); Tetsuya Higuchi, Ibaraki (JP)

(73) Assignees: Agency of Industrial Science & Technology, Ministry of International Trade & Industry, Tokyo (JP); Evolvable System Research Institute, Inc., Tokyo (JP)

( * ) Notice: Subject to any disclaimer, the term of this patent is extended or adjusted under 35 U.S.C. 154(b) by 0 days.

(21) Appl. No.: 10/866,113

(22) Filed: Jun. 14, 2004

(65) Prior Publication Data

US 2004/0232237 A1 Nov. 25, 2004

Related U.S. Application Data

(62) Division of application No. 09/536,620, filed on Mar. 28, 2000, now Pat. No. 6,781,682.

(30) Foreign Application Priority Data

Jan. 17, 2000 (JP) .......................................... 2000-7741

(51) Int. Cl.[7] .............................................. G01B 11/26
(52) U.S. Cl. ...................................... 356/138; 356/153
(58) Field of Search ................................. 356/138, 153

(56) References Cited

U.S. PATENT DOCUMENTS

| | | | |
|---|---|---|---|
| 5,435,309 A | * | 7/1995 | Thomas et al. ............. 600/310 |
| 5,790,283 A | | 8/1998 | Catanzaro et al. |
| 5,859,947 A | | 1/1999 | Kiryuscheva et al. |
| 6,411,373 B1 | * | 6/2002 | Garside et al. ............... 356/39 |

FOREIGN PATENT DOCUMENTS

| | | |
|---|---|---|
| JP | 63-237588 | 10/1988 |
| JP | 3-271710 | 12/1991 |
| JP | 4-184988 | 7/1992 |
| JP | 5-21884 | 1/1993 |
| JP | 08-094886 | 9/1994 |
| JP | 7-175774 | 7/1995 |
| JP | 8-16207 | 1/1996 |
| JP | 11-316108 | 11/1999 |

OTHER PUBLICATIONS

M. H. Meunier, et al., Technical Digest, Summaries of papers presented at the Conference on Lasers and Electro–Optics, p. 21, "Aberration Correction in Scanning Ultrafast Confocal Microscopy Using a Deformable Mirror", May 23–28, 1999.

(Continued)

Primary Examiner—Mark Tremblay
(74) Attorney, Agent, or Firm—Oblon, Spivak, McClelland, Maier & Neustadt, P.C.

(57) ABSTRACT

An optical apparatus has an adjustment apparatus 5 and an optical unit 1 including a plurality of optical elements. The adjustment apparatus sequentially provides control signals that, according to a probabilistic search technique, change the parameters of a stipulated plurality of optical elements among the optical elements to become parameters that cause the functions of the optical apparatus to satisfy stipulated specifications. A method of adjusting the optical apparatus includes sequentially providing control signals that, according to a probabilistic search technique, change the parameters of the stipulated plurality of optical elements among the optical elements, and searching for optical values at which the functions of the optical apparatus the stipulated specification.

18 Claims, 35 Drawing Sheets

OTHER PUBLICATIONS

O. Albert, et al., Optics Letters, vol. 25, no. 1, pp. 52–54, "Smart Microscope: An Adaptive Optics Learning System for Aberration Correction in Multiphoton Confocal Microscopy", Jan. 1, 2000.

N. M. Beach, et al., Technical Digest, Summaries of papers presented at the International Quantum Electronics Conference, vol. 7, pp. 1–2, "An Experimental Feedback Loop for Implementing Coherent Control Based on the Genetic Algorithm", 1998.

D. Meshulach, et al., Journal of the Optical Society of America B, vol. 15, no. 5, pp. 1615–1619, "Adaptive Real–Time Femtosecond Pulse Shaping", May 1998.

Y. Takaki, et al., Applied Optics, vol. 35, no. 35, pp. 6896–6908, "Reconfigurable Lens with an Electro–Optical Learning System", Dec. 10, 1996.

S. Inoue, et al., Proceedings of the SPIE—The International Society for Optical Engineering, vol. 2440, pp. 240–251, "Automatic Optical Proximity Correction with Optimiation of Stepper Condition", Feb. 22–24, 1995.

* cited by examiner

FIG. 2
ADJUSTMENT LOCATION
ADJUSTMENT RESULTS
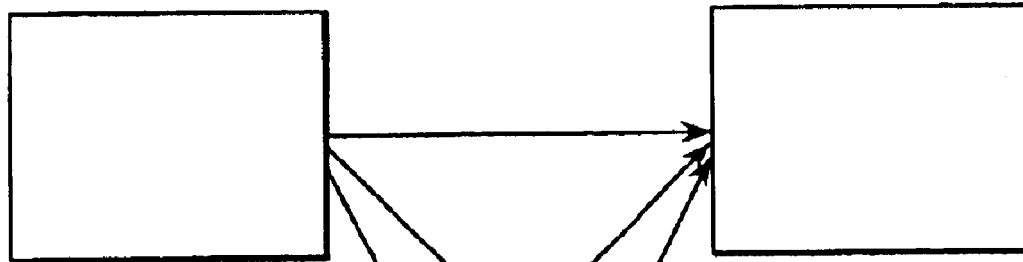
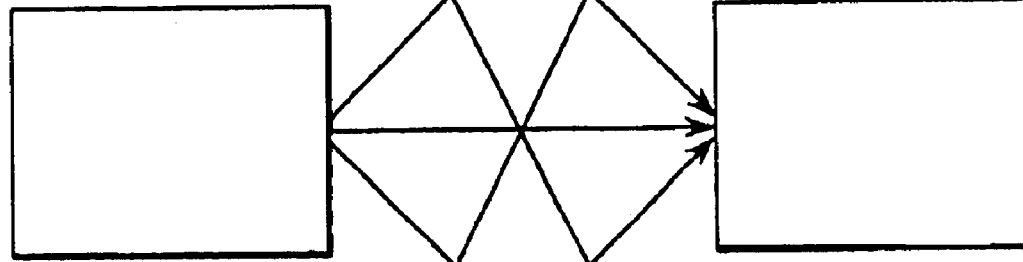
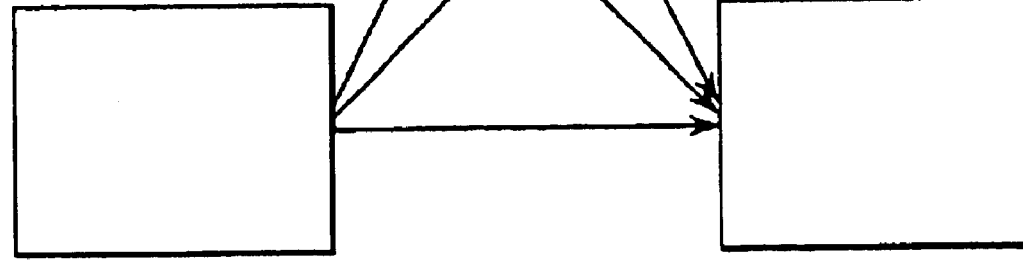

OPTICAL APPARATUS, OPTICAL APPARATUS ADJUSTMENT METHOD, AND STORAGE MEDIUM RECORDED WITH A PROCESSING PROGRAM THAT EXECUTES SAID ADJUSTMENT METHOD

CROSS REFERENCE TO RELATED APPLICATIONS

This application is divisional of U.S. patent application Ser. No. 09/536,620, filed Mar. 28, 2000, now U.S. Pat. No. 6,781,682 and claims benefit of priority under 35 U.S.C. §119 to Japanese Patent Application No. 2000-7741, filed Jan. 17, 2000, the entire contents of each of which are incorporated by reference herein.

BACKGROUND OF THE INVENTION

1. Field of the Invention

This invention relates to an optical apparatus consisting of an optical unit comprising a plurality of optical elements wherein the adjustment of a certain optical element affects the results of adjustment of the other optical elements along with an adjustment apparatus that adjusts the optical elements, the adjustment method therefor, and a storage medium recorded with a processing program that executes said adjustment method, and also relates to lasers, wavefront controllers or telescopes as the optical apparatus that use said adjusted optical units.

2. Description of the Prior Art

Conventional methods of raising the performance of functions implemented by optical apparatus to a stipulated target value include (1) having the optical elements be adjusted by a skilled technician and (2) adopting high-precision optical elements.

However, with the method (1) of having the optical elements be adjusted by a skilled technician, it is necessary to perform the adjustments at the place where the optical apparatus is installed, and when one optical element is adjusted, it becomes necessary to adjust the other optical elements associated with that element, and thus a large amount of time is needed for the adjustment. In addition, adequate adjustment results may not be obtained even with a skilled technician, and it is not possible to make an objective judgment as to whether or not the results of adjustment of the optical apparatus are suitable. Moreover, there is also the problem of high adjustment costs due to the need for a skilled technician.

In order to minimize the burden of adjustment of optical elements by skilled technicians, the method (2) of adopting high-precision optical elements has been used. However, high-precision optical elements have problems in that they are typically expensive and a stable supply is not available, thus complicating the manufacture of optical apparatus.

For this reason, the conventional methods had drawbacks in that the manufacturing costs for optical apparatus were high, adjustment by skilled technicians was necessary and adjustment times were long.

In the aforementioned adjustment methods, were automatic adjustment to be possible, then this would be effective since skilled technicians would not be necessary. However, in the adjustment of adjustment location (1), as shown in FIG. 2, typically the effects of the adjustment location on the functions of the optical apparatus are not independent of other adjustment locations, so automatic adjustment is extremely difficult, and thus a skilled technician has been required for this adjustment.

To wit, in the case in which an optical apparatus has a plurality of adjustment locations, it is often the case that there are mutual dependencies between these adjustment locations. FIG. 2 is an explanatory diagram showing an example of a case in which there are dependencies (correlations) between the adjustment location and adjustment results across adjustment locations. For example, the first adjustment location may be adjusted to optimize the functions of the optical apparatus and then the second adjustment location is adjusted further to optimize the functions of the optical apparatus. At this time, since the adjustment of the second adjustment location was performed, the results of adjusting the first adjustment location are no longer optimized, and if readjustment is performed, results of adjustment different from the first time would be optimal.

We shall now explain these dependencies using the laser cavity as an example. The laser cavity typically consists of three or more mirrors and prisms, and the light path is a loop. Here, changing the position or orientation of one mirror changes the entire light path. Thus this also changes the optimal position and orientation of all of the mirrors. This means that changing either the position or direction of a mirror or prism, which are the adjustment locations, will change the optimal results of adjustment of all of the other adjustment locations.

In the case in which the adjustment of a plurality of adjustment locations are not independent as described above, the magnitude of the range of adjustment has the same number of dimensions as the number of interconnected adjustment locations, so the adjustment search space expands exponentially with the number of adjustment locations, leading to a combinatorial explosion and thus adjustment requires an unrealistic amount of time, or adjustment may become impossible. As one example, if we assume that there are 10 adjustment locations that are adjusted with an 8-bit setting signal, considering the case in which all are associated, the adjustment search space includes an enormous number of combinations calculated to be $2^{80} \approx 10^{24}$ (10 to the power of 24), so adjustment by conventional methods requires an unrealistic amount of time and is thus impossible.

Conventional industrial laser apparatus consists of mirrors, laser crystals (optical crystals), dispersion elements (prisms) and other optical components and support components. In a laser cavity consisting of these components, the layout of the optical components must be set with micrometer accuracy. Mirrors must be adjusted in five different directions: longitudinal, lateral, vertical, lateral reflection angle and vertical reflection angle. Two or more mirrors and their support components are installed within a laser oscillator. When functional improvements are made to a laser apparatus such as increasing its power or shortening its pulse, the number of mirrors, dispersion elements or other optical components can reach six or more. The number of adjustment locations on their support components can become large at 30 or more locations.

On the other hand, since the intensity of light is strong in the laser cavity, nonlinear phenomena are induced due to the Kerr-lens effect, so the laser output light is subject to fluctuations in its power, wavelength, lateral modes and the like. Therefore, the optimal layout conditions for the optical components also change depending on the nonlinear phenomena. In the case of a pulsed laser, the optimal layout of the optical components differs between the shortest-pulse conditions and the maximum-output conditions.

The search for optimal layout conditions is typically performed by a skilled engineer. In the case in which the number of optical components is roughly six, this generally takes a skilled person roughly one week but an unskilled person would require adjustment time of one month or more. Moreover, in the aforementioned adjustment, since the positions of the support components for optical component slip with time, the light output of a laser apparatus fluctuates with time so the adjustment becomes even more difficult.

The optimization of a laser apparatus is conventionally performed through feedback to the laser apparatus of information on the light output from the laser apparatus. This information on the light output consists of the power (intensity of the light output), position and direction of the light path, wavelength, phase, wave front, pulse width and the like. When the laser beam is spatially divided and this information is evaluated for each, a large number of evaluation values are obtained. These evaluation values are mutually dependent and these correlations depend on the operating conditions of the laser apparatus. It is quite typical for two or more evaluation values to be present in this manner.

However, in the prior art, regarding power among the information on the light output, only the excitation light intensity is subjected to control, and regarding the position and direction of the light path among the information on the light output, only the position/direction of the mirrors whose position/direction is controllable are subjected to control.

These methods are characterized by finding a single optical element that strongly affects the evaluation values and then performing feedback control on that single element. In these methods, only a single element is optimized so the entire laser apparatus is not optimized.

Furthermore, there are many cases wherein these evaluation values have a strongly nonlinear correlation, and in these cases, there are problems wherein the optimization of the adjustment locations over the entire optical apparatus becomes difficult and the efficiency of optimization becomes extremely poor.

In a wave-front controller, precisely calculating the value of the phase at each point in the wave front would take an impractical length of time, so it is difficult to achieve good characteristics in the functions of a wave-front controller.

In a telescope, when the object to be observed is imaged on the image plane using a large concave mirror, the position/shape of the reflecting surfaces of the concave mirror diverge from the ideal position/shape, so the resolution of the image drops.

In addition, optical apparatus has problems in that vibration and shock during movement or transportation changes the layout of the constituent elements, causing deterioration in the performance of the apparatus.

In this manner, optical apparatus requires an overall adjustment of the position, direction, optical characteristics and such (hereinafter called parameters) of a plurality of optical elements.

Therefore, in consideration of the aforementioned points, the present invention has as its object to provide an optical apparatus and an adjustment method thereof whereby, even in the case in which the parameters of the optical elements to be adjusted have mutually dependent nonlinear correlations among a plurality of optical elements, better functions and higher performance than in the prior art can be obtained using optical elements of less-than-conventional precision, automatically and without the skilled technicians conventionally required. A further object of the present invention is to provide a method of ameliorating the decrease in functions and performance of optical apparatus arising from the movement or transportation of an optical apparatus or from changes over time or the like.

SUMMARY OF THE INVENTION

In order to achieve the aforementioned objects, the optical apparatus of the present invention is an optical apparatus having an adjustment apparatus and an optical unit comprising a plurality of optical elements, the adjustment apparatus sequentially providing control signals that, according to a probabilistic search technique, change the parameters of a stipulated plurality of optical elements among the optical elements to become parameters that cause functions of the optical apparatus to satisfy stipulated specifications.

Moreover, the optical apparatus adjustment method of the present invention is an optical apparatus adjustment method that controls a plurality of optical elements constituting an optical unit, comprising the steps of sequentially providing control signals that, according to a probabilistic search technique, change parameters of a specific plurality of optical elements among the optical elements, and searching for optimal values at which functions of the optical apparatus satisfy stipulated specifications.

By means of this optical apparatus and adjustment method therefor, a specific plurality of optical elements among a plurality of optical elements of an optical apparatus that affect a stipulated function consists of optical elements that change their element parameters depending on values indicated by the control signal, and the values of the plurality of control signals given to this specific plurality of optical elements are changed by the adjustment apparatus according to a probabilistic search technique so that the functions of the optical apparatus satisfy stipulated specifications, so in the event that adjustment of the parameters of the optical elements that effect the stipulated function becomes necessary, better functions and higher performance than in the prior art can be obtained automatically and without the skilled technicians conventionally required. Moreover, it is also possible to ameliorate the decrease in functions and performance of optical apparatus arising from the movement or transportation of an optical apparatus or from changes over time or the like.

Here, the performance of an optical apparatus can be represented by a function F which takes arguments of the individual parameters of the plurality of optical elements provided in that optical apparatus that can be adjusted. To have the functions of an optical apparatus satisfy stipulated specifications is equivalent to finding the optimum solution to the function F. The present inventors took note of this point and discovered that genetic algorithms and other probabilistic search techniques are applicable to the adjustment of an optical apparatus.

Genetic algorithms are one type of probabilistic search technique and are algorithms that (1) act effectively in wide-area searches, (2) do not require differential values or other derived information outside the function F to be evaluated, and also (3) are readily implemented. Therefore, in the present invention, a genetic algorithm may also be used to change the values of the plurality of control signals with the aforementioned adjustment apparatus.

In addition, in the event that the aforementioned function F to be evaluated satisfies special conditions, by replacing the genetic algorithm with the simulated annealing method, which is also a probabilistic search technique, it is possible to improve the search efficiency. Therefore, in the present invention, the simulated annealing method may also be used to change the values of the plurality of control signals with the aforementioned adjustment apparatus. Thereby, while the performance obtained by adjustment is lower compared to that of a genetic algorithm, the adjustment time can be shortened.

Moreover, at the time that the adjustment apparatus is searching for optimal values, it is possible to use an evaluation function that performs weighted sum of a plurality of evaluation results of said optical apparatus.

In addition, in the present invention, it is possible to measure the parameter values while the parameters of the optical elements are being adjusted based on control signals, store them in memory paired with the observed value of the light output, and take the pair of element parameter values that give the largest evaluation value among the pairs as a local maximum. Thereby, it is possible to improve the search efficiency and greatly reduce the adjustment time.

Furthermore, the optical apparatus of this invention described above may be a laser.

Moreover, the optical apparatus of this invention described above may use deformable mirrors, or may be a wave-front controller. Furthermore, it may be a telescope.

Furthermore, the aforementioned adjustment apparatus in the optical apparatus and optical apparatus adjustment method described above may consist of an electronic computer, and thereby, the process of searching for a plurality of device parameters according to probabilistic search techniques so that the functions of an optical apparatus satisfy the stipulated specifications can be performed easily and reliably in a short amount of time.

Moreover, the storage medium of the present invention is characterized in that it stores a processing program executed by the electronic computer that searches for a plurality of device parameters according to probabilistic search techniques so that the functions of an optical apparatus satisfy the stipulated specifications.

By means of this storage medium, it is possible to store and save a processing program executed by an electronic computer for the optical apparatus of the present invention and the optical apparatus adjustment method of the present invention, so the adjustment of the optical apparatus can be performed at any location.

The other objects and other characteristics of this invention will be further clarified in the following detailed description based on the appended drawings.

BRIEF EXPLANATION OF THE DRAWING

FIG. 2 is a diagram used to explain the problems due to dependencies regarding adjustment locations.

DESCRIPTION OF THE PREFERRED EMBODIMENT

Figure 1:
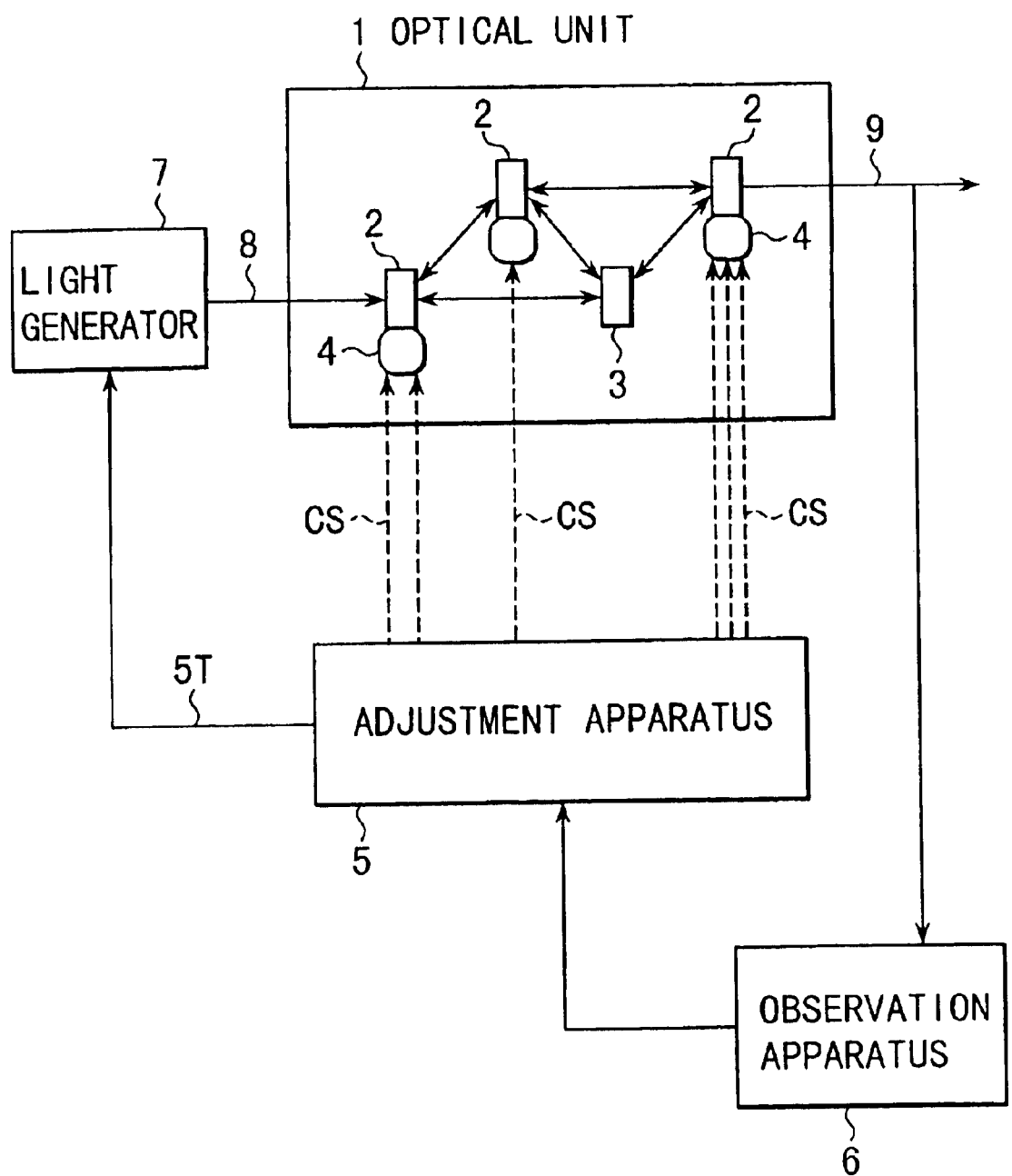
FIG. 1 is a schematic diagram describing the optical apparatus of the present invention and the optical apparatus adjustment method of the present invention, and also a structural diagram illustrating embodiment 1.

Here follows a detailed description of the preferred embodiment of this invention based on the drawing.

The present invention is applicable to a diverse variety of optical apparatus. To wit, it is possible to provide a plurality of adjustment locations on an optical apparatus subject to adjustment and then adjust these adjustment locations using the method of the present invention. The following embodiment 1 (preferred embodiment) presents a case wherein the present invention is applied to a general optical apparatus.

An optical apparatus normally has a plurality of mirrors, lenses, prisms or other optical elements as constituent elements. In addition, in an optical apparatus, manufacturing errors or vibration or shock applied to the optical apparatus will typically cause the position or orientation of these optical elements to diverge from the design specifications, so adjustment becomes essential in order for the optical apparatus to satisfy the specifications demanded of it.

FIG. 1 is one structural example of an optical apparatus to which this embodiment is applied. In FIG. 1, reference numeral 1 denotes an optical unit that effects a stipulated function, optical elements 2 and 3 are constituent elements of the aforementioned optical unit 1, where optical element 2 is an adjustable element wherein the parameters of the element can be varied depending on the value of a control signal (adjustment signal) CS, while optical element 3 is an element that is not adjusted. Reference numeral 4 denotes a drive mechanism connected to the adjustable optical element 2 to vary the parameters of the adjustable optical element 2 depending on the value of the control signal CS. Reference numeral 5 denotes an adjustment apparatus for adjusting the optical unit 1 and numeral 6 an observation apparatus for observing the status of the light output of the optical unit 1 (optical apparatus). In this embodiment, the adjustment apparatus 5 and observation apparatus 6 are external to the optical unit 1.

In FIG. 1, reference numerals 8 and 9 indicate light input to the optical apparatus (input light) and light output from the optical apparatus (output light), respectively.

In FIG. 1, reference numeral 7 denotes an adjustment light generator, which generates adjustment light for adjusting the optical unit 1. When adjustment is not being performed, this adjustment light generator 7 is turned off so that the normal input light is input as the input light 8. This adjustment light is generated according to the signal 5T from the adjustment apparatus 5, and is input to the optical unit 1 as the input light 8 to the optical apparatus 1. The adjustment light is either continuous light or pulsed light with a constant wavelength distribution and spatial distribution in the light intensity, so it serves as the reference for adjusting the optical apparatus 1. This adjustment light can also be switched among a plurality of types of light, and in this case, it is switched by the signal 5T.

The adjustment light generator 7 can be an apparatus that generates adjustment light according to signal 5T from the adjustment apparatus 5 or it can be an apparatus that independently generates adjustment light without the signal 5T. Moreover, the adjustment light generator 7 may be omitted and in lieu of the adjustment light, the input light normally input to the optical apparatus may be assumed to be the adjustment light. Furthermore, the light source for the input light may be built into the optical apparatus.

In FIG. 1, the layout of optical element 2 and optical element 3 and the light path for these optical elements illustrates an example of the concept, as the actual layout will be determined by the design of the optical apparatus. In the same manner, the number of control signals CS input to the drive mechanism 4 will be determined by the number of parameters required for the adjustment of the optical element.

The adjustable optical elements 2 and the non-adjustable optical elements 3 may be mirrors, lenses, optical filters, prisms, diffraction gratings, polarization elements, electro-optical elements, acousto-optical elements, optical crystals (laser crystals), slits or optical elements consisting of a combination of the aforementioned optical elements, or the like, functioning as the constituent elements of the optical unit 1. To wit, in the optical apparatus the adjustable optical elements 2 and the non-adjustable optical elements 3 are laid out in the light path of the light handled by the optical unit 1, and serve to reflect this light in other directions, focus light, split or combine light paths, separate light by wavelength, attenuate light, divide light among light paths by wavelength, separate light by polarization, modulate light, or perform wavelength conversion, or the like.

In the aforementioned, the adjustable optical elements 2 are the optical elements that are adjusted by the method of the present invention, while the non-adjustable optical elements 3 are the optical elements not subjected to adjustment by the method of the present invention, but they may still be adjusted by other methods, for example, rough adjustment immediately after assembly of the optical apparatus or other conventional methods.

The element parameters of the optical elements 2 are defined to be the position, orientation and optical characteristics of the optical elements 2 within the optical unit 1. As for position, this may be the displacements x, y and z in the x-axis, y-axis and z-axis of a Cartesian coordinate system, for example. As for orientation, this may be the angle of rotation $\theta_x$ around the x-axis, the angle of rotation $\theta_y$ around the y-axis and the angle of rotation $\theta_z$ around the z-axis, for example. The optical characteristics are defined to be the reflectance, transmittance, coefficient of absorption, coefficient of amplification, wavelength conversion efficiency, index of refraction, polarization characteristics (retardation), transmission characteristics (phase, light intensity, lateral modes, etc.), distribution ratio, modulation rate, along with the wavelength characteristics, focusing conditions (shape of the focus, aberration), coherence and light-path conditions of the aforementioned.

As described above, the optical unit 1 to be adjusted consists of optical elements 2 that are adjusted and optical elements 3 that are not adjusted, but in this embodiment, the parameters of the optical elements 2 that are adjusted must be given fine adjustments after manufacture or after the optical apparatus is subjected to vibration or shock during movement, in order for the characteristics of the optical apparatus to satisfy the specifications required of it. However, as shown in FIG. 2, this optical apparatus is one wherein the adjustment of one parameter of a certain optical element 2 affects the results of adjustment of nearly all of the other parameters, so in many cases a combinatorial explosion occurs in the adjustment search space. For this reason, the following adjustment method using a genetic algorithm based on the present invention is extremely effective.

Figure 3:
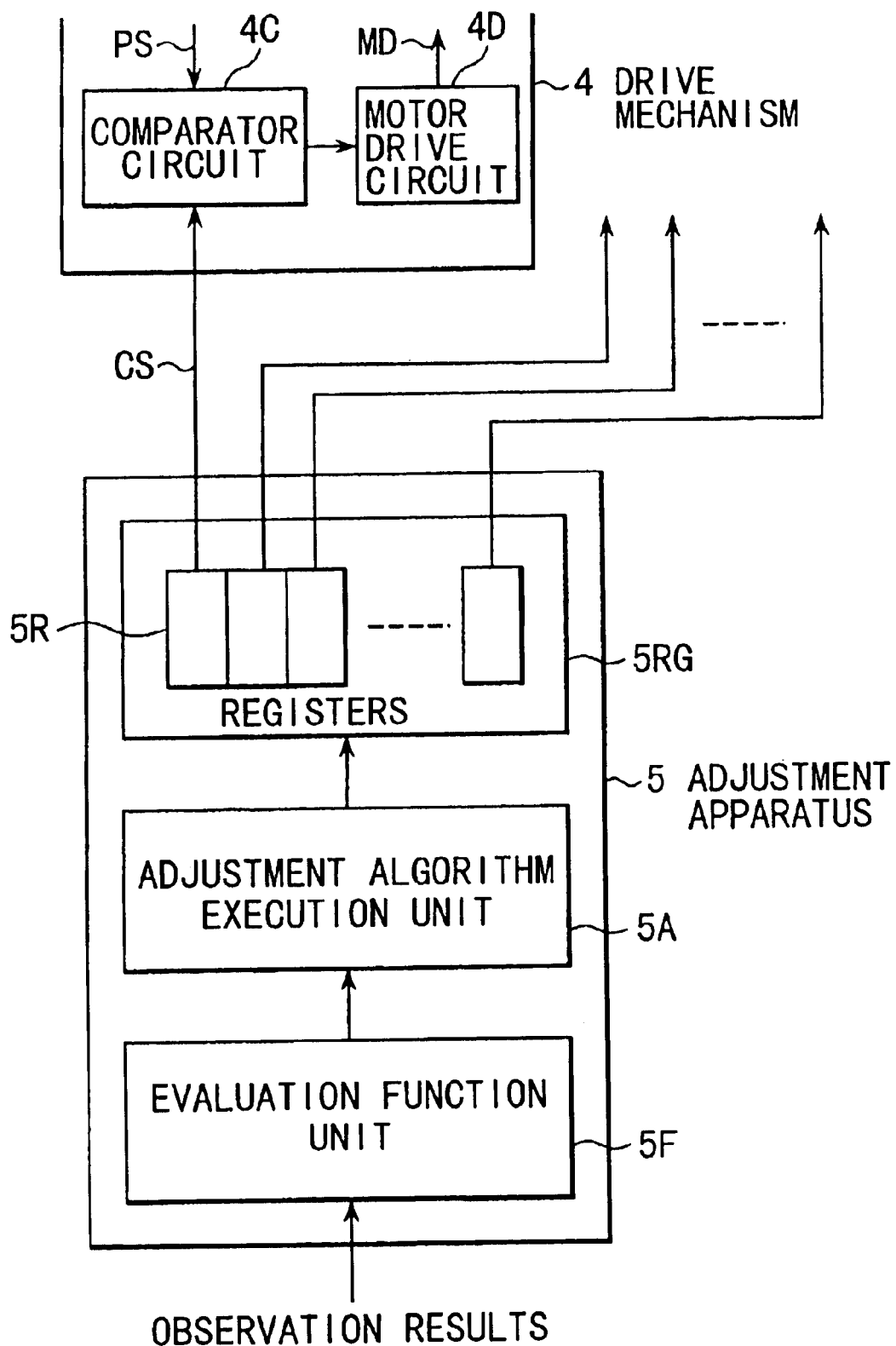
FIG. 3 is a structural diagram showing the adjustment apparatus of the present invention.

In this embodiment, the parameters of the optical elements 2 are adjusted so that the functions of the optical apparatus satisfy the stipulated specifications. FIG. 3 shows a structural example of the adjustment apparatus 5. In the figure, reference symbol 5R denotes a register for storing data, and symbol 5RG a register group provided with the same number of registers 5R as the number of adjustment locations. Reference symbol 5A denotes an adjustment algorithm execution unit that executes an adjustment sequence according to the method of the present invention, and symbol 5F an evaluation function unit that calculates the evaluated value of the function of the optical apparatus. In the figure, reference numeral 4 denotes a drive mechanism, symbol 4C a comparator circuit, and symbol 4D a motor drive circuit (to be described later) that drives the drive mechanism 4 to vary the parameters of the optical element.

In the adjustment in this embodiment, the aforementioned drive mechanism 4 varies the parameters of the adjustable optical elements 2 according to control signals CS corresponding to digital values stored in the registers 5R within the adjustment apparatus 5. These control signals CS may be analog signals or digital signals, which have a one-to-one correspondence to the data in the registers 5R. Here, the number of registers 5R provided is equal to the total number of adjustment locations of the optical elements 2. The registers 5R can both output the stored digital values to the drive mechanism and change the stored value by means of the adjustment algorithm execution unit 5A within the adjustment apparatus 5.

The aforementioned adjustment algorithm execution unit 5A uses a genetic algorithm to search for optimal values of the values stored in the plurality of registers 5R. Note that the adjustment apparatus 5 may consist of a personal computer, microcomputer or other electronic computer equipped with readable storage media and an apparatus for reading storage media, and moreover, it may also be constituted using a programmable LSI as disclosed in the publication of unexamined Japanese patent application No. JP-A-9-294069, or a circuit recited in a paper by Kajitani, et al entitled "Implementation of Structural Learning Circuits for Neural Networks by GA" (Journal of the Japanese Neural Network Society, vol. 5, No. 4, pp. 145–153, 1998).

In the aforementioned electronic computer, the program that implements the functions of the adjustment algorithm execution unit 5A and the evaluation function unit 5F may be stored in or on hard disk, ROM (read-only memory), optical disk, magneto-optical disk, flexible disk, magnetic disk, flash memory, memory that utilizes ferroelectric material, MRAM that utilizes magnetic material, semiconductor memory with backup features, or other recording media. In the same manner, the functions of the drive mechanism controller SC can be implemented in an electronic computer and the program for this adjustment method (program that performs adjustment) can be similarly stored in or on the aforementioned recording media.

In addition the aforementioned program that performs adjustment may be transmitted or distributed via a network.

The observation apparatus 6 accepts input of the output light from the optical apparatus (optical unit 1), analyzes this input light and converts it to an electrical signal which is passed to the adjustment apparatus 5. The adjustment apparatus 5 uses the evaluation function unit 5F to calculate an evaluation value that indicates how close to ideal the output from the optical unit 1 corresponding to the adjustment light is. This evaluation value is passed to the adjustment algorithm execution unit 5A within the adjustment apparatus 5. The adjustment algorithm execution unit 5A then searches for optimal adjustment results by the method of the present invention to be described later.

In this embodiment there are one each of the light paths for input light and output light, but in the present invention, there may be any number of light paths for the input light 8 and output light 9 of the optical apparatus 1, including the case of a plurality, and the case of no input light 8 is also possible as in the case of a laser with a built-in excitation light source. In addition, the case of an optical apparatus that handles light bidirectionally is also possible. Note that in this case, the input light 8 and output light 9 will change depending on the direction of the signal, so the adjustment according to the present invention is performed by reversing the connections of the adjustment light generator 7 and the observation apparatus 6.

In addition, the output light 9 used in the adjustment according to the present invention need not be only the original output light of the optical unit 1, but it may also be extracted from the interior of the optical apparatus (optical unit 1).

The total number of adjustment locations of the optical elements 2 in optical unit 1 is a plurality, and as shown in FIG. 2, at the adjustment locations of the optical elements 2, the adjustment of one adjustment location affects the results of adjustment of all other adjustment locations, so in the case in which a combinatorial explosion occurs in the adjustment search space, the present invention is particularly effective.

The optical unit 1 of this embodiment has a major characteristic in that the optical elements 2 adjusted by the drive mechanism 4 according to electrical adjustment signals are adjusted by the adjustment apparatus 5 which has a register group 5RG. Here follows a description of the operation of the optical apparatus of this embodiment.

The optical elements 2 comprise mirrors, lenses, optical filters, prisms, waveguide-type optical elements (optical fibers, waveguide-type modulators, optical fiber gratings), semiconductor optical components (semiconductor mirrors, semiconductor absorption modulators), diffraction gratings, polarization elements, electro-optical elements, acousto-optical elements, optical crystals (laser crystals), slits or optical elements consisting of a combination of the aforementioned optical elements, or the like, and the position, orientation, optical characteristics and other parameters of these optical elements can be varied by the drive mechanism 4 corresponding to the control signal CS output from the adjustment apparatus 5.

Moreover, this embodiment is characterized in that the number of adjustment locations in the optical elements 2 is a plurality. In the case of a plurality of adjustment locations, the number of optical elements 2 may even be one. In the case of a plurality of optical elements 2, it does not matter if they are of the same type of optical element or not. In addition, the number of drive mechanisms 4 is normally the same as the number of adjustment locations of the optical elements 2. However, portions of the drive mechanism, the circuits for running a current through the motor for example, may be embodied as a single unit.

The optical elements 2 are such that their parameters are varied by the drive mechanism 4. As described above, the variable parameters include the position and orientation in any coordinate system, and the optical characteristics, and the number of parameters that are varied by any single operation of the drive mechanism 4 is not limited to 1. Here follows a structural example of the drive mechanism 4.

Figure 4:
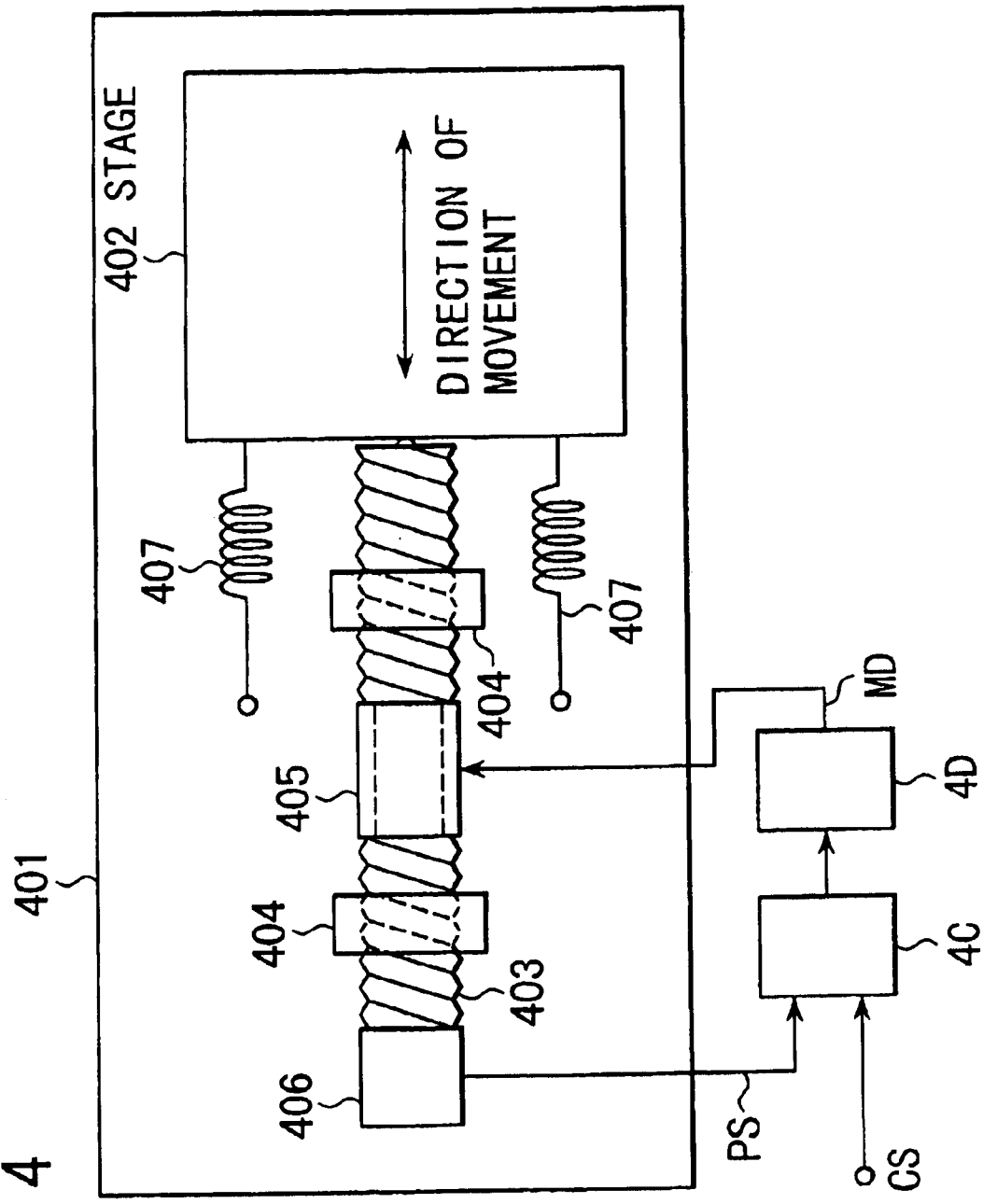
FIG. 4 is a structural diagram showing one example of a drive mechanism for translational movement used in the optical apparatus of the present invention.

FIG. 4 shows a structural example of a drive mechanism 4 for optical elements 2 that is able to perform translational motion in one direction. In the figure, reference numeral 401 denotes the base of this drive mechanism. Reference numeral 402 denotes a stage that is driven to perform translational motion, and rails (not shown) are provided on the base 401 so that it can move in one direction. An optical element 2 is mounted upon this stage 402. Reference numeral 403 denotes a male screw while numeral 404 denotes a female screw fixed to the optical unit 1. Reference numeral 405 denotes a motor for rotating the male screw 403 and numeral 406 a potentiometer for detecting the amount of rotation (angle of rotation) of the male screw 403. Reference numeral 407 denotes a spring that functions to prevent positional uncertainty due to the gap between the male screw 403 and the female screw 404, and also cause the amount of movement of the male screw 403 to be the same as the amount of movement of the stage 402.

In this drive mechanism, the motor 405 rotates the male screw 403, and since the female screw 404 is fixed to the base 401, the male screw 403 moves in the direction of its central axis, and the amount of this motion is of a magnitude proportional to the angle of rotation of the male screw 403. When the male screw 403 makes one revolution (the angle of rotation is 360°), this amount of motion becomes equal to the pitch of the threads on the male screw 403. The stage 402 moves by the same amount as the male screw 403.

Reference symbol 4C denotes a comparator circuit that accepts input of the angle-of-rotation signal given by the potentiometer (PS) and compares the angle of rotation corresponding to the control signal CS and the angle of rotation indicated by the potentiometer. Reference symbol 4D denotes a motor drive circuit that provides a current (MD) for rotating the motor 405 according to the output of the comparator circuit 4C, and provides current for rotating the motor in the direction in which [the difference between] the angle of rotation corresponding to the control signal CS and the angle of rotation indicated by the potentiometer becomes smaller.

By means of the aforementioned operation, this drive mechanism causes the optical element 2 mounted to the drive mechanism to be moved translationally to the position corresponding to the value indicated by the control signal CS. To wit, the parameter of the optical element 2 within the optical unit 1 is varied corresponding to the value indicated by the control signal CS.

Figure 5:
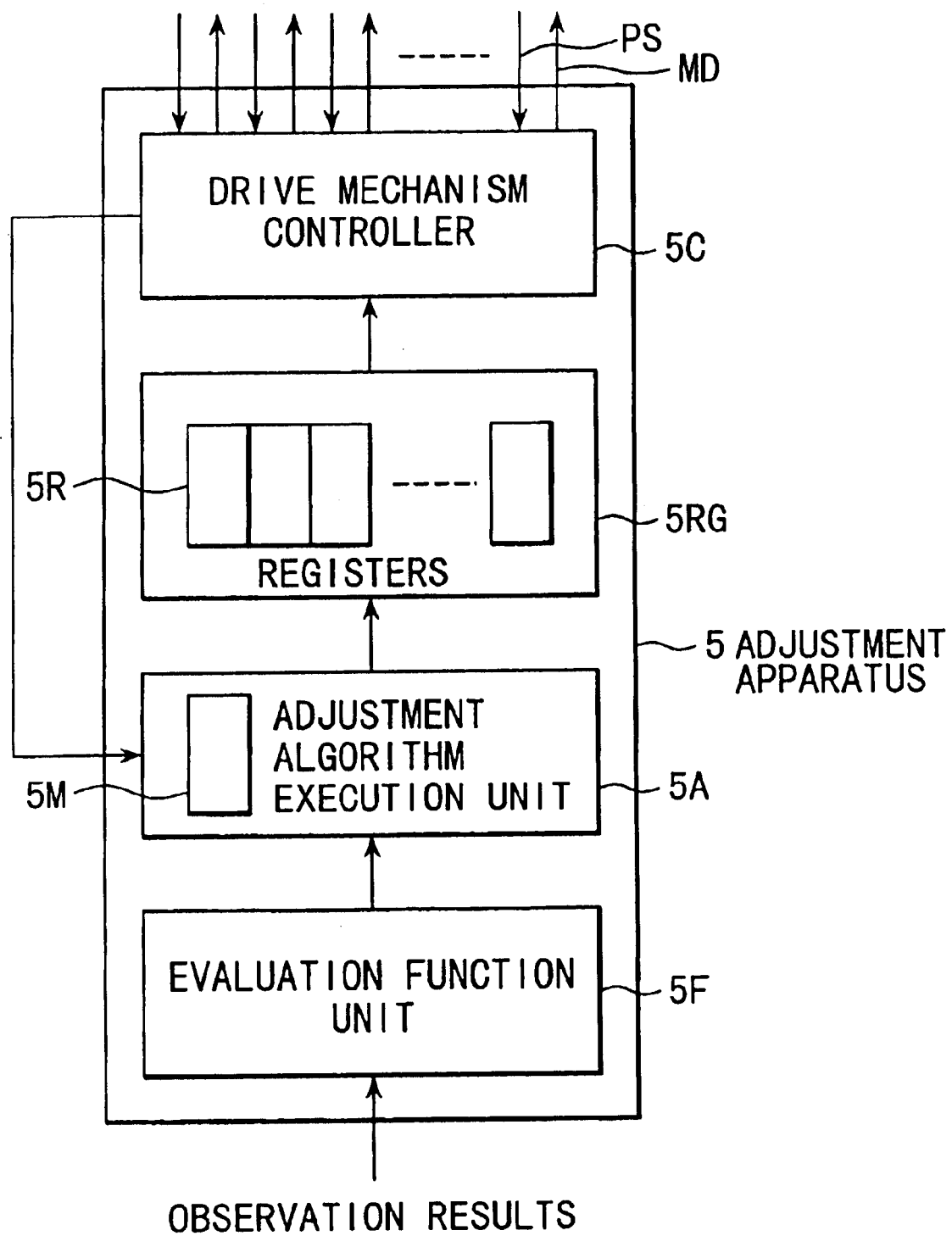
FIG. 5 is a structural diagram showing the adjustment apparatus of the present invention.

The comparator circuit 4C and motor drive circuit 4D in the structural example of FIG. 4 can also be incorporated within the adjustment apparatus 5. FIG. 5 shows such a structural example. In FIG. 5, reference symbol 5C denotes a drive mechanism controller accepts input of signals from the potentiometer 406 and has the same functions as the comparator circuit 4C and motor drive circuit 4D. Here, those components with the same reference symbols as on FIG. 3 are the same items or equivalent components.

As the motor 405, a DC motor may be used as well as a piezomotor that uses the piezoelectric effect. In addition, if the motor 405 is a stepper motor, the angle of rotation of the motor can be controlled corresponding to the state of the current flowing through the stepper motor, so it is possible to omit the potentiometer 406 and comparator circuit 4C. In this case, the motor drive circuit 4D accepts input of the control signal CS.

In the optical element 2, in order to perform two-directional translation, two superimposed units of a drive mechanism 4 of the structure in FIG. 4 above may be used. To wit, among the two superimposed units of drive mechanisms, it is sufficient to secure the base 401 of the upper unit to the stage 402 of the lower unit, or a unitized construction may be used. At this time, the directional relationship between the stage 402 of the lower unit and the base 401 of the upper unit may be parallel or perpendicular. Moreover, they may have any constant angle.

In the optical element 2, in order to perform three-directional translation, as in the case of two-directional translational motion described above, three superimposed units of a drive mechanism 4 of the structure in FIG. 4 above may be used. To wit, among the three superimposed units of drive mechanisms, it is sufficient to secure the base 401 of the upper unit to the stage 402 of the middle unit, or a unitized construction may be used. At this time, the directional relationships among the base 401 and stage 402 of each of the units may be parallel or perpendicular, or they may have any constant angle.

Figure 6:
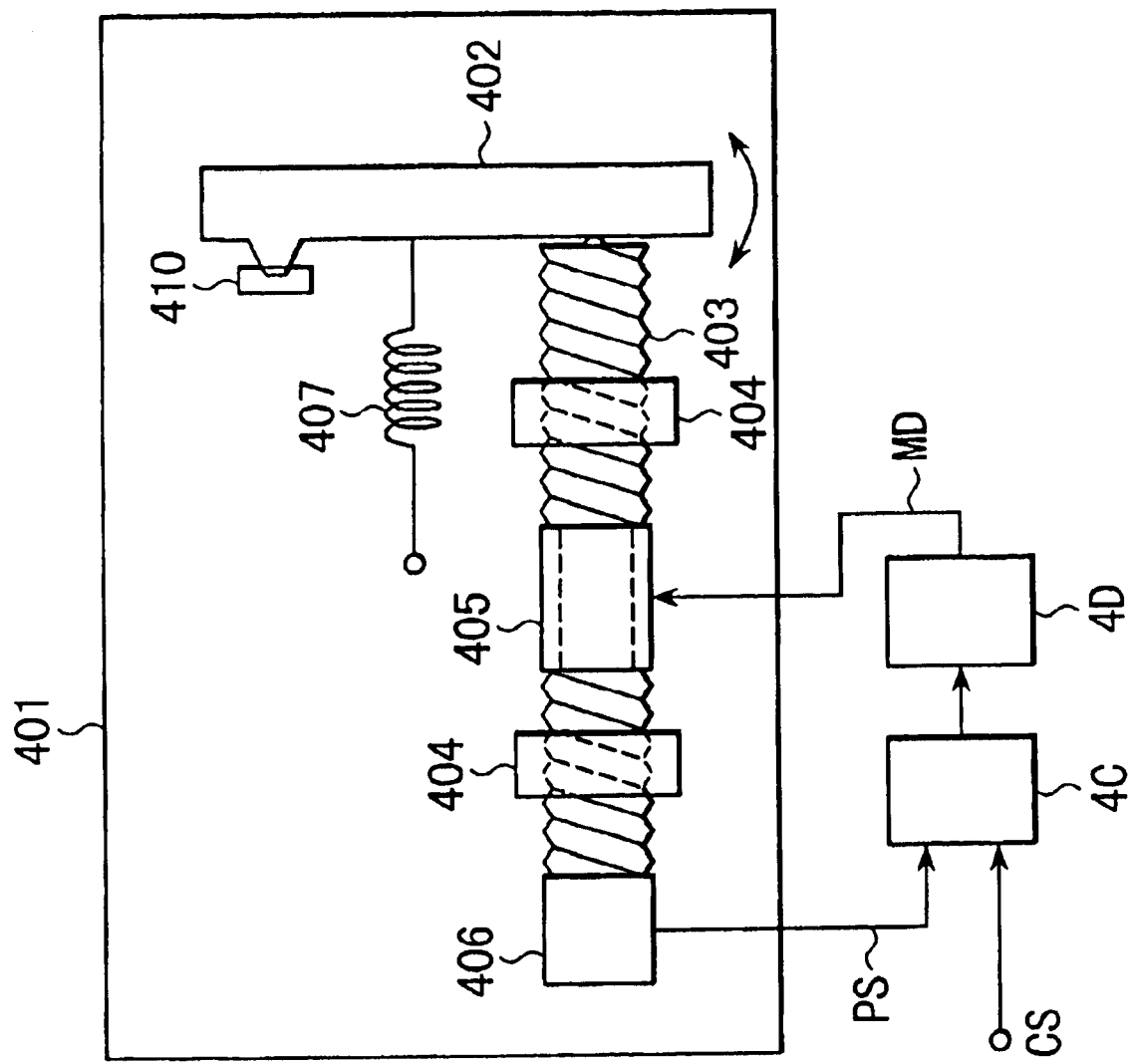
FIG. 6 is a structural diagram showing one example of a drive mechanism for single-axis rotation used in the optical apparatus of the present invention.

FIG. 6 shows a structural example of a drive mechanism 4 for optical elements 2 that is able to perform rotation in one axis. In the figure, reference numeral 401 denotes the base of this drive mechanism. Reference numeral 402 denotes a stage that is driven to perform translational motion, and which rotates about the fulcrum indicated by reference numeral 410. An optical element 2 is mounted upon this stage 402. Reference numeral 403 denotes a male screw while numeral 404 denotes a female screw fixed to the optical unit 1. Reference numeral 405 denotes a motor for rotating the male screw 403 and numeral 406 a potentiometer for detecting the amount of rotation (angle of rotation) of the male screw 403. Reference numeral 407 denotes a spring that functions to prevent positional uncertainty due to the gap between the male screw 403 and the female screw 404, and also causes the amount of movement of the male screw 403 to have a one-to-one correspondence with the amount of rotation of the stage 402.

In this drive mechanism, the motor 405 rotates the male screw 403, and since the female screw 404 is fixed to the base 401, the male screw 403 moves in the direction of its central axis. The amount of this motion is of a magnitude proportional to the angle of rotation of the male screw 403. When the male screw 403 makes one revolution (the angle of rotation is 360°), this amount of motion becomes equal to the pitch of the threads on the male screw 403. Reference symbol 4C denotes a comparator circuit that compares the angle of rotation corresponding to the control signal CS and the angle of rotation indicated by the potentiometer.

Reference symbol 4D denotes a motor drive circuit that provides a current for rotating the motor 405 according to the output of the comparator circuit 4C, and provides current for rotating the motor in the direction in which the difference between the angle of rotation corresponding to the control signal CS and the angle of rotation indicated by the potentiometer becomes smaller. The movement of the male screw 403 causes the stage 402 to rotate about the fulcrum 410. By means of the aforementioned operation, this drive mechanism causes the optical element 2 mounted to the drive mechanism to be rotate to the direction corresponding to the value indicated by the control signal CS. To wit, the parameter of the optical element 2 is varied depending on the value indicated by the control signal CS.

As the motor 405, a DC motor may be used as well as a piezomotor that uses the piezoelectric effect. In addition, if the motor 405 is a stepper motor, the angle of rotation of the motor can be controlled corresponding to the state of the current flowing through the stepper motor, so it is possible to omit the potentiometer 406 and comparator circuit 4C. In this case, the motor drive circuit 4D accepts input of the control signal CS.

Figure 7:
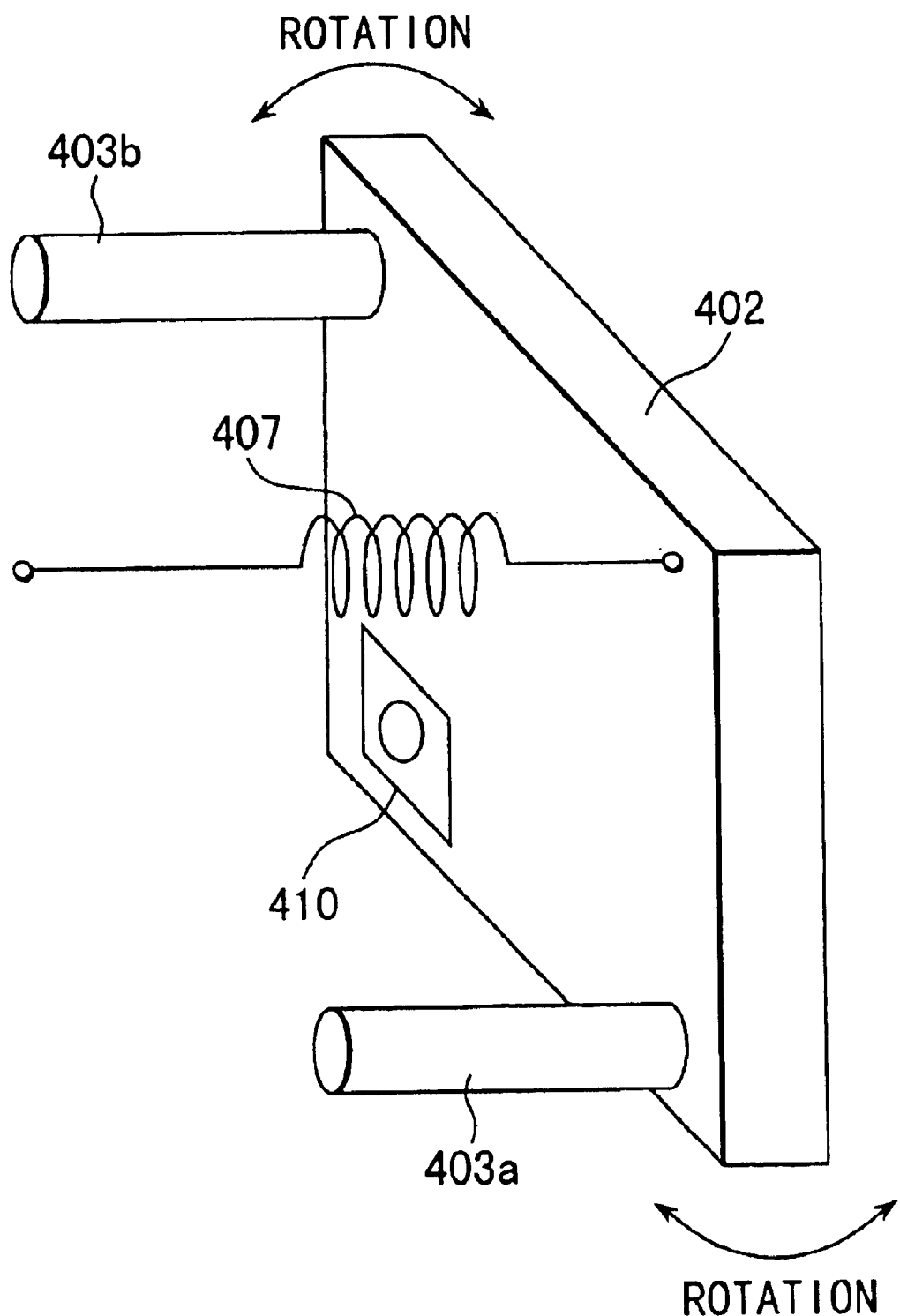
FIG. 7 is a structural diagram showing one example of a drive mechanism for two-axis rotation used in the optical apparatus of the present invention.

In the optical element 2, in order to perform two-axis rotation, two sets of the drive mechanism of the structure in FIG. 6 above may be used. Moreover, it is possible to adopt the structure shown in FIG. 7 wherein a common fulcrum 410 and spring 407 are used. In. FIG. 7, reference symbol 403a and 403b denote male screws for obtaining rotation about two axes, while fulcrum 410 is a common fulcrum and spring 407 is a common spring. In FIG. 7, the recitation of the other constituent elements required for the motion of male screws 403a and 403b are omitted. Male screws 403a and 403b are independently moved to positions corresponding to their control signals CS to obtain two-axis independent rotation.

In the optical element 2, in order to perform three-axis rotation, as in the case of two-axis rotation described above, three sets of the drive mechanism of the structure in FIG. 6 above may be used.

In the event that the variable parameter of one optical element 2 is a combination of translational movement and rotation, it is possible to use a structure that combines the aforementioned example of a structure for translational movement and the example of a structure for rotation.

Figure 8:
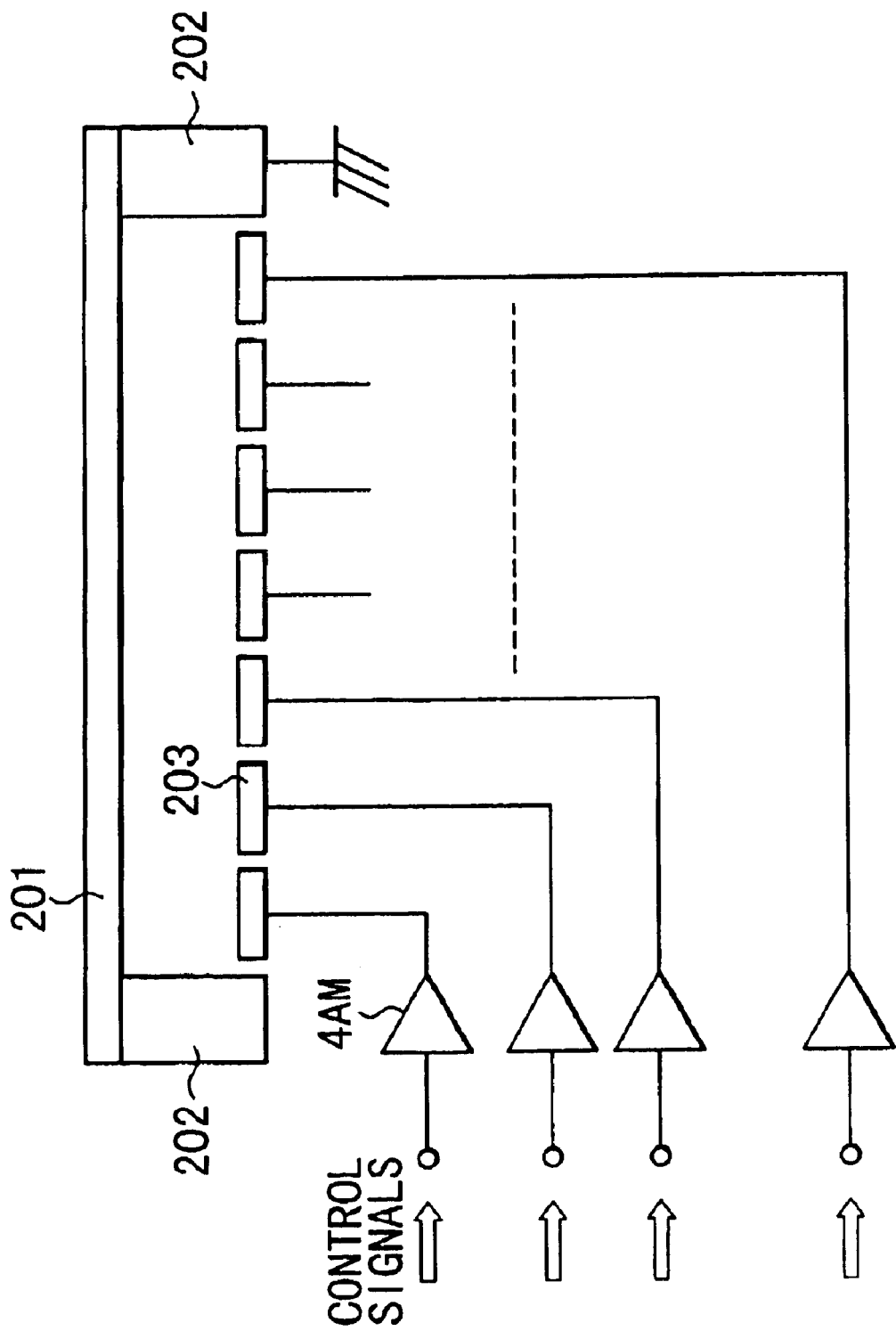
FIG. 8 is a structural diagram showing one example of a deformable mirror used in the optical element and drive mechanism of the present invention.
Figure 9:
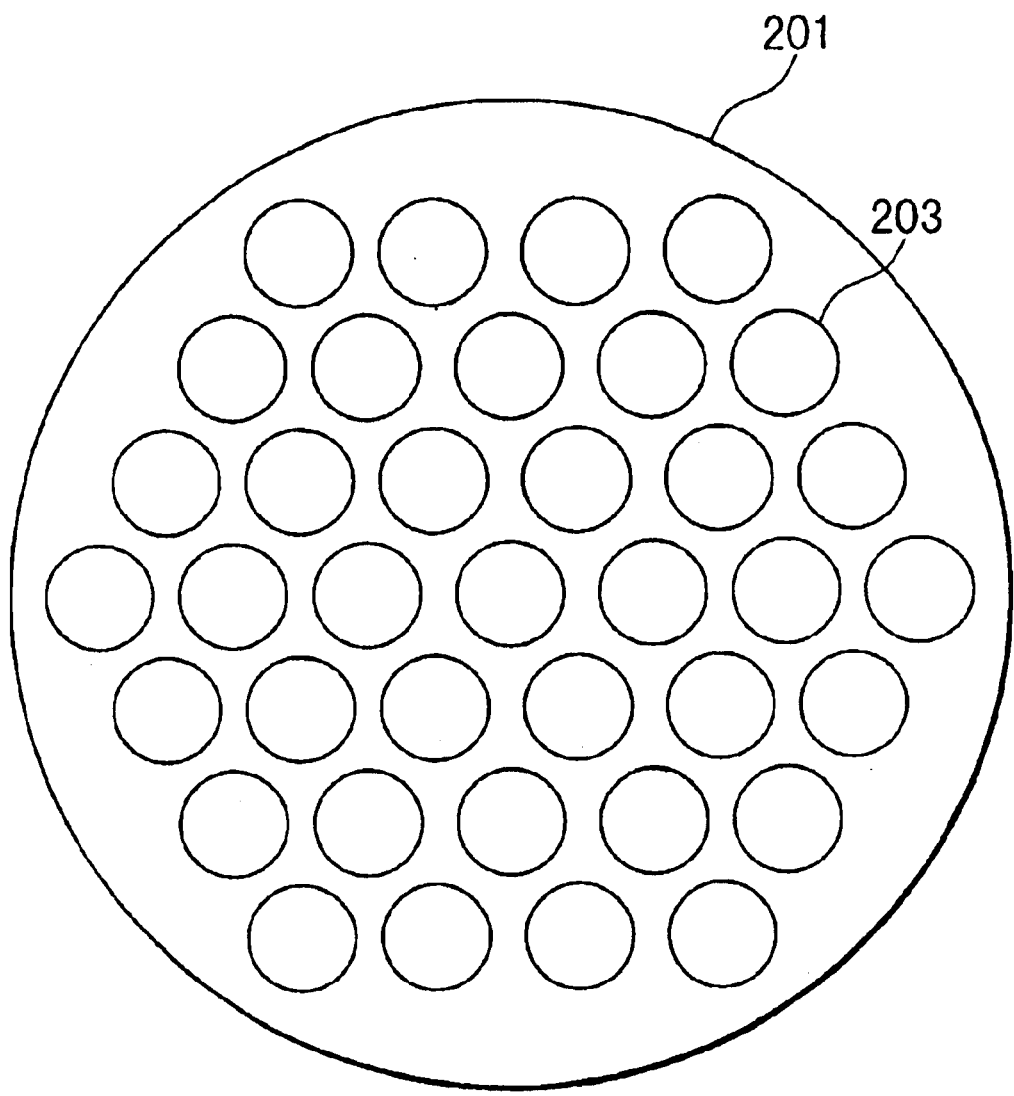
FIG. 9 is a structural diagram showing one example of the layout of electrodes in the aforementioned deformable mirror.

In the case that an optical element 2 is a deformable mirror, control of the wave front of the light it handles is possible. FIGS. 8 and 9 show a structural example of the optical elements 2 of a deformable mirror and its drive mechanism 4. FIG. 8 is a drawing showing a cross-section of this structural example of a deformable mirror, while FIG. 9 is a plan drawing of the electrode layout in this structural example of a deformable mirror.

In FIG. 8, reference numeral 201 denotes a mirror that deforms corresponding to the value indicated by the control signal CS, while numeral 202 denotes a support structure for the mirror and numeral 203 denotes a plurality of electrodes. Reference symbol 4AM denotes an amplifier that provides a voltage corresponding to the value of the control signal CS. In this structural example, one optical element 2 which is the deformable mirror and a plurality of drive mechanisms 4 form a single structure.

This deforming mirror 201 is made of a conductive material and we shall take it to be the earth potential for convenience. The plurality of electrodes 203 are disposed adjacent and equidistantly from this mirror 201. At this time, when a voltage is applied to the electrodes 203, portions of the mirror 201 near the electrodes 203 are drawn closer by electrostatic attraction. As a result, the mirror 201 deforms. Here, the electrodes 203 and amplifier 4AM function as the drive mechanism 4.

Since there is a plurality of electrodes 203, the portions mirror in the vicinity of the individual electrodes will be attracted to each depending on the voltage applied to the individual electrodes. At this time, the number of degrees of freedom of the deformation of the mirror 201 is the same as the number of electrodes 203. The electrodes 203 are disposed as shown in FIG. 9. In the aforementioned structural example, the number of electrodes in one deformable mirror, the number of degrees of freedom of the deformation of the mirror 201 and the number of adjustment locations are all 37.

To wit, this mirror 201 has the same number of parameters as the number of input control signals CS, so it is deformed with the same number of degrees of freedom. Here, the amount of deformation of the mirror 201 in a location corresponding to a certain electrode 203 is greatly affected by the voltage of the electrodes 203 adjacent to that electrode 203. For this reason, as shown in FIG. 2, the plurality of adjusted parameters mutually affect the results of adjustment of that parameter.

Figure 10:
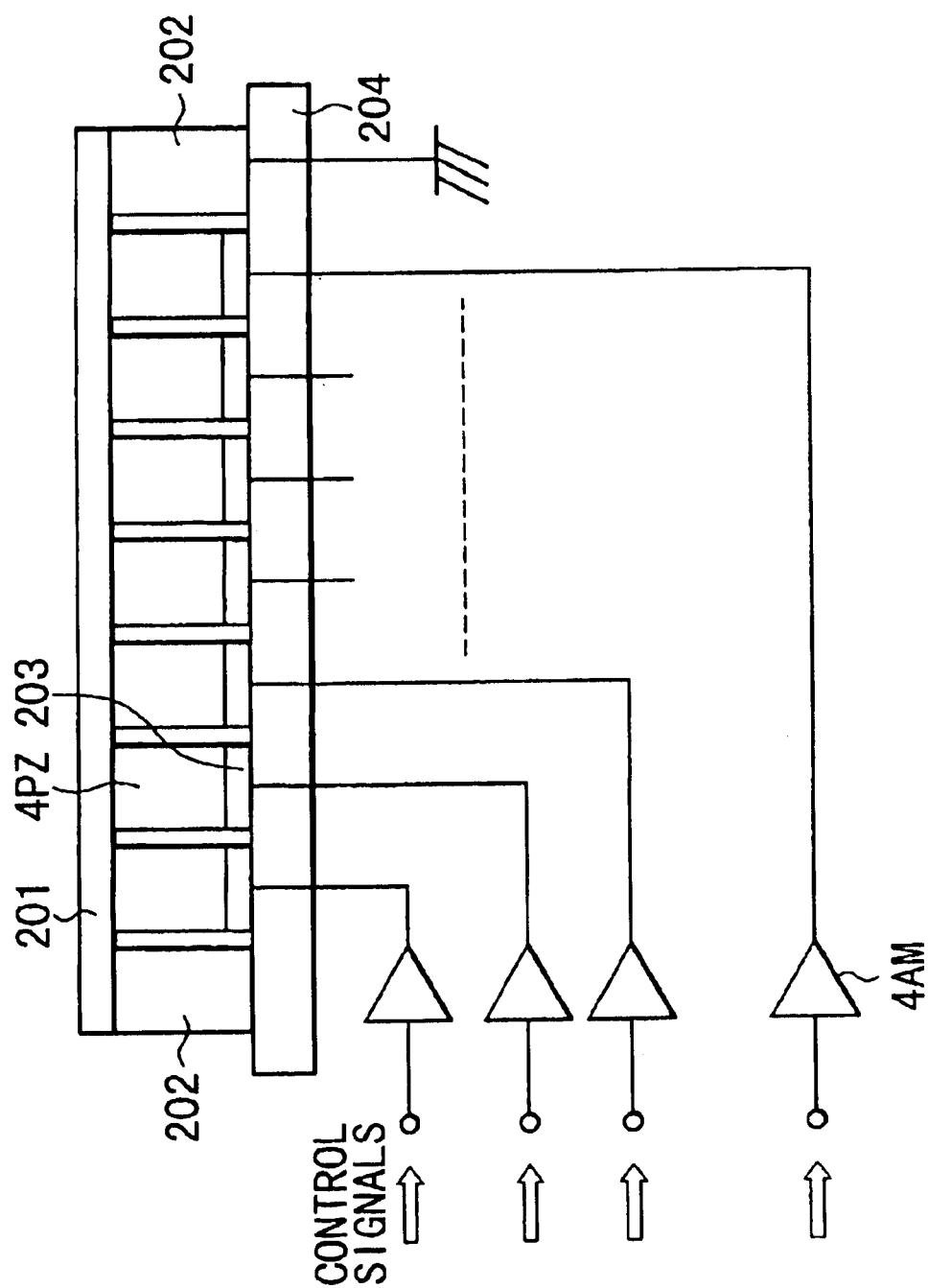
FIG. 10 is a structural diagram showing another example of a deformable mirror used in the optical element and drive mechanism of the present invention.

FIG. 10 shows a cross-section of another structural example of a deformable mirror. In FIG. 10, reference symbol 4PZ denotes a piezo element, while reference numeral 204 denotes a support structure of insulating material. Otherwise, components identical to those in the case of FIG. 8 are given the same symbols. The layout of electrodes 203 is similar to that of the structural example shown in FIG. 9.

To wit, the input control signal CS is amplified by the amplifier 4AM and the voltage corresponding to that control signal CS is applied to the piezo element. Thereby, the piezo element is mechanically deformed so the mirror 201 deforms. Therefore, as in the aforementioned structural example, the shape of the mirror can be varied depending on the value indicated by the control signals CS. In this structural example, the mirror 201 is mechanically secured to the piezo elements 4PZ, electrodes 203 and the support structure 204, so this structure is effective when reducing the effects of outside vibration is desired.

Furthermore, as another structural example of a deformable mirror, the piezo elements 4PZ in FIG. 10 can combine a piezo element and a drive mechanism that induces displacement mechanically. As this drive mechanism, for example the drive mechanism shown in FIG. 4 may be used. In this case, by inducing large displacements in the shape of the mirror by this drive mechanism and inducing the fine adjustment of displacements can by the piezo elements, it is possible to obtain large displacements with high precision.

Figure 11:
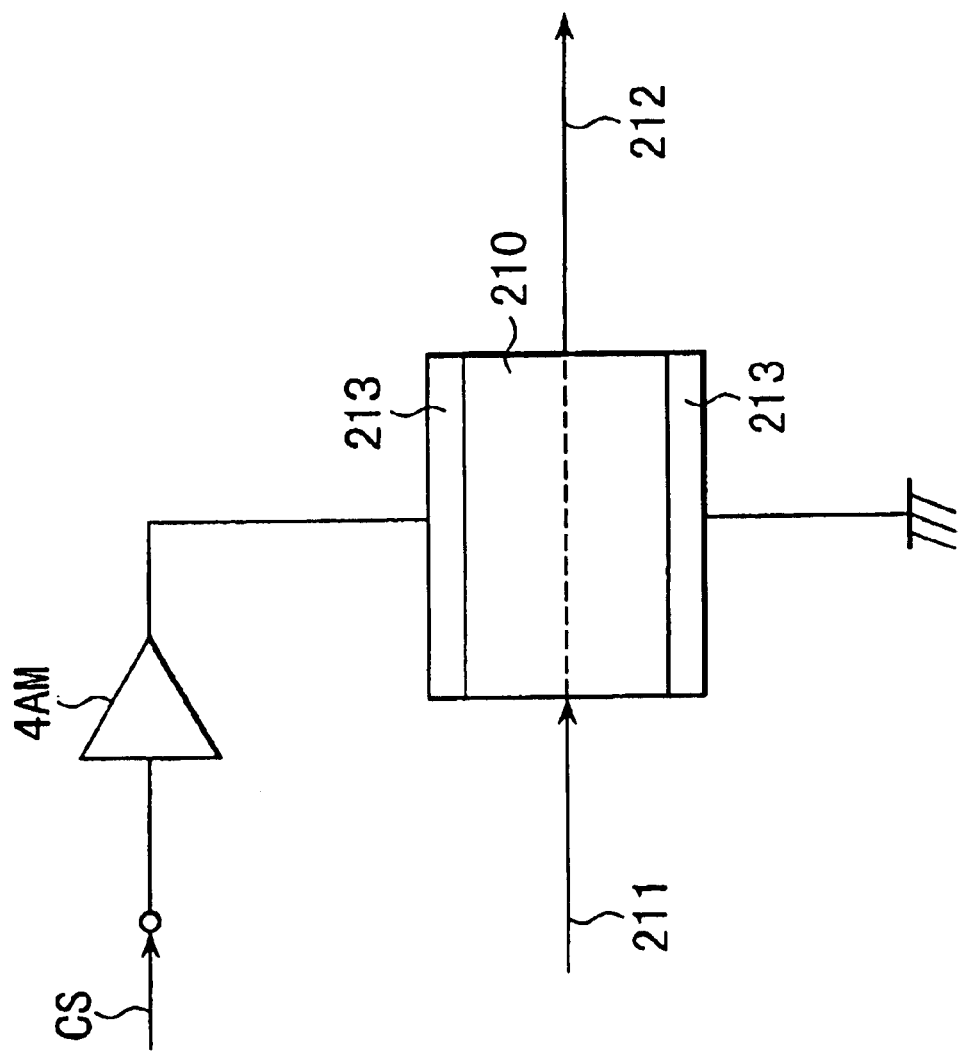
FIG. 11 is a structural diagram showing one example of the optical element and drive mechanism of the present invention wherein the variable element parameter is the transmittance or coefficient of absorption.

FIG. 11 shows a structural example of an optical element in the case in which the variable element parameter is the transmittance or coefficient of absorption. In FIG. 11, reference numeral 210 denotes a semiconductor junction element, numeral 211 input light, numeral 212 output light, numeral 213 an electrode and reference symbol 4AM an amplifier, corresponding to the drive mechanism 4 in the present invention. The control signal CS is input to the amplifier 4AM and a voltage corresponding to that control signal CS is applied to the semiconductor junction element 210 as a reverse bias voltage of said semiconductor junction element. At this time, the values of physical properties in the interior of the semiconductor junction element 210 change and the transmittance or coefficient of absorption of light varies.

In the event that the variable element parameter is reflectance, with the structure of FIG. 11, it is possible to form a reflective film on one surface of the semiconductor junction element 210 perpendicular to the light path. In this case, the light paths for incident light and reflected light become identical, so the reflectance varies depending on the value indicated by the control signal CS.

Figure 12:
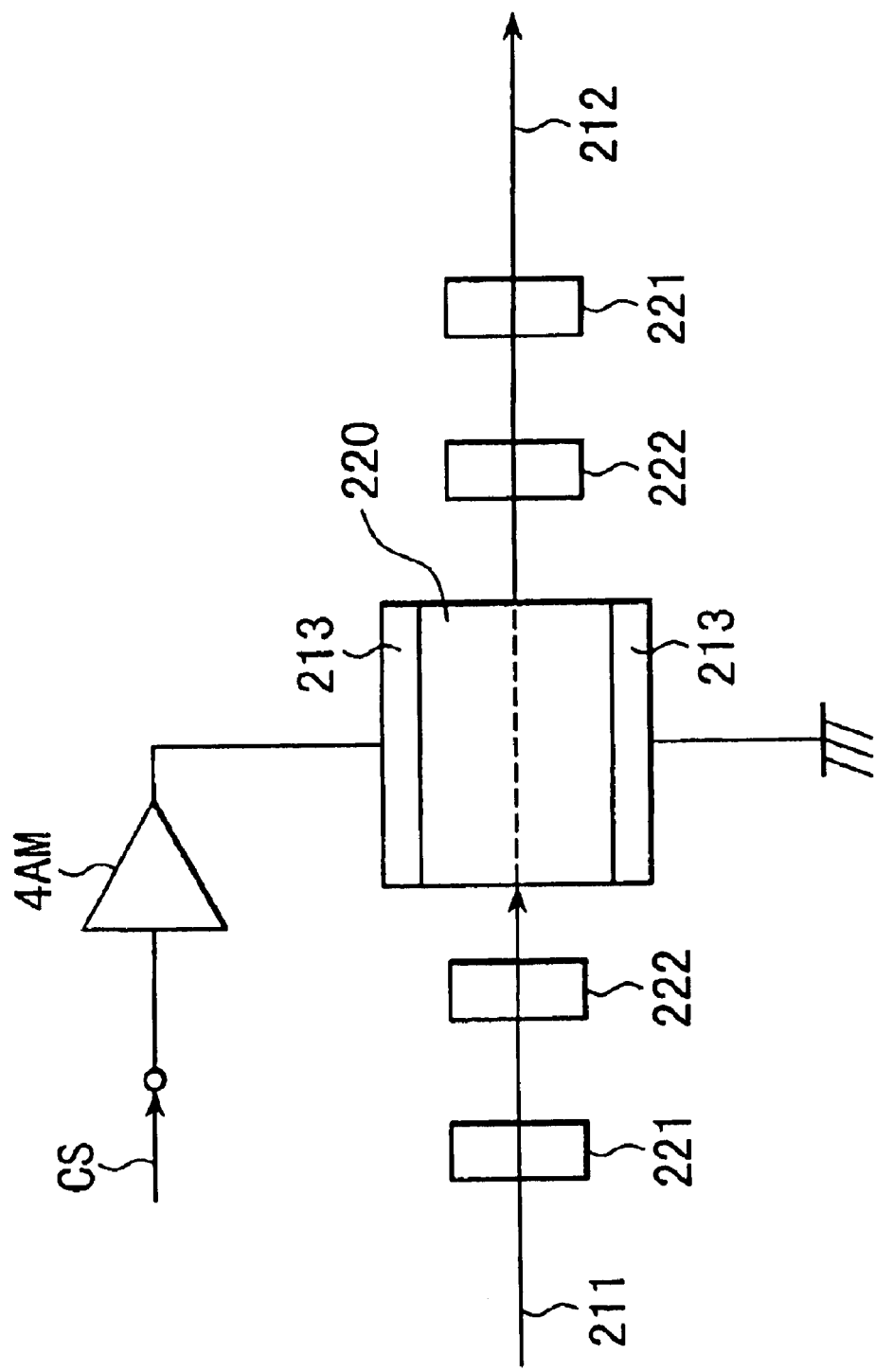
FIG. 12 is a structural diagram showing one example of the optical element and drive mechanism of the present invention wherein the variable element parameter is the polarization.

FIG. 12 shows a structural example of an optical element in the case in which the variable element parameter is birefringence. In FIG. 12, reference numeral 220 denotes a liquid crystal, numeral 221 a polarizer and numeral 222 a phase modulator. In addition, structural elements that are the same as in FIG. 11 are given the same symbols. When a voltage is applied to the liquid crystal 220 its birefringence changes. Instead of liquid crystal, the liquid crystal 220 may also be an electro-optical crystal that exhibits birefringence. The phase modulator 222 may be a half-wavelength plate or a quarter-wavelength plate. As in the aforementioned case in which the transmittance varies, in this structural example also, when a voltage corresponding to the control signal CS is applied to the liquid crystal 220, the birefringence of the liquid crystal varies and the polarization characteristics (retardation) of light reaching the optical element varies.

Figure 13:
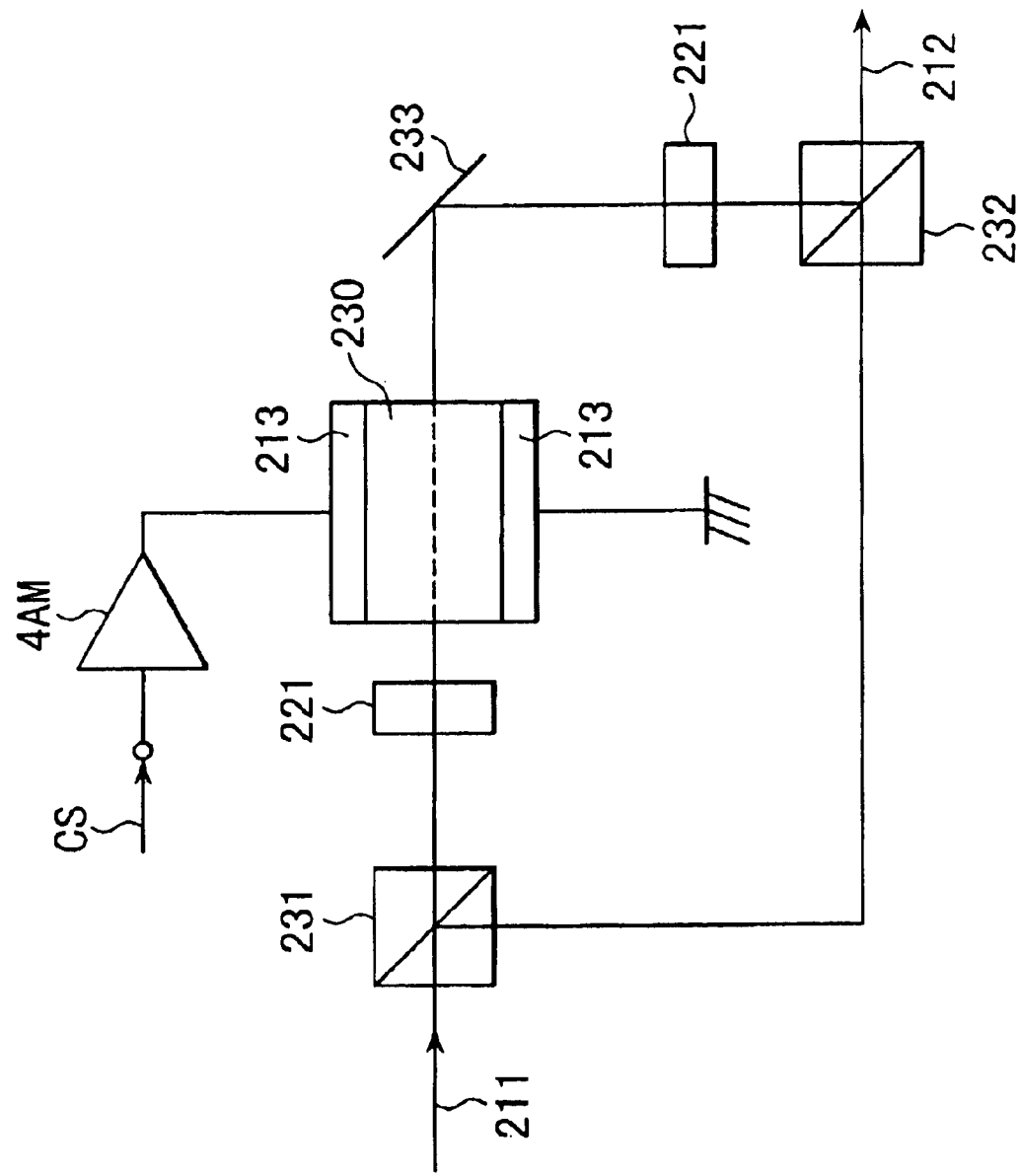
FIG. 13 is a structural diagram showing one example of the optical element and drive mechanism of the present invention wherein the variable element parameters are the phase and light intensity.

FIG. 13 shows a structural example of an optical element in the case in which the variable element parameter is birefringence. In FIG. 13, reference numeral 230 denotes an electro-optical crystal, numeral 231 a splitter and numeral 232 a combiner. In addition, structural elements that are the same as in FIG. 11 are given the same symbols. The electro-optical crystal 230 may also be a liquid crystal or the like. The splitter and combiner may be polarizing beam splitters for example. The input light 211 is split by the splitter 231 and one half of the light goes through the electro-optical crystal 230 where its phase is varied depending on the value indicated by the control voltage. This light and the light from the splitter 231 are combined in the combiner 232. At this time, the light intensity of the output light from said optical element varies depending on the control signal CS.

Figure 14:
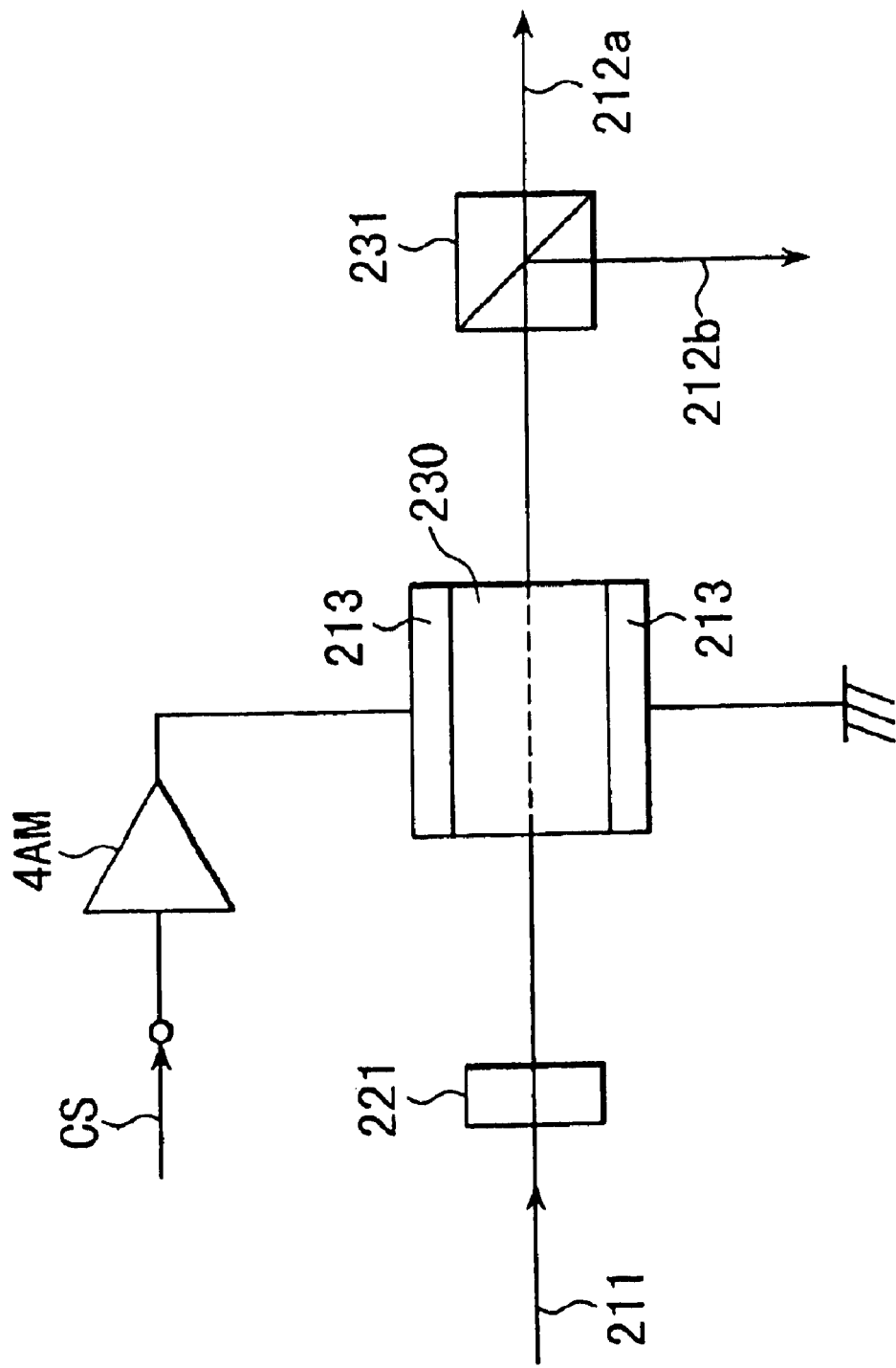
FIG. 14 is a structural diagram showing one example of the optical element and drive mechanism of the present invention wherein the variable element parameter is the distribution ratio.

FIG. 14 shows a structural example of an optical element in the case in which the variable element parameter is the distribution ratio. In FIG. 14, reference numeral 230 denotes an electro-optical crystal, numeral 231 a splitter which may be a polarizing beam splitter for example, and numeral 221 is a polarizer. Reference symbol 212a and 212b denote the two halves of the split output light. In addition, structural elements that are the same as in FIG. 11 are given the same symbols. As in the aforementioned optical element, the state of polarization of the input light 211 varies depending on the value indicated by the control voltage by means of the electro-optical crystal 230. This light is distributed depending on the state of polarization in the splitter 231. As a result, the distribution ratio of the optical element varies depending on the control signal CS.

Figure 15:
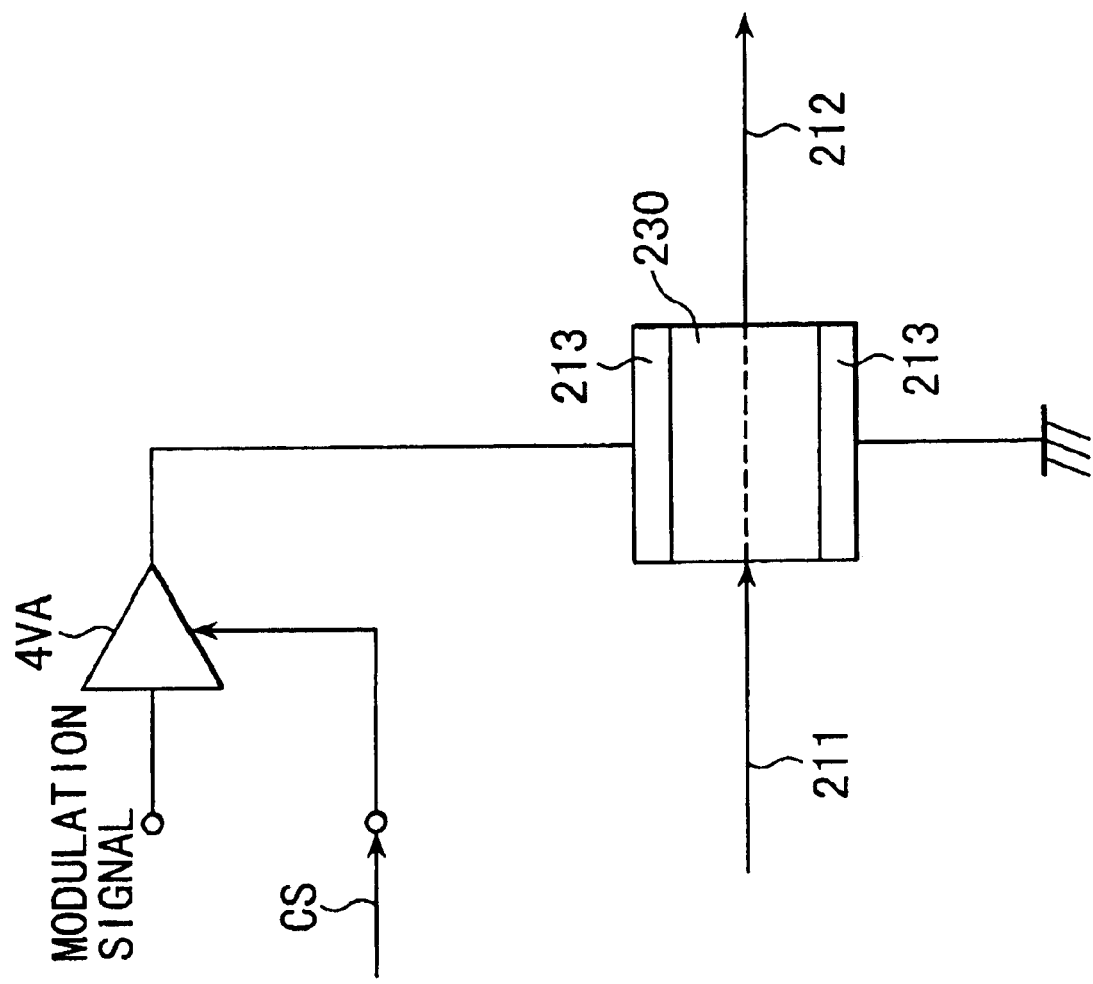
FIG. 15 is a structural diagram showing one example of the optical element and drive mechanism of the present invention wherein the variable element parameter is the modulation rate.

FIG. 15 shows a structural example of an optical element in the case in which the variable element parameter is the modulation rate. In FIG. 15, reference symbol 4VA denotes a variable-gain amplifier for electrical signals and numeral 230 an electro-optical crystal. In addition, structural elements that are the same as in FIG. 11 are given the same symbols. The input light 211 is modulated in the electro-optical crystal 230 by means of a modulation signal. At this time, by varying the gain of the variable-gain amplifier 4VA with the control signal CS, the modulation rate of the optical element varies depending on the control signal CS.

Figure 16:
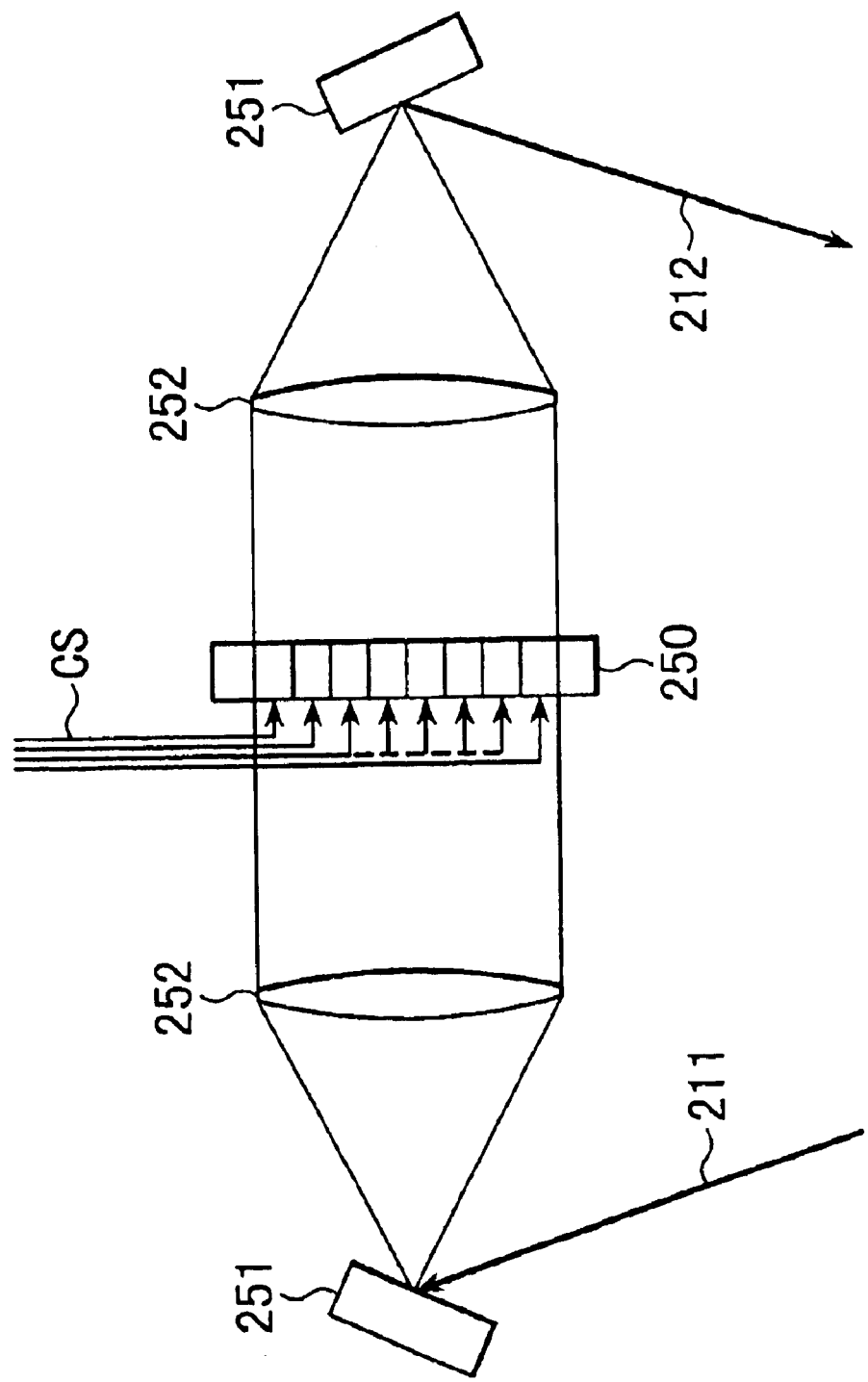
FIG. 16 is a structural diagram showing one example of the optical element and drive mechanism of the present invention wherein the variable element parameter is the wavelength characteristics.

FIG. 16 shows a structural example of an optical element in the case in which the variable element parameter is the wavelength dependence of the amplitude/phase characteristics (wavelength characteristics). In FIG. 16, reference numeral 250 denotes an LCD panel whose transmission characteristics are controlled by a plurality of control signals CS, numeral 251 a diffraction element and numeral 252 a lens. The diffraction element 251 may be a diffraction grating or prism. The diffraction element 251 and lens 252 divide the input light 211 among different light paths by wavelength. Moreover, the LCD panel 250 has the amplitude and phase characteristics of a plurality of its light paths vary depending on the values indicated by a plurality of control signals CS. As a result, the amplitude and phase of the light varies for each wavelength. Then, the lens 252 and diffraction element 251 combine the light paths separated by wavelength into a single light path. As a result, the wavelength dependence of the amplitude/phase characteristics of the optical element varies depending on the plurality of control signals CS.

The aforementioned optical elements that vary optical characteristics are exclusively those wherein the optical characteristics are varied electrically, but cases in which the optical characteristics of the optical elements 2 are varied optically are also possible.

Those optical elements 2 wherein the optical characteristics of the optical element are varied optically include wavelength conversion crystals, light amplification media, optical modulators and optical switching elements. Wavelength conversion crystals are optical crystals that utilize nonlinear optical phenomena based on the nonlinearity of polarization oscillation. Light amplification media include laser crystals, organic dyes, semiconductors and light-amplifying wave guides.

Laser crystals amplify light by forming a population inversion in laser levels (energy levels wherein the laser transition can be induced) and utilizing stimulated emission. Organic dyes amplify light by forming a population inversion in laser levels within the organic dye and utilizing stimulated emission. Light-amplifying wave guides are made by adding erbium or other elements that have laser levels to a wave guide, for example, an erbium-doped optical fiber.

An optical element 2 wherein the optical characteristics of the optical element are varied acoustically is an acousto-optical element. For example, by applying ultrasound to a medium disposed within the light path of an optical element, changes in the physical properties of the medium due to standing waves of this ultrasound can change the optical characteristics of the optical element.

Furthermore, the optical elements 2 may be a combination of the aforementioned optical elements 2.

Here follows a description of embodiment 1 of the adjustment method of the present invention used to adjust the aforementioned optical apparatus.

After the aforementioned optical apparatus is manufactured, in an adjustment step as shown in FIG. 1, the optical unit 1, adjustment apparatus 5, observation apparatus 6 and adjustment light generator 7 are laid out in that optical apparatus. The adjustment light generator 7 provides input of adjustment light 8a to the optical apparatus and the adjustment apparatus 5 performs the setting of register values in the register group 5RG according to the processing sequence shown in FIG. 17.

In this processing sequence, first in Step S1, rough adjustment is performed manually and the optical apparatus is operated. The element parameter values of each optical element at this time are measured and these values are written to the registers 5R as the initial settings and stored as the register values. Next, in Step S2, the adjustment light generator 7 provides output of adjustment light and the optical apparatus is operated with this adjustment light. Next, in Step S3, the light output of that optical apparatus is measured by the observation apparatus 6 and the results are sent to the adjustment apparatus 5. Next, in Step S4, the adjustment apparatus 5 uses the measurement values sent to it to make a judgment as to whether or not the performance of the optical apparatus falls within the tolerances that satisfy the stipulated specifications.

If the performance is not within the tolerances, in Step S5, the adjustment apparatus 5 changes the register values stored in the register group 5RG. Next, in Step S6, a standby of a fixed length of time occurs until the drive mechanism 4 halts. Next, in step S7, a judgment is made as to whether or not the end conditions (to be described concretely later) have been met. If the end conditions have been met, processing ends after defect handling is performed in Step S8, but if the end conditions have not been met, processing returns to Step S2 and this series of steps is executed repeatedly. This processing ends when the performance of the optical apparatus is judged to have satisfied the stipulated specifications in the aforementioned Step S4.

Regarding the method of changing the register values from the initial settings described above, several methods can be used and an example of one of these is presented below. To wit, the first method is a method wherein the settings are switched to all conceivable combinations within the range of register values in an appropriate order, and the second method is a method wherein settings are generated randomly. The third method is a method wherein the results of manual rough adjustment are taken as the initial settings and the settings are varied from these initial settings in both the positive and negative directions.

In the event that the number of optical elements 2 to be adjusted within the optical unit 1 subject to adjustment is small so a combinatorial explosion does not occur in the register values, it is possible to use the first or second methods. However, this example is a case wherein there is a large number of optical elements 2 to be adjusted, so it is likely that a combinatorial explosion will occur within the adjustment search space for the adjusted element parameters, and thus the third method is used. Here follows an explanation of the optical apparatus adjustment method using a genetic algorithm.

Reference literature for the aforementioned genetic algorithm includes, for example, *Genetic Algorithms in Search, Optimization, and Machine Learning* written by David E. Goldberg and published in 1989 by Addison-Wesley Publishing Company, Inc. Note that the genetic algorithm referred to in the present invention is an evolutionary computational technique that also includes the technique of Evolution Strategy (ES). Reference literature on evolution strategy includes, for example, *Evolution and Optimum Seeking* written by H. P. Schwefel and published in 1995 by John Wiley & Sons.

The performance of an optical apparatus can be represented by an evaluation function F which takes arguments of a plurality of element parameters. To have the functions of an optical apparatus satisfy stipulated specifications is equivalent to finding the parameter values that optimize the evaluation function F. The present inventors took note of this point and discovered that the aforementioned genetic algorithms are applicable to the adjustment of an optical apparatus. The adjustment apparatus 5 changes the register values of register group 5RG according to this genetic algorithm.

In the genetic algorithm, first a population of virtual organisms which have genes is established, and individuals that are fit for a predetermined environment are given a better probability of leaving descendents depending on their fitness. Then, the offspring inherit the genes of their parents by means of procedures called genetic operation. By performing these procedures through successive generations, it is possible to induce evolution in the genes and population of organisms, so that individuals with a high fitness will form the majority of the population of organisms. Moreover, the genetic operations used at this time include the crossover and mutation of genes, and the like which also occur during the propagation of actual organisms.

Figure 18:
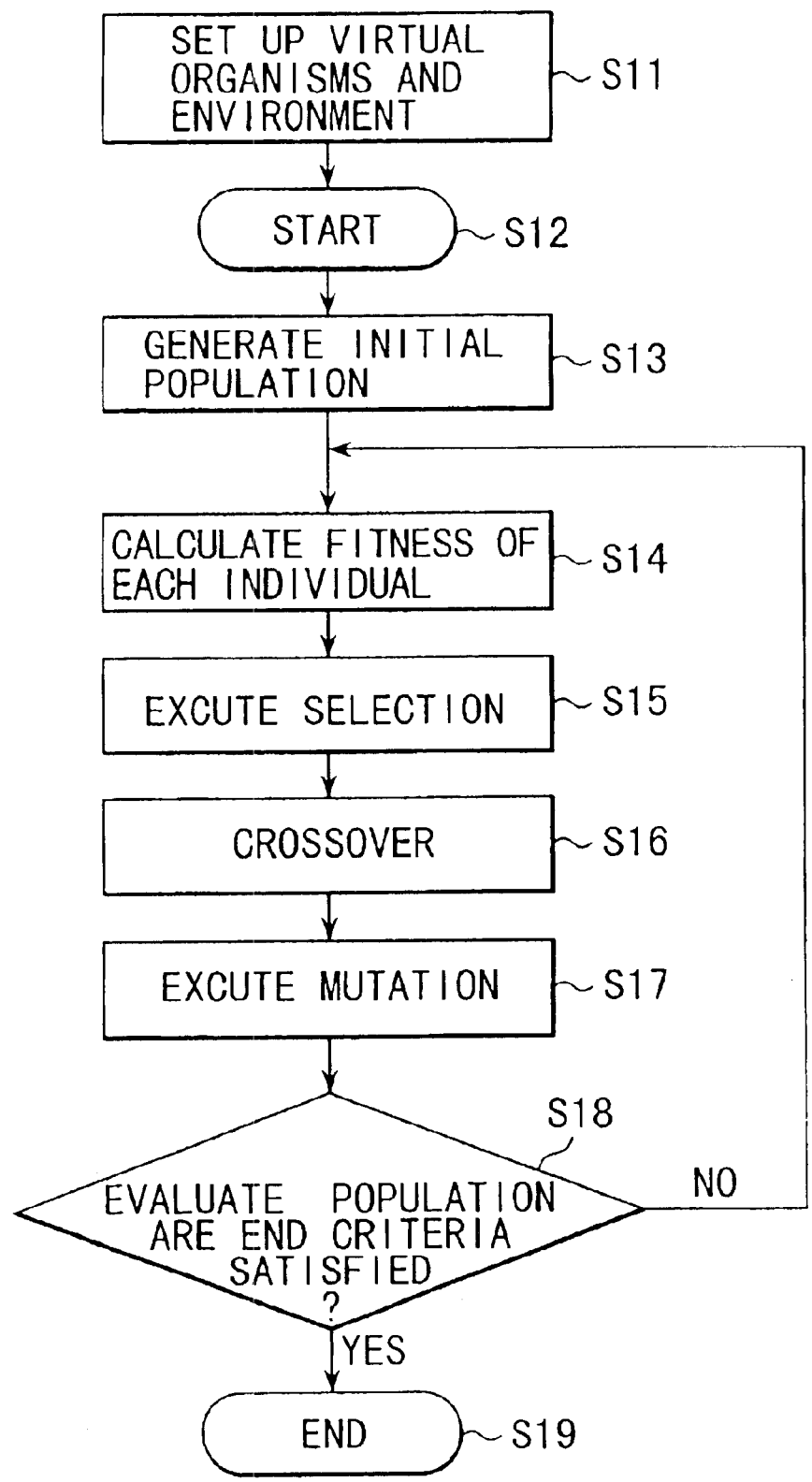
FIG. 18 is a flowchart showing an overview of the sequence of a typical genetic algorithm.
Figure 19:
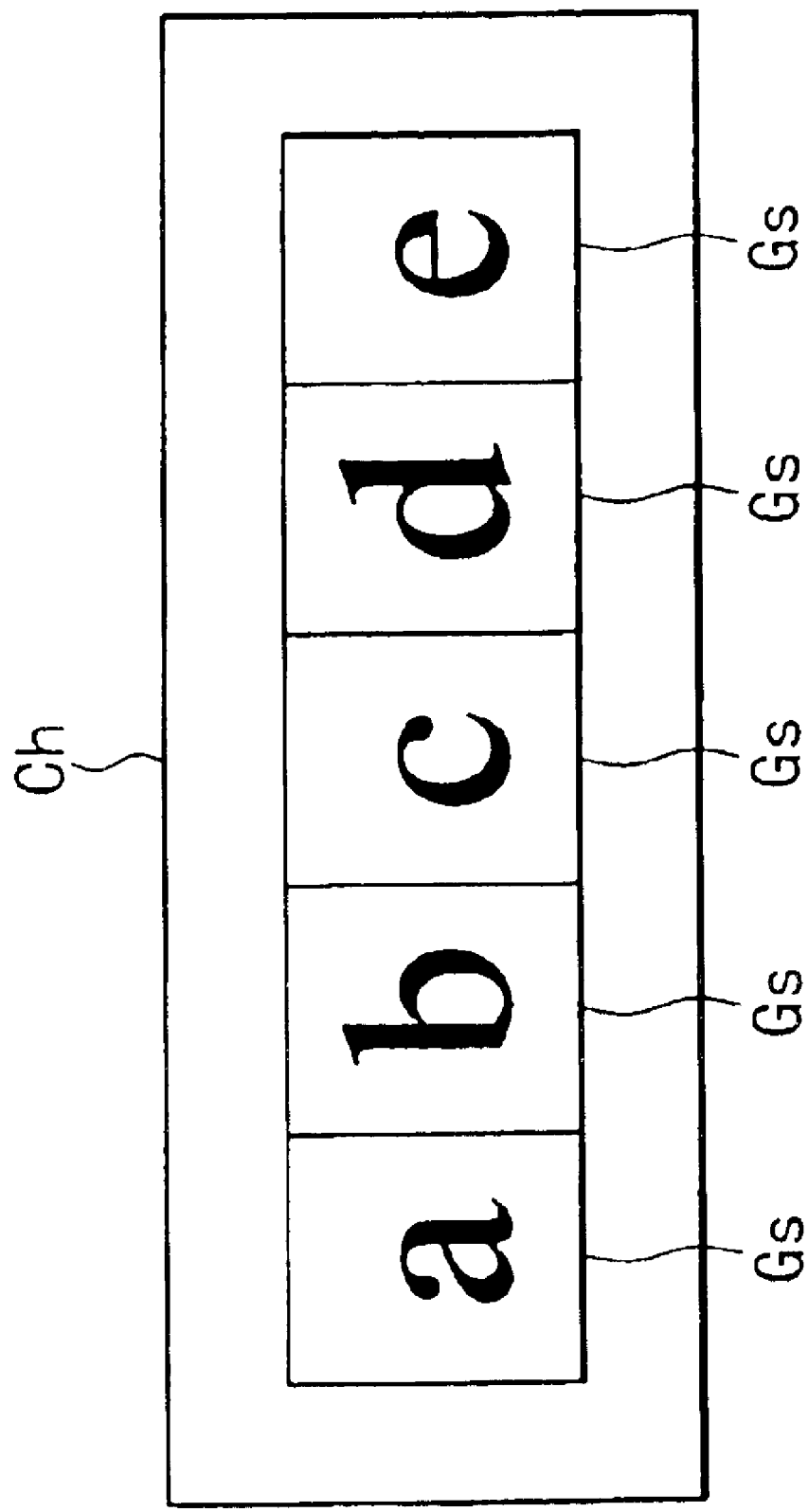
FIG. 19 is an explanatory drawing showing an example of a chromosome used in a genetic algorithm.

FIG. 18 is a flowchart showing the schematic sequence of this genetic algorithm. Here, first in Step S11, the chromosomes of an individual are determined. To wit, here it is decided what data in what form will be transmitted from an individual parent to an individual offspring at the time of a change in generations. FIG. 19 shows an example of a chromosome. Here, the variable vector x in the optimization problem to be solved is represented as a sequence of M symbols $A_i$ (i=1, 2, . . . M), and this is assumed to be a chromosome consisting of M gene loci. Each of the symbols $A_i$ is a gene and the values that they can take are alleles. In FIG. 19, reference symbol Ch indicates the chromosome and Gs, and the number of gene loci M is 5. The alleles can be pairs of certain integers, real numbers within a certain range or a sequence of simple symbols, and these can be determined depending on the problem. In the example of FIG. 19, the letters a through e are the alleles. A set of genes encoded in this manner is the chromosome of an individual.

In the aforementioned Step S11, next is determined the method of calculating the fitness which represents the degree to which each individual is fit for the environment. At this time, this is designed so that the higher the variable or the lower the variable which is the value of the evaluation function for the optimization problem in question, the higher the fitness of the corresponding individual becomes. And in the change of generations to be performed thereafter, the higher the fitness of an individual, the higher its probability of surviving and leaving descendents becomes, when compared to that of individuals with a lower fitness. Conversely, individuals with a low fitness are assumed to be individuals that are not very fit for the environment and die out. This reflects the principle of natural selection in the theory of evolution. To wit, fitness becomes a measure of the degree of superiority of each individual when seen from the aspect of survival probability.

In the genetic algorithm, at the start of the search, the problem to be solved is typically a complete black box so it is completely unknown as to what kind of individual is preferable. For this reason, the initial population is generated randomly using random numbers. Therefore, in the sequence here also, in Step S13 after the processing was started in Step S12, the initial population is generated randomly using random numbers. Note that in the event that there is some foreknowledge regarding the search space, it is possible to generate the organism population centered around the portions wherein the evaluation value is thought to be highest, or other processing may be performed. Here, the total number of individuals to be generated is called the population size.

Next in Step S14, the fitness of each individual within the population is calculated based on the calculation method determined previously in Step S11. Once the fitness of each individual is found, individuals are selected from the population to form the foundation of the next generation. However, if selection were simply performed, the fraction of the individuals within the population that has the highest fitness at the current point in time would simply become larger, and no new search points would be generated. For this reason, the operations called crossover and mutation to be described below are performed.

To wit, in the next Step S16, pairs of two individuals are selected randomly at a stipulated frequency of occurrence from among the individuals of the next generation generated by selection, and their genes are combined (crossed) to create the genes of the offspring. Here, the probability of crossover occurring is called the crossover rate. Individual offspring generated by crossover inherit traits from each of the individuals that were its parents. By means of this process of crossover, the diversity in the individuals' chromosomes is increased and evolution occurs.

After the crossover process, next in Step S17, the genes of an individual are subjected to changes (mutations) at a fixed probability. Here, the probability of mutation occurring is called the mutation rate. The phenomenon of genes being suddenly altered at a low probability is a phenomenon also seen in the genes of actual organisms. However, if the mutation rate is made to be too large, the characteristic of genetic traits being inherited from parents through crossover is lost, so this would be the same as randomly searching through the search space and thus care is needed regarding this point.

Once the population of the next generation is determined by the aforementioned process, next in Step S18, a determination is made as to whether or not the population in the next generation thus generated satisfies the evaluation criteria for ending the search. These end criteria will depend on the problem, but representative types of them include the following.

The maximum fitness of the population is greater than a certain threshold value.

The average fitness of the population is greater than a certain threshold value.

Generations wherein the rate of increase in fitness of the population is below a certain threshold value have continued for longer than a fixed period.

The number of changes in generations has reached a predetermined number.

In the event that one of the aforementioned end criteria is met, processing proceeds to Step S19 and ends. At this time, the individual among the population that exhibits the highest fitness is assumed to be the solution to the optimization problem being found. In the event that the end conditions are not met, processing returns to the process of calculating the fitness of the individuals in Step S14 and the search continues. By repeating the change of generations in this manner, the number of individuals in the population can be maintained constant while the fitness of individuals can be increased. This completes our overview of the genetic algorithm.

Figure 20:
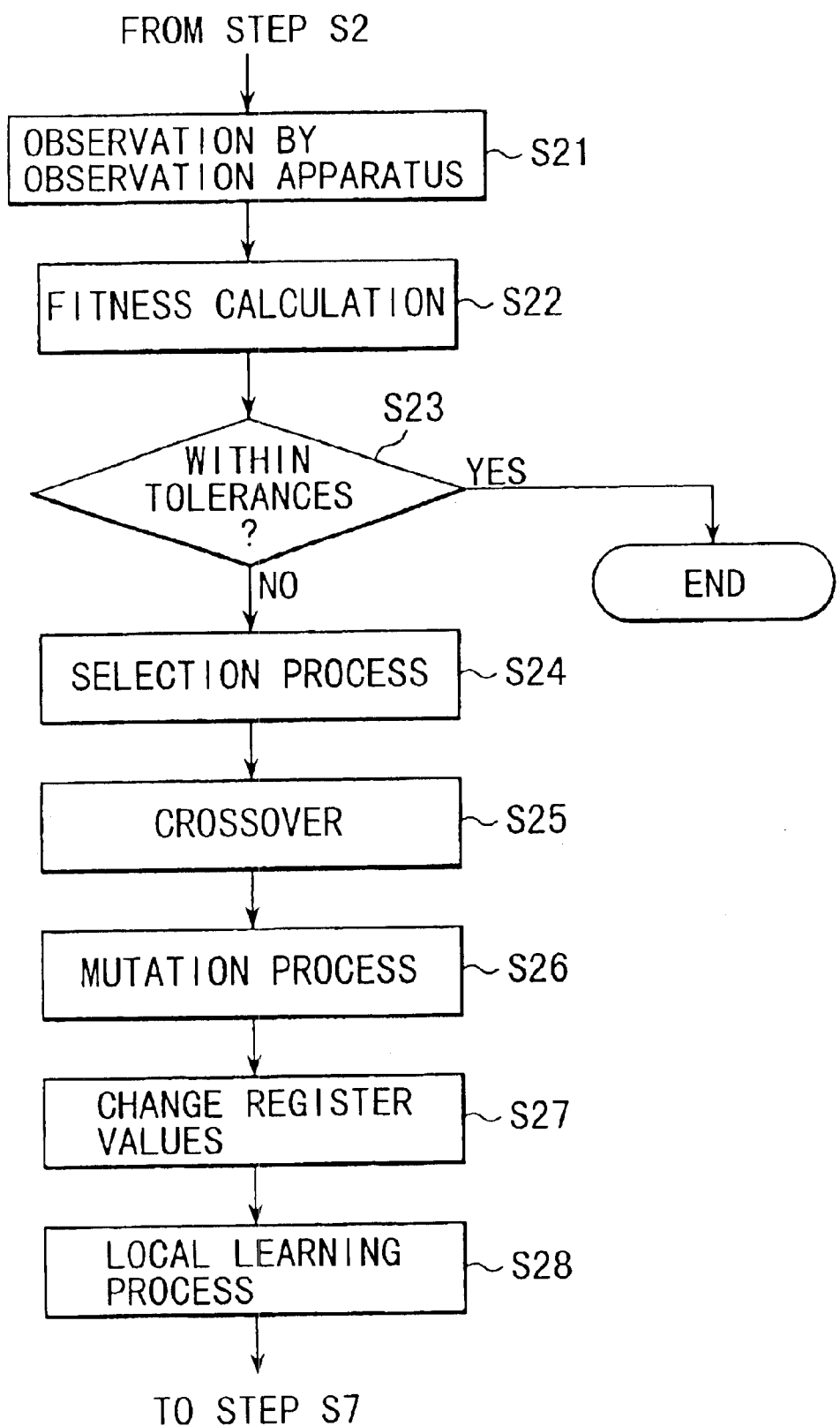
FIG. 20 is a flowchart showing the processing sequence when using a genetic algorithm in the method of the aforementioned embodiment.

The outline of the genetic algorithm presented above is a general one that does not stipulate the details of the actual programming, and it does not stipulate the detailed algorithms for individual problems. For this reason, in order to use a genetic algorithm in the adjustment of the optical apparatus in this embodiment, the following items must be implemented for the adjustment of optical apparatus:

(a) method of representing chromosomes
(b) evaluation function for individuals
(c) method of selection
(d) crossover method
(e) mutation method
(f) search end criteria FIG. 20 is a flowchart that shows the processing sequence of the adjustment apparatus 5 using the genetic algorithm in this embodiment. Note that the process in this FIG. 20 shows the process in Steps S3 through S5 of FIG. 17 in specific detail. A major characteristic of this embodiment is that the register values of the registers 5R are used directly as the chromosomes of the genetic algorithm, and thereby, there is no need for any processing or the like to convert the chromosome information into register values.

This will be described in detail using FIG. 21 as an example. This figure is an example of adjusting the drive apparatus shown in FIGS. 4 and 6, where the registers 5R store values of +4.32, −15.67, +3.47, −9.71, etc. These values, when connected in series, form a chromosome, and in this example, the genes within the chromosome take the values +4.32, −15.67, +3.47, −9.71, etc. The values of the registers 5R correspond to the values of the potentiometers 406 within the drive mechanism 4, so the optical elements 2 are controlled so that the value of the potentiometers 406 become the values indicated in the registers 5R. Since there is a one-to-one correspondence between the values of the potentiometers 406 and the values of the element parameters, there is a one-to-one correspondence between the values of the genes in the genetic algorithm and the values of the element parameters.

As the evaluation function F for individuals in the genetic algorithm used in the process of FIG. 20, a function that expresses how close the light output measured by the observation apparatus 6 is to the ideal output is used and operated after the optical unit is set with the register values that represent the chromosomes of the individuals.

Figure 17:
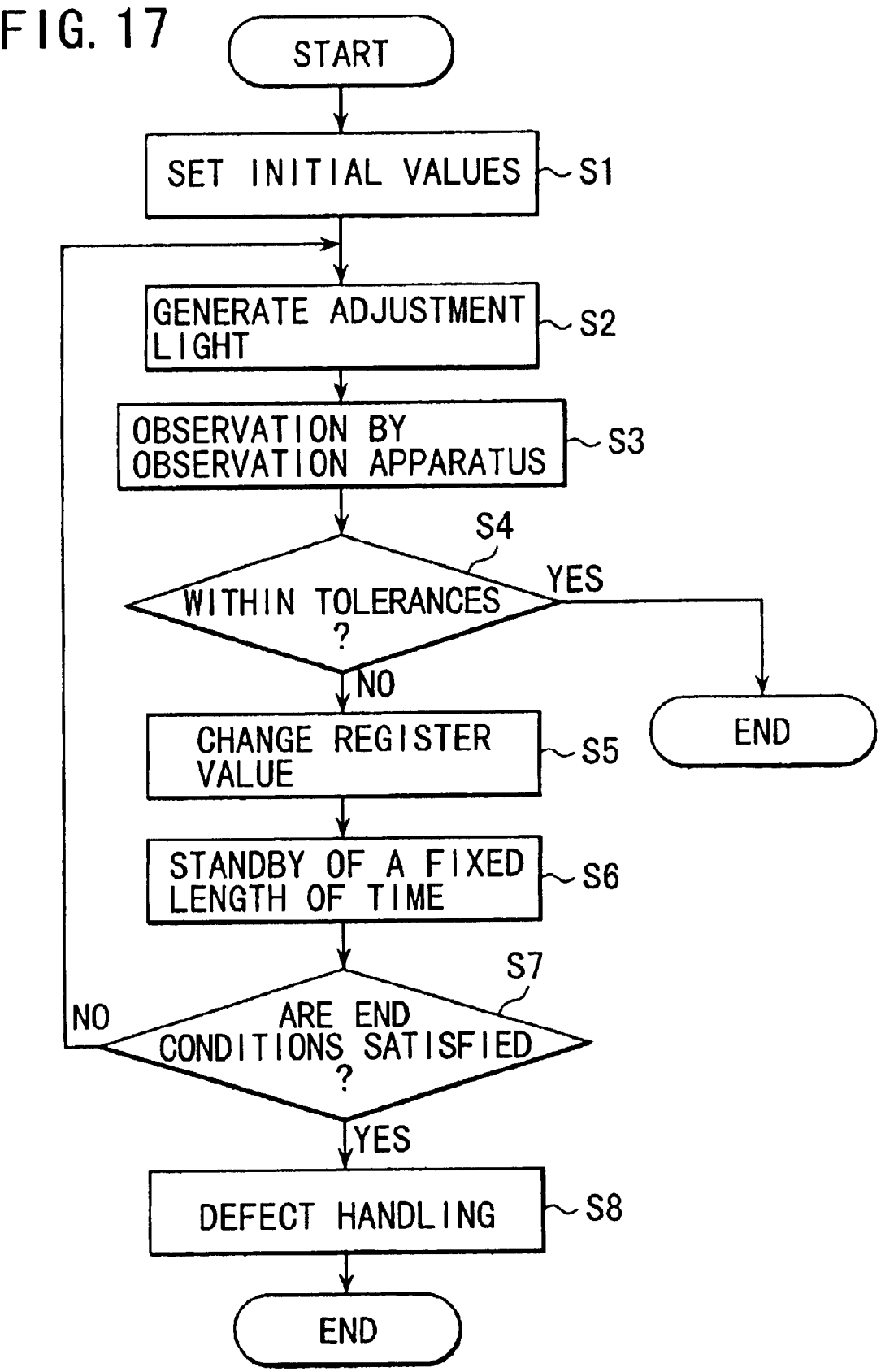
FIG. 17 is a flowchart showing an overview of the sequence of processing in embodiment 1 of the optical apparatus adjustment method of the present invention.

In order to be used in the process shown in FIG. 20, a plurality of individuals is first prepared using uniformly random numbers as the initial population of the genetic algorithm in Step S1 of FIG. 17. To wit, in this case, this means that the value of each gene of each chromosome in the initial population takes a random real-number value between the upper limit and the lower limit. However, in the case that some foreknowledge regarding the error tendencies in the element parameters is present, it is possible to create individuals thought to have a higher fitness as the initial population.

The evaluation function unit 5F uses the aforementioned evaluation function to calculate the fitness from the results of observation sent from the observation apparatus 6. Thereafter, in Step S23 the adjustment algorithm execution unit 5A judges whether or not the performance of the optical apparatus 1 lies within the tolerances that satisfy the stipulated specifications. If not within the tolerances, the selection in Step S24, crossover in Step S25, mutation in Step S26 and the local learning in Steps S27 and S28 (to be described later) are performed to create the population of individuals in the next generation (population of candidates for the solution).

However, if it is judged in Step S23 that the performance of the optical apparatus satisfies the stipulated specifications, the adjustment process ends, but if no chromosomes (register values) that satisfy the specifications are obtained even after performing the adjustment process repeatedly for a fixed number of generations, the optical apparatus subject to adjustment is judged to be defective and it is handled as defective in Step S8 of FIG. 17. Note that in the case that the stipulated specifications state that the evaluation value of the output light intensity or the like is to be increased or decreased as much as possible, the conditions for ending the adjustment process in Step S23 are set to conditions of whether or not the number of generations has exceeded a fixed number, and defect handling is not performed.

Figure 22:
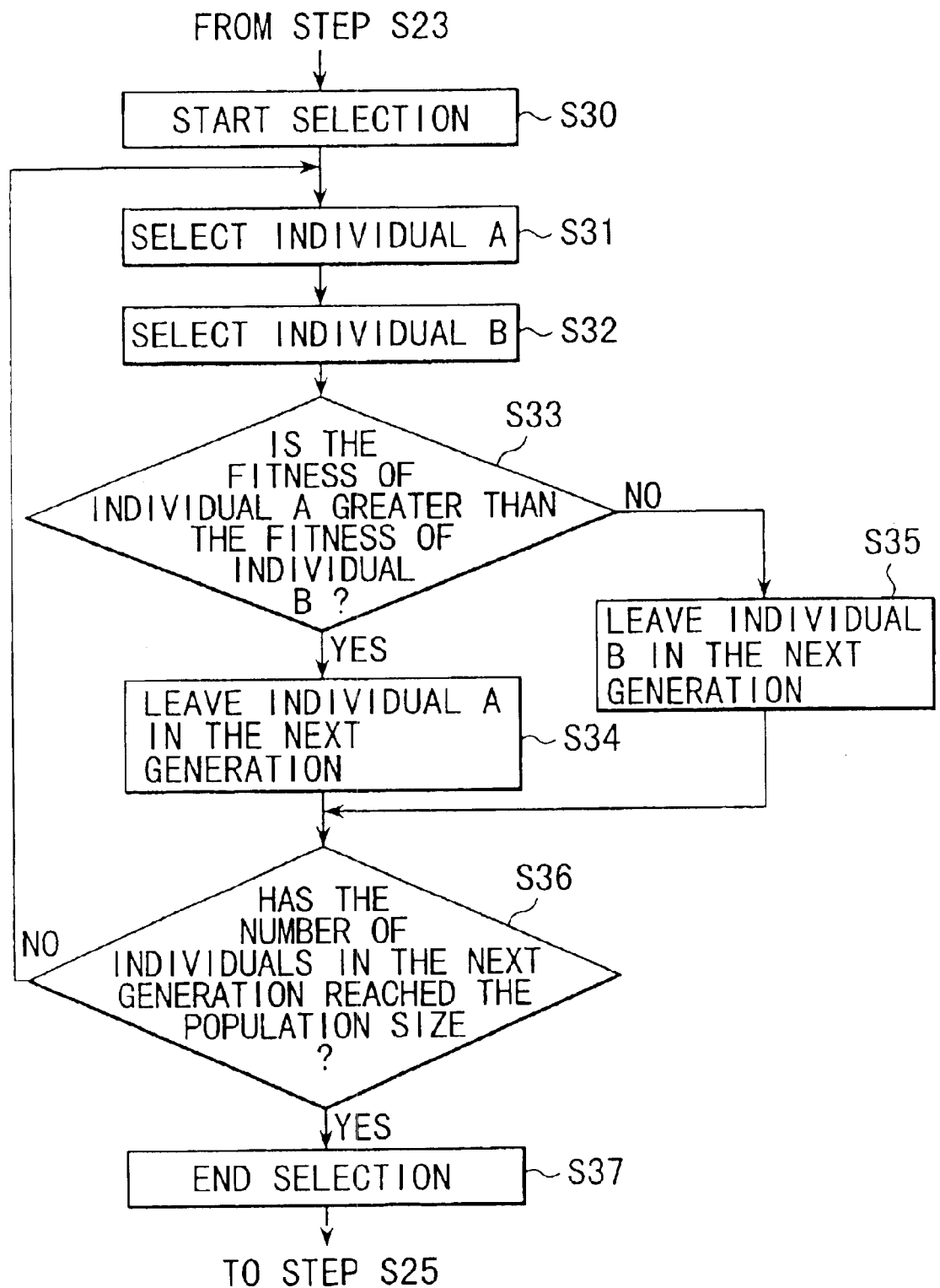
FIG. 22 is a flowchart showing the sequence of the selection process performed in the genetic algorithm in the method of the aforementioned embodiment.

In the aforementioned selection process in Step S24, the method shown in the flowchart of FIG. 22 is used. In this method, first in Steps S31 and S32, two individuals A and B are selected at random from the population, and next in Steps S33–S35 the individual whose fitness value is greater among these two individuals A and B is made to be an individual that will survive into the next generation. Then the operations from Step S31 to Step S36 are repeated until the number of surviving individuals reaches the population size. In this method, individuals with a higher fitness have a higher probability of being selected as the individuals for the next generation, but since the individuals A and B are selected randomly, it is still possible for even individuals with a low fitness to be selected as individuals for the next generation. This is done because if only those individuals with a high fitness are allowed to survive, there is a risk that the convergence of the population will become high and adjustment will fail by being trapped in a local maximum.

Figure 23:
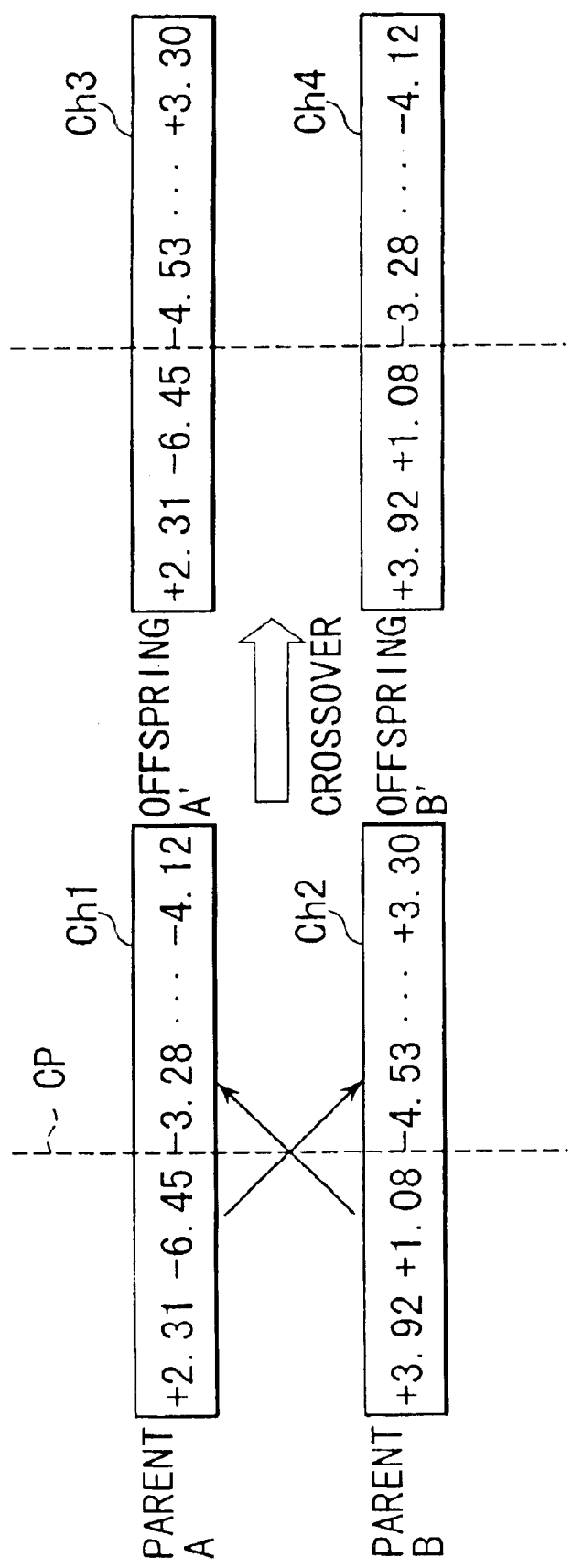
FIG. 23 is an explanatory drawing showing the sequence of the crossover process performed in the genetic algorithm in the method of the aforementioned embodiment.

In the aforementioned crossover process in Step S25, the method shown in the explanatory diagram of FIG. 23 is used. This is an operation wherein the chromosomes are exchanged at random positions—a technique called one-point crossover. In FIG. 23, reference symbols Ch1 and Ch2 denote the chromosomes of parents A and B that survived as a result of selection, and in this crossover process, these chromosomes are cut at a randomly selected crossing point CP. In the example of FIG. 23, the point between the second and third genes from the left is the crossing point. Then, by exchanging the cut partial genotypes, the offspring A' and B' which have the chromosomes Ch3 and Ch4, respectively, are generated and replace the original individuals A and B.

Figure 24:
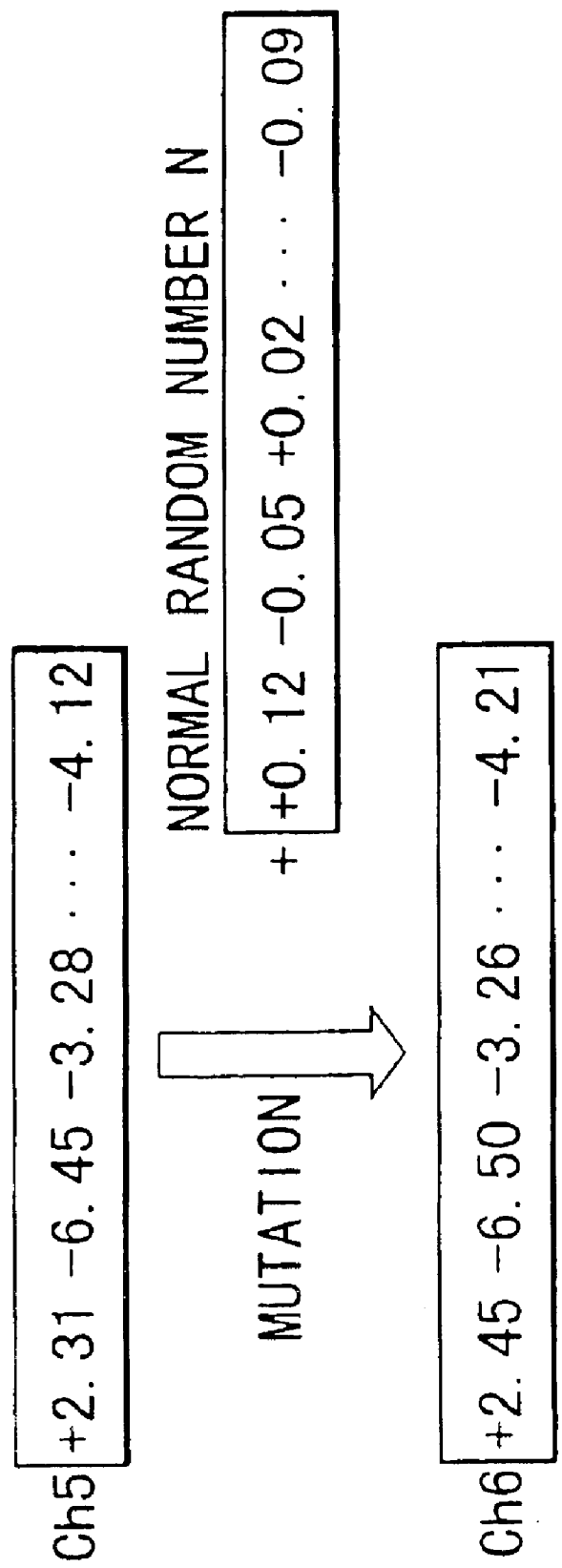
FIG. 24 is an explanatory drawing showing the sequence of the mutation process performed in the genetic algorithm in the method of the aforementioned embodiment.

The aforementioned mutation in Step S26 that is executed after the crossover in Step S25 is an operation that adds to the genes of each chromosome normal random numbers generated according to a Gaussian distribution N(0,). FIG. 24 shows an example of mutation. In this figure, the normal random numbers N generated according to a Gaussian distribution are added to the chromosome Ch5 which is changed to chromosome Ch6.

When the mutation in Step S26 ends, the chromosome values thus obtained are written to the register group 5RG. Thereafter, the drive mechanism controller 5C controls the drive mechanism 4 so that the values of the element parameters become values corresponding to the register values. In the event that there is no drive mechanism controller 5C, control is exerted by the comparator circuit 4C and motor drive circuit 4D within the drive apparatus so that the element parameters become values corresponding to the register values. This control typically takes between 10 and 100 times the amount of time required for the observation apparatus 6 to observe the state of the output light.

To this end, an adjustment method was discovered whereby the observation apparatus 6 can be operated even while this control is being performed so the search can be performed efficiently using these observation values. This method is called local learning and is executed in Steps S27 and S28. In the case that local learning is performed, the adjustment apparatus 5 shown in FIG. 5 is used. Note that in the case that the time required for the observation apparatus 6 to observe the state of the output light is larger than the time required to control the element parameters, this local learning is not performed and only Step S27 is performed.

Figure 25:
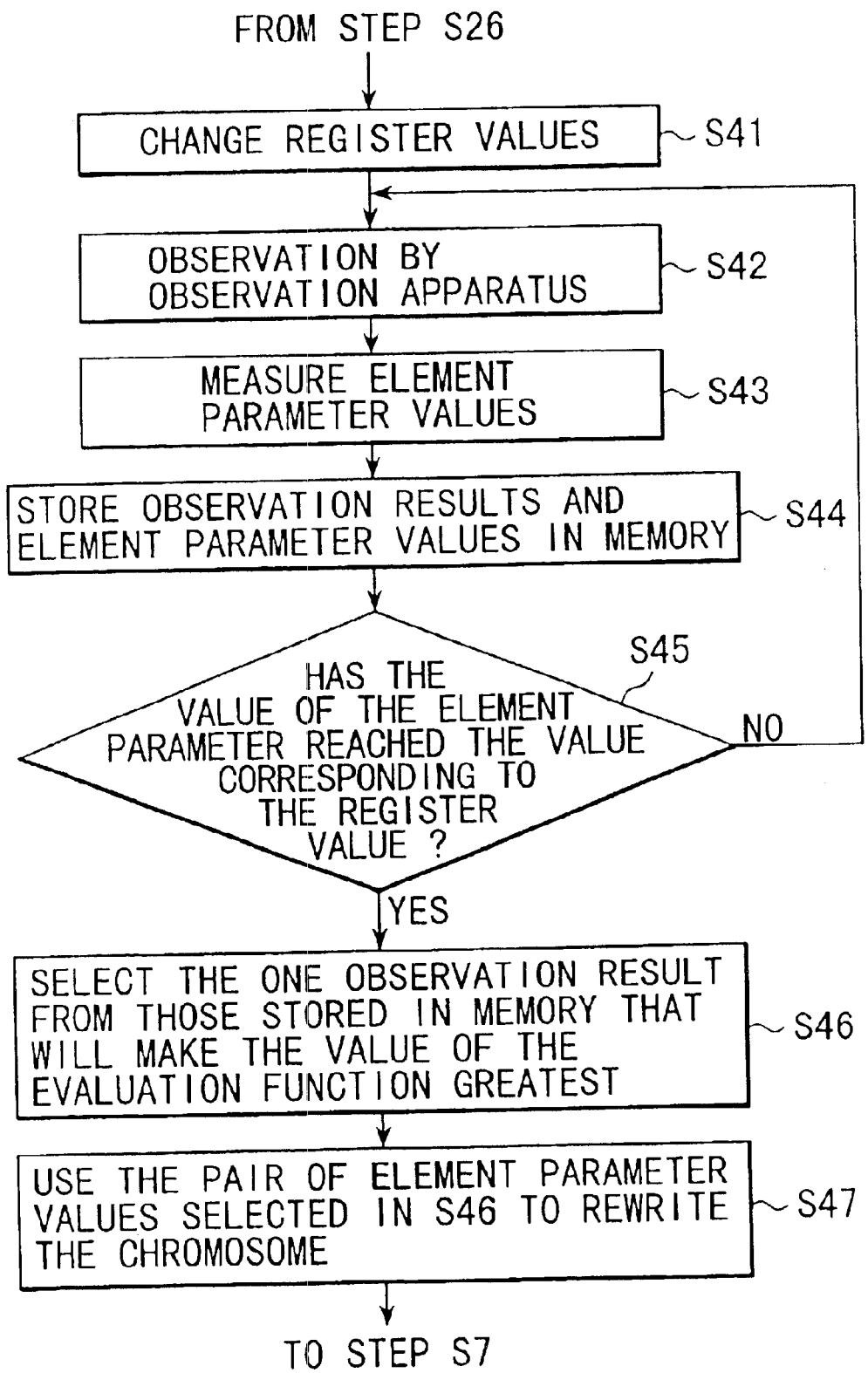
FIG. 25 is a flowchart showing the sequence of the local learning performed in the genetic algorithm in the method of the aforementioned embodiment.

The aforementioned local learning process of Step S28 uses the method shown in the explanatory diagram of FIG. 25. In this method, the register values are changed in Step S41 of FIG. 25 which corresponds to Step S27 of FIG. 20, the drive mechanism controller 5C of FIG. 5 is operated, and the output light of the optical apparatus is observed by the observation apparatus 6 in Step S42, and at the same time, the drive mechanism controller 5C measures the values of the element parameters in Step S43. In Step S44, the drive mechanism controller 5C and evaluation function unit 5F take the observed values of the output light and the values of the element parameters obtained in Steps S42 and S43 and send them to the adjustment algorithm execution unit 5A, and the adjustment algorithm execution unit 5A stores them as pairs in the memory 5M.

The aforementioned Steps S42 through S44 are repeated until the drive mechanism controller SC makes a judgment in Step S45 that the values of the element parameters have reached values corresponding to the register values. In Step S46, once the values of the element parameters are judged to have reached values corresponding to the register values, the adjustment algorithm execution unit 5A selects among the pairs of observed values of the output light and the values of the element parameters stored in the memory 5M and selects the pair wherein the value of the evaluation function F is greatest, namely the local optimal solution. Finally in Step S47, the pair of element parameter values selected in Step S46 is used to find the corresponding register values and replace the chromosome with those values.

An example of operation in the case in which there are two element parameters subject to adjustment in the aforementioned local learning process will be described using FIG. 26. First, the values of the element parameters prior to changing the register values in the aforementioned Step S41 are taken to be (XS, YS). Furthermore, the values of the element parameters corresponding to the register values changed in Step S41 are taken to be (XE, YE). At this time, in the loop from Step S42 to Step S45, the values of the element parameters are gradually changed from (XS, YS) to (XE, YE) by the drive mechanism controller 5C. At this time, in Step S44, a plurality of pairs of the values of the element parameters in the middle of the change and the results of observation corresponding to those values are stored in memory.

Next in Step S46, the pair in which the value of the evaluation function F (fitness) calculated from the results of observation is selected from among the aforementioned pairs of element parameters and observed values stored in memory. In the case of this example, the value of the evaluation function takes the maximum of FM when the element parameters are (XM, YM), so the pair (XM, YM) is selected in Step S46. Lastly in Step S47, the values of the chromosome are rewritten to the values corresponding to the element parameters (XM, YM).

Figure 26:
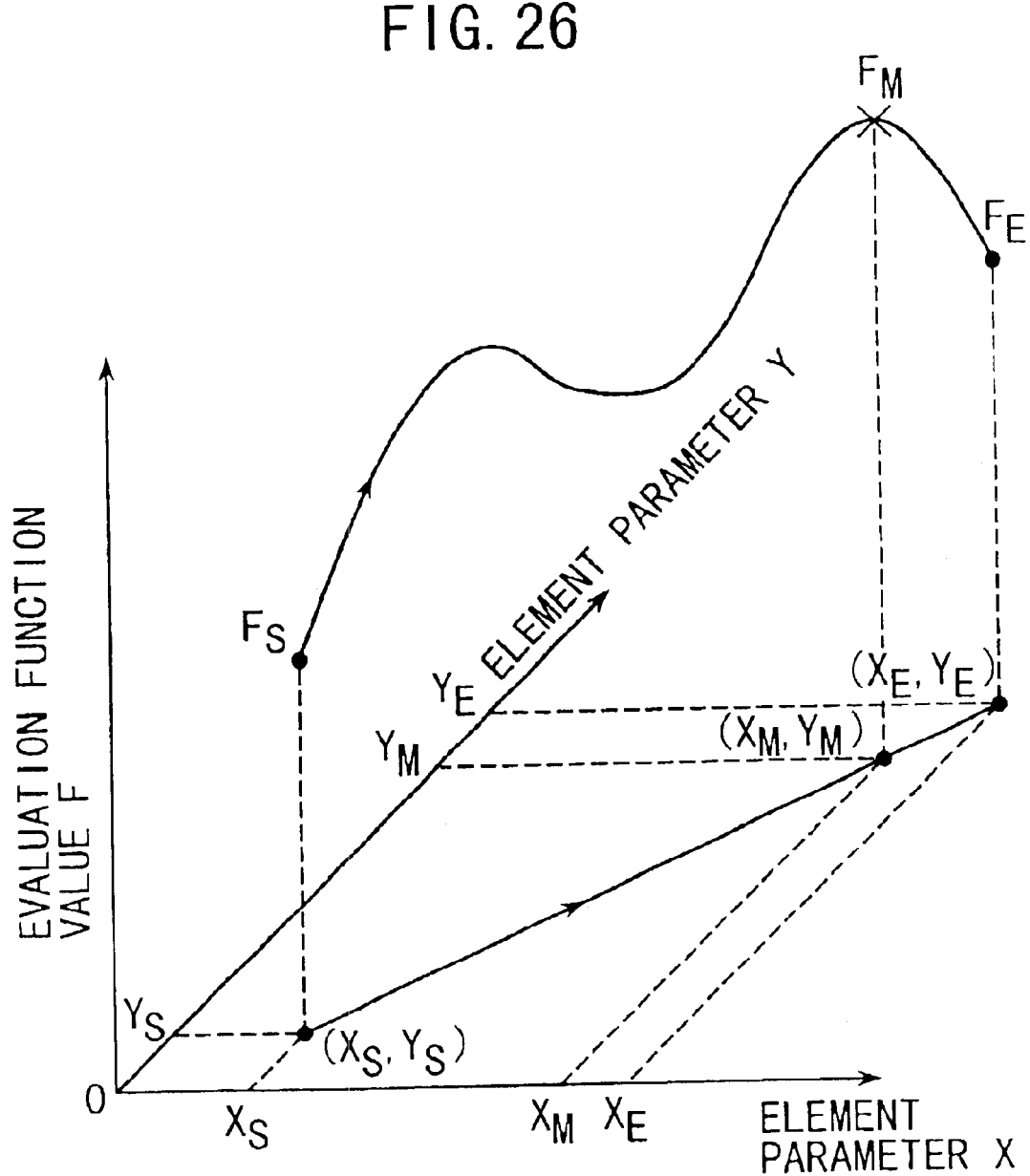
FIG. 26 is an explanatory diagram showing an example of the operation of the aforementioned local learning method.

In the event that local learning is not performed in the case of FIG. 26, searching (observation) is performed only twice, when the element parameters are (XS, YS) and (XE, YE), so the element parameters (XM, YM) that cause the value of the evaluation function to become FM cannot be discovered. However, when local learning is performed, observation is performed even while the element parameters are being changed, so searching is performed at a plurality of element parameters (roughly 10 to 100) other than (XS, YS) and (XM, YM), so (XM, YM) can be discovered. Moreover, since the chromosome is rewritten with the register values corresponding to this (XM, YM), the search efficiency is greatly improved.

As described above, in the optical apparatus of this embodiment, elements 2 with variable element parameters are used, and a search is made for the element parameters of these optical elements 2 that will make the performance of the optical apparatus suitable. Therefore, the optical apparatus can be automatically adjusted so that it satisfies the stipulated specifications without requiring manual adjustment by a skilled technician or high-precision optical elements, and also without requiring a high-precision drive apparatus. This means that higher performance than with the prior art can be obtained using less labor than that required in the case of the prior art.

Next we shall describe an example of one variation of the optical apparatus of embodiment 1 of the present invention. In the previous embodiment, the optical elements 2 to be adjusted are mounted within the optical apparatus, while the adjustment apparatus 5 and observation apparatus 6 are detachably connected to the optical unit 1 as external apparatus. However, in the present invention, functions corresponding to the adjustment apparatus 5 and observation apparatus 6 may be incorporated into the apparatus of optical unit 1.

Figure 27:
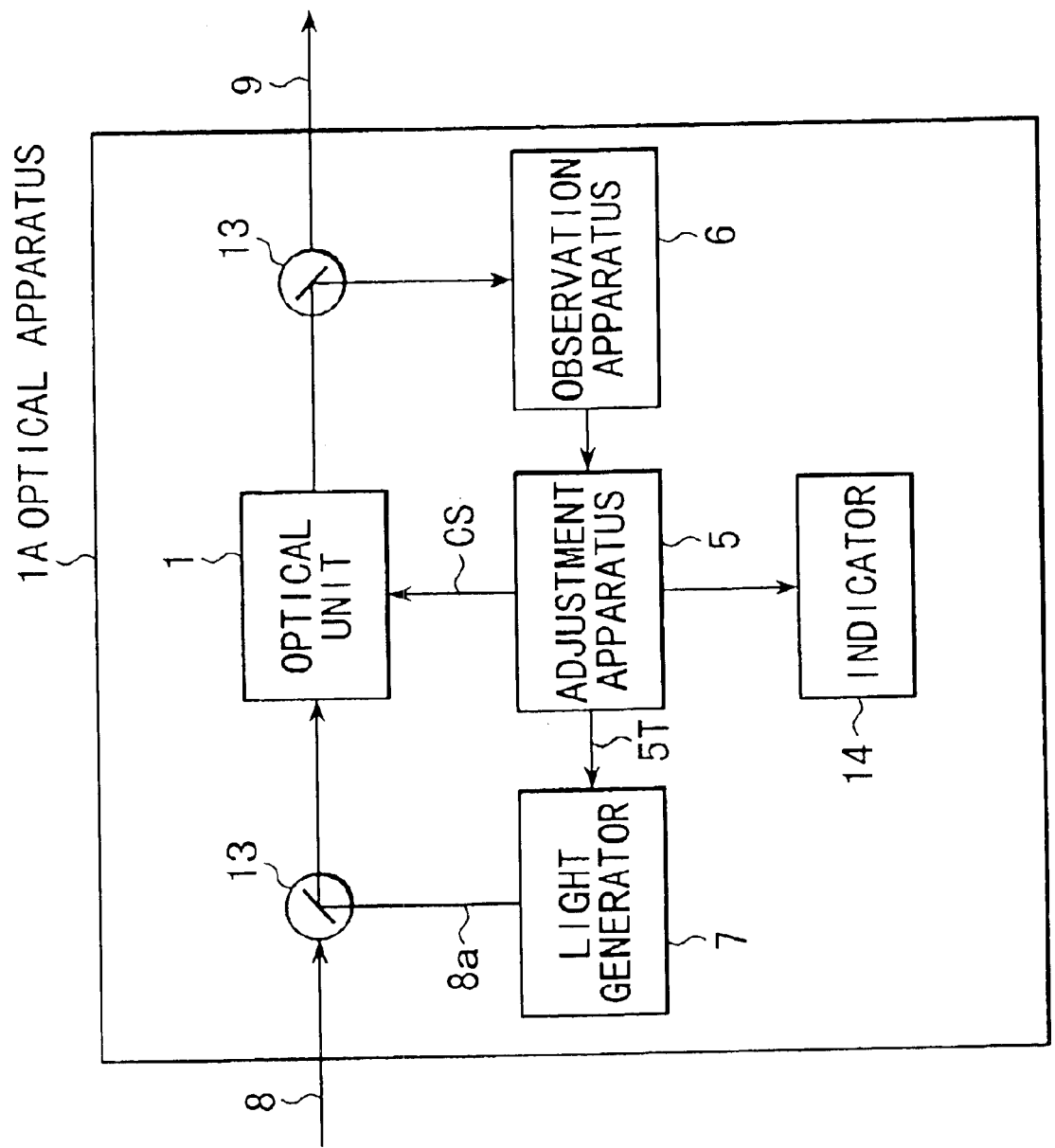
FIG. 27 is a structural diagram showing an example of one variation of the optical apparatus of the aforementioned embodiment.

FIG. 27 shows an example of a variation with such a structure. Here, the functions corresponding to the optical unit 1, adjustment apparatus 5 and observation apparatus 6 are incorporated within the optical apparatus 1A.

To wit, in the example of the optical apparatus of FIG. 27, switching switches 13 that use mirrors are disposed in the light paths of the input light 8 and output light 9 portions of the optical apparatus 1A. These switching switches 13 may be provided within the optical apparatus 1A as in the illustrated example or they may also be provided outside the optical apparatus 1A. Here, when the switching switches 13 are operated, the output light of the optical unit 1 is input to the observation apparatus 6 and the adjustment apparatus 5 and adjustment light generator 7 start operating and the adjustment of setpoints is performed. Once the setting is complete, the switching switches 13 are operated to switch the output light of the optical unit 1 back to the original output light path. Note that in this example, an indicator 14 is provided to give a warning indication in the event that a solution (register values) that satisfies the specifications is not obtained.

By means of this variation, not only can the optical apparatus 1A be adjusted after assembly, but after an end user has purchased a product that incorporates an optical apparatus 1A, the end user can also perform the adjustment of the optical apparatus 1A himself when needed. Thereby, even when changes in the performance and characteristics of an optical apparatus occur when the optical apparatus 1A is moved or transported, or when there are temperature or other changes in the environment where the optical apparatus 1A is installed, it is possible to compensate for those changes or even correct deficiencies in the performance or functions of an optical apparatus due to shifting in the element parameters of optical elements. Note that the switching switches 13 need not be operated manually, but rather a structure wherein they are automatically switched at the time of startup of the optical apparatus 1A is also possible.

In addition, by using the previously mentioned genetic algorithm execution circuit recited in the literature of Kajitani, et al., this variation is also suited to miniaturization.

Furthermore, in this variation, since the end user is able to perform adjustments when needed, the rigidity of the holders for optical elements and the base for the optical unit 1 (optical table) may be lower than conventionally. As a result, additional meritorious effects can be obtained in that the optical unit 1 can be made much lighter, more compact and much less expensively.

Figure 28:
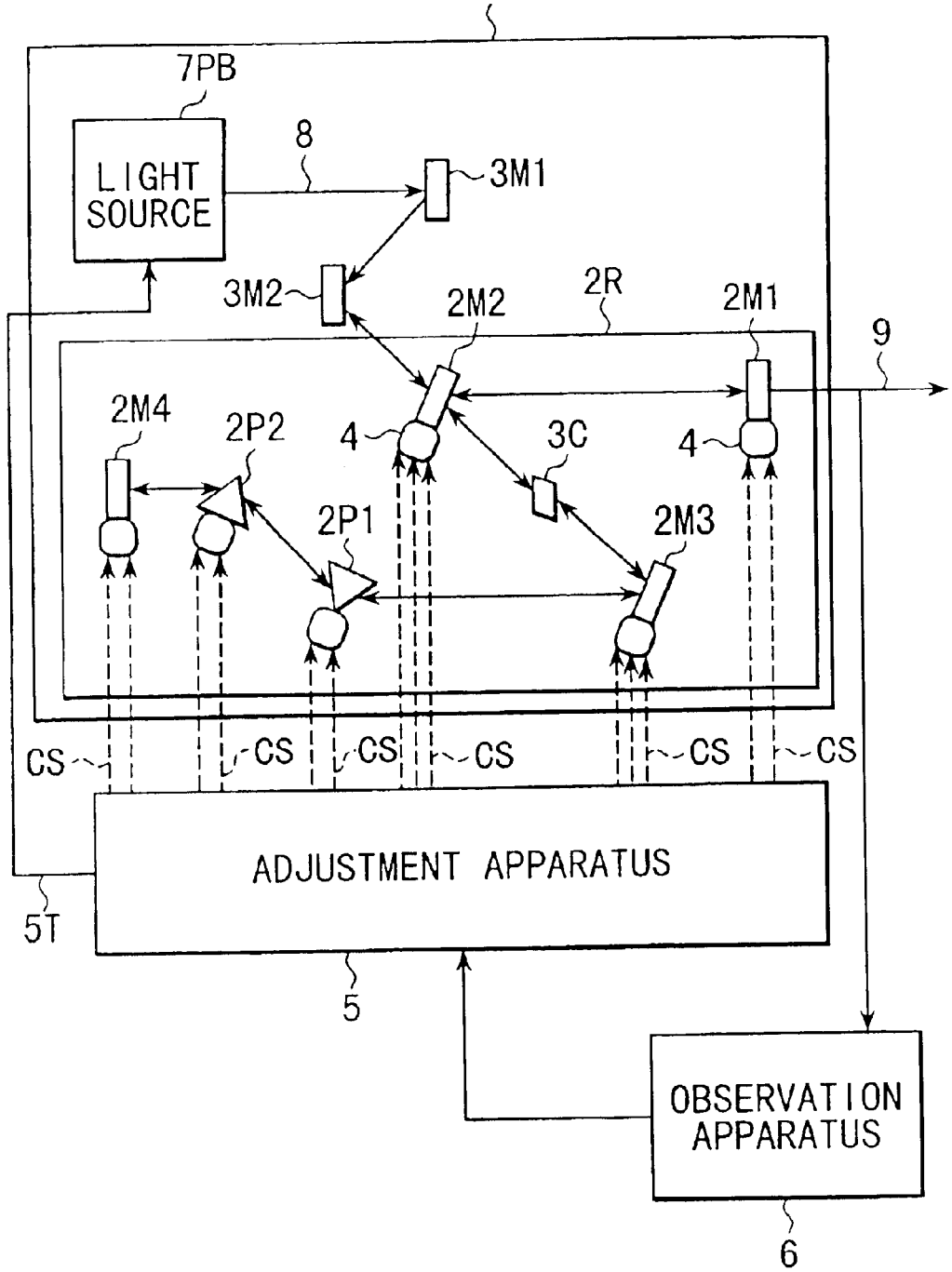
FIG. 28 is an explanatory drawing showing embodiment 2 of the optical apparatus and adjustment method therefor of the present invention.

Next we shall present as embodiment 2 of the optical apparatus of the present invention a structural example of an ultrashort pulse laser apparatus (a laser apparatus wherein the width of the light pulses generated is from the femtosecond range to 10 picoseconds). FIG. 28 is a structural diagram showing an example of an ultrashort pulse laser apparatus as embodiment 2 of the optical apparatus of the present invention.

An ultrashort pulse laser apparatus is characterized by generating light pulses with an extremely short pulse width in the femtosecond range, and also having an extremely large peak value in the intensity of the light pulses, and for this reason, ultrashort pulse laser apparatus is not only the representative measurement technology in ultra-fast sampling measurement technology, but it is also very useful in optical communications technology, medical technology and machining technology.

An ultrashort pulse laser apparatus consists of an excitation light source, optical crystal, resonator (cavity) and the plurality of mirrors and prisms and other optical elements that make them up are the main constituent elements of this laser apparatus. Moreover, the functions of an ultrashort pulse laser apparatus mean that preferably the intensity of the light pulses should be as high as possible, the pulse width should be as short as possible, the peak value of the light pulse intensity should be as high as possible, and moreover, the intensity of the excitation light required should be as low as possible.

In the ultrashort pulse laser apparatus actually manufactured, because of limits in the precision of machining and assembly in the manufacturing process, vibration and shock during movement and transportation, and errors in the position and orientation (parameters) of the optical elements arising from design errors and the like, the operation of the optical elements is no longer perfect, and as a result the intensity of the light pulses drops, the pulse width becomes longer, the peak value of the intensity of the light pulses drops, and the intensity of the excitation light required becomes higher and thus drops in functioning occur.

To solve this problem, in this embodiment 2, the parameters of a plurality of the optical elements among the optical elements that constitute the ultrashort pulse laser apparatus are made variable, and adjustment is performed using the genetic algorithm so that the functioning of this laser is improved. FIG. 28 shows the structure of the ultrashort pulse laser apparatus of this embodiment 2, and this ultrashort pulse laser apparatus (hereinafter called the "laser apparatus") 1L is equivalent to the optical unit 1 in embodiment 1. Note that those components with the same reference symbols as on FIG. 1 are the same or equivalent items.

FIG. 28 is a structural example of an ultrashort pulse laser apparatus to which the optical unit of the present invention is applied, and in this embodiment, the adjustment apparatus 5 and observation apparatus 6 are external apparatus. In the laser apparatus reference symbols 1L, 2M1 through 2M4 denote variable-parameter mirrors as optical elements whose parameters are changed depending on the values indicated by control signals CS, while reference symbols 2P1 and 2P2 denote variable-parameter prisms that are similarly optical elements whose parameters are changed depending on the values indicated by control signals CS. Reference symbols 3M1 and 3M2 denote mirrors that are optical elements not adjusted by the method of the present invention, while symbol 3C denotes an optical crystal (laser crystal) as an optical element not adjusted by the method of the present invention.

Reference symbol 7PB denotes the light source (excitation light source) that generates excitation light for the laser apparatus, and the excitation light source 7PB corresponds to the adjustment light generator in embodiment 1 (FIG. 1), having a structure such that it is built into the optical apparatus subject to adjustment, namely the laser apparatus 1L. The portion including the optical crystal 3C and between the mirrors 2M1 and 2M4 constitutes the resonator (cavity) through which light travels back and forth between 2M1 and 2M4. This resonator is called 2R. This resonator 2R is adjusted by the method of the present invention as described later.

In addition, in FIG. 28, reference numeral 4 denotes drive mechanisms and these drive mechanisms 4 take digital values stored in the registers 5R as storage circuits and supply electrical signals corresponding to these digital values to the optical elements 2M1 through 2M2 and 2P1 and 2P2 as the control signal CS. Here, the drive mechanisms 4 and registers 5R are provided in the same number as the number of adjustment locations (14 in the structure of FIG. 28).

These drive mechanisms 4 can use the same structure as that shown in FIGS. 4–7 used in embodiment 1. The parameters of each of the adjustment locations are adjusted by the motor 405 rotating so that the value indicated by the potentiometer 406 according to the 32-bit data of the registers 5R becomes a value corresponding to that data, so the position or orientation of the optical elements 2 changes.

In FIG. 28, reference numeral 8 denotes the excitation light generated by the excitation light source while numeral 9 denotes the output light from the laser apparatus 1L. Reference numeral 6 denotes an apparatus that observes the output light 9 of the laser apparatus 1L and provides output of the results of calculating the light intensity, pulse intensity or other quantities related to the pulse intensity (e.g., the current value induced by two-photon absorption by laser pulse light), or combinations thereof.

Moreover, reference numeral 5 denotes an adjustment apparatus that uses the same method as that described in embodiment 1 according to the genetic algorithm to search for optimal values as the values stored in a plurality of registers 5R.

The aforementioned mirror 2M1 is a planar mirror that reflects a portion of the light incident on this mirror and transmits the remainder of the light not reflected. The aforementioned mirror 2M2 is a concave mirror that reflects and focuses a portion of the light incident on the concave side. In addition, it transmits a portion of the light incident on its back surface. The aforementioned mirror 2M3 is a concave mirror that reflects and focuses a portion of the light incident on the concave side. The aforementioned mirror 2M4 is a planar mirror that reflects a portion of the light incident on this mirror. The aforementioned prisms 2P1 and 2P2 use the refraction of light to bend the light path of light at an angle dependent on its wavelength. Mirrors 2M1 through 2M2 and the prisms 2P1 and 2P2 are disposed on the stages 402 of FIGS. 4 through 7 such that their positions and orientation can be controlled by a drive mechanism 4.

The aforementioned mirrors 3M1 and 3M2 are planar mirrors that reflect the light incident on these mirrors. The aforementioned optical crystal 3C is a crystal of sapphire to which titanium is added, serving to absorb and accumulate energy from the incident light and amplify light by means of the phenomenon of stimulated emission. While the position and orientation of the mirrors and optical crystal may need to be adjusted at the time of assembly of the laser 1 to obtain the appropriate light path, in this embodiment, they need not be adjusted by the adjustment method of the present invention.

These mirrors 2M1 through 2M4 and the prisms 2P1 and 2P2 are the optical elements that are adjusted by the method of the present invention, and the parameters of the optical elements, namely their position and orientation or orientation, are varied depending on the value of the value indicated by the control signal CS. Thereby, the characteristics of the resonator 2R change and the characteristics of the laser change.

Figure 29:
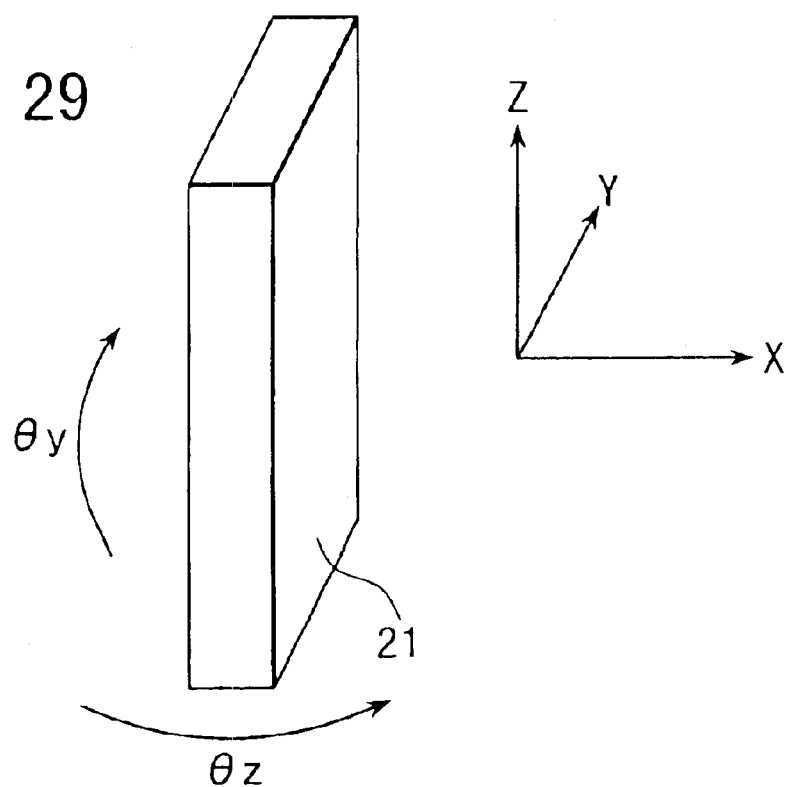
FIG. 29 is an explanatory drawing showing the position and orientation of the optical elements used in the optical apparatus of the aforementioned embodiment.

We will now use drawings to describe the aforementioned adjustment of the position and orientation of the optical elements. FIG. 29 represents an optical element as a plate for convenience, where reference numeral 21 denotes this adjustable optical element. Here, for convenience the axis to be the reference for the optical element 21 is called the x-axis, defined as follows. To wit, if the optical element 21 is a mirror, the x-axis falls along a line passing through the center of the mirror and perpendicular to its surface. If the optical element 21 is a convex mirror, the x-axis falls along a line connecting the center of the convex mirror and its focus. If the optical element 21 is a prism, the x-axis falls along a line that is the center of the average light path through the prism. In addition, for convenience another axis of the optical element 21 is called the y-axis, defined as follows. To wit, if the optical element 21 is a prism, the y-axis falls along a line in the plane formed by the light path of the incident light and the light path of the outgoing light, perpendicular to said x-axis. If the optical element 21 is a mirror or concave mirror, the y-axis falls along any one line perpendicular to the x-axis. Furthermore, a line perpendicular to both said x-axis and said y-axis is defined to be the z-axis. The definition of the direction of the sign (positive direction) of the x-axis, y-axis and z-axis is arbitrary. Here, when the position of the optical element 21 is changed by the drive mechanism 4, the displacement along the x-axis is defined to be x, the displacement along the y-axis is y and the displacement along the z-axis is z.

Regarding the orientation of the optical element 21, when the optical element 21 is rotated by the drive mechanism 4 by an angle of $\theta_y$, around a line parallel to the y-axis, for convenience this is called rotation in the y-axis. Similarly, rotation by an angle of $\theta_z$ around a line parallel to the z-axis is called rotation in the z-axis for convenience.

In this embodiment also, the position and/or orientation of the optical element 21 can be changed by the drive mechanism 4 by adopting the method of embodiment 1 shown in FIGS. 4 through 7. Table 1 shows the type of adjustment and the parameters for each of the adjusted optical elements.

TABLE 1

| Optical element | Type of adjustment | Adjusted parameters |
|---|---|---|
| 2M1 | Rotation in y-axis, rotation in z-axis | $\theta_y$, $\theta_z$ |
| 2M2 | Displacement in x-axis, rotation in y-axis, rotation in z-axis | x, $\theta_y$, $\theta_z$ |
| 2M3 | Displacement in x-axis, rotation in y-axis, rotation in z-axis | x, $\theta_y$, $\theta_z$ |
| 2M4 | Rotation in y-axis, rotation in z-axis | $\theta_y$, $\theta_z$ |
| 2P1 | Displacement in y-axis, rotation in z-axis | y, $\theta_z$ |
| 2P2 | Displacement in y-axis, rotation in z-axis | y, $\theta_z$ |

The drive mechanism 4 applied to the aforementioned optical elements and the structure of this optical apparatus may specifically have the following structure, for example. Mirrors 2M1 and 2M4 each have a structure wherein it is mounted to the stage 402 of a drive mechanism having the structure shown in FIG. 7. Mirrors 2M2 and 2M3 have a combination of the structure shown in FIG. 4 and the structure shown in FIG. 7, where the stage in FIG. 4 has the structure of the drive mechanism of the base not shown in FIG. 7, with this mirror mounted to the stage 402 of FIG. 7. Prisms 2P1 and 2P2 each has a combination of the structure shown in FIG. 4 and the structure shown in FIG. 6, with this prism mounted to the stage 402 of FIG. 6 where the stage in FIG. 4 has the structure of the drive mechanism of the base 401 in FIG. 6.

The excitation light source 7PB may be a laser apparatus which uses a crystal of yttrium orthovanadate (YVO4) and continuously generates light with a wavelength of 530 nm.

The light generated by the excitation light source 7PB is reflected by mirrors 3M1 and 3M2 and a portion of that light passes through mirror 2M2 to irradiate the optical crystal 3C. The optical crystal 3C absorbs and accumulates the energy of the radiant light and emits light RL of a wavelength different than that of the radiant light in the direction of the mirror 2M2 and the direction of the mirror 2M3. In the resonator 2R consisting of mirrors 2M1 through 2M4, prisms 2P1 and 2P2 and the optical crystal 3C, this light RL travels back and forth between the mirrors 2M1 and 2M4 which form either end of the resonator at a time period determined by the length of the light path. The laser oscillation is obtained from this back-and-forth motion of light. Since a portion of the light passes through mirror 2M1, the output light 9 is obtained.

The position and orientation of the aforementioned optical elements should ideally exactly match their position and orientation in the design of the laser apparatus, and at this time, the characteristics of the laser apparatus become good (e.g., the state wherein the intensity of the output light from this laser apparatus is high, its pulse width is short, the peak intensity of the pulse is high and the intensity of the excitation light required is low).

However, in an ultrashort pulse laser apparatus actually manufactured, because of limits in the precision of machining and assembly in the manufacturing process, vibration and shock during movement and transportation, and errors in the position and orientation (parameters) of the optical elements arising from design errors and the like, the operation of the optical elements is no longer perfect, and as a result the performance of the laser apparatus drops.

To solve this problem, in the laser apparatus 1L of this embodiment, by adjusting the position and orientation (parameters) of the mirrors 2M1 through 2M4 and the prisms 2P1 and 2P2 which are the constituent elements of the resonator 2R, the performance of the laser apparatus can be brought to the high state, namely, the intensity of the light pulses is high, the pulse width is low, the peak value of intensity is high, and the intensity of the excitation light required becomes low.

Here follows a description of embodiment 2 of the adjustment method of the present invention when applied to the laser apparatus 1L of this embodiment shown in FIG. 28. For convenience, here we shall describe an example wherein the performance desired of the laser apparatus is that the intensity of the light pulses be high.

One example of the specifications required of this laser apparatus 1L is as follows.
(1) The average power of the output light is to be 250 mW or greater when the power of the excitation light is 3 W.
(2) The average power of the output light is to be as large as possible.

The performance of this laser apparatus 1L can be represented by the evaluation function F which takes as arguments the element parameters of a plurality of optical elements, 2M1 through 2M4 and 2P1 and 2P2. Making the performance of the laser apparatus 1L as high as possible is equivalent to finding the parameter values that optimize the evaluation function F.

In this embodiment, the number of optical elements 2 to be adjusted is many at six, so the number of element parameters to be adjusted becomes 14 and thus this is a case in which a combinatorial explosion is expected to occur, so the adjustment apparatus 5 changes the values of the register group 5RG according to the genetic algorithm using the evaluation function F.

The adjustment of the optical elements within the laser cavity is performed according to the flowcharts shown in FIGS. 17 and 20 as in the case of embodiment 1. A major characteristic of this embodiment is that the values of the register group 5RG are used directly as the chromosomes of the genetic algorithm. Thereby, there is no need for any processing or the like to convert the chromosome information into register values.

Figure 21:
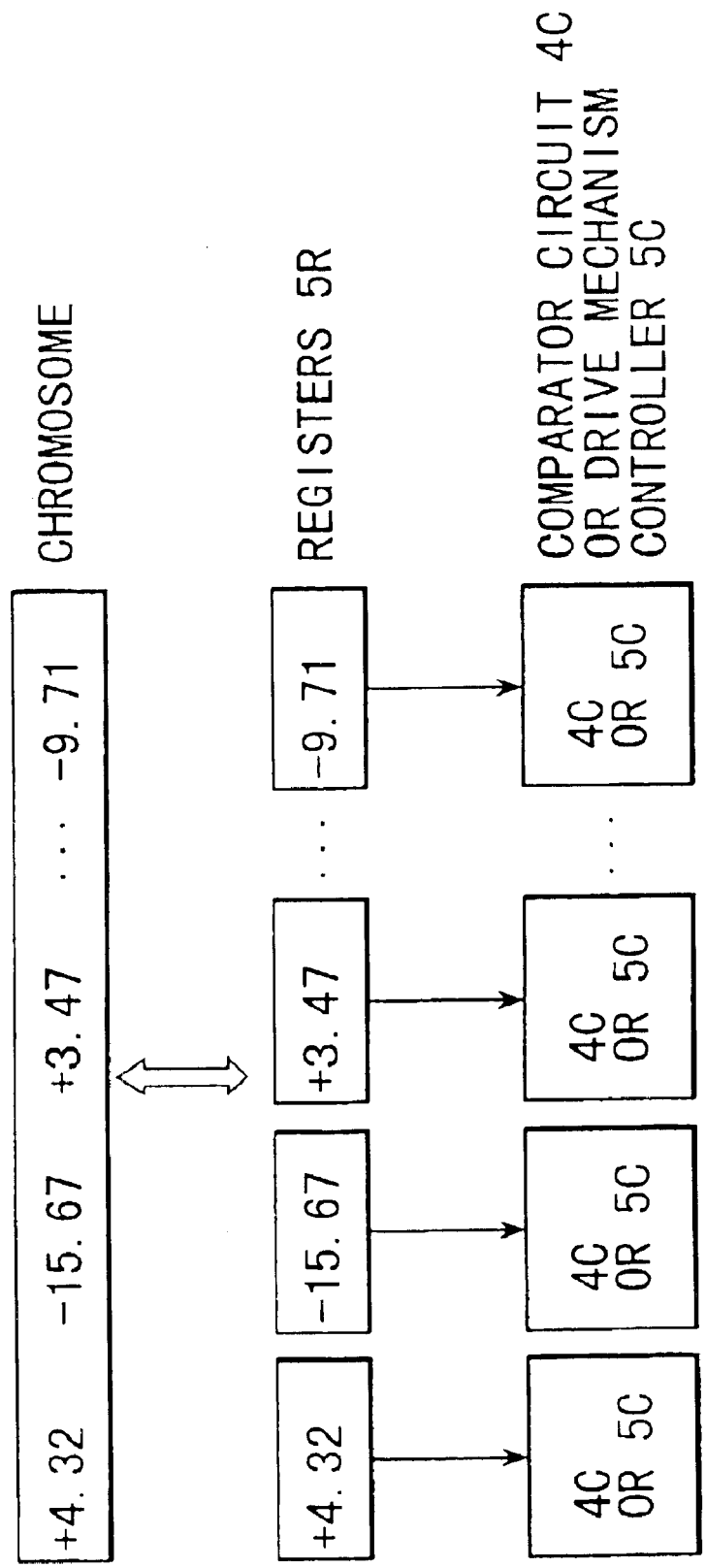
FIG. 21 is an explanatory drawing showing the chromosome used in the genetic algorithm in the method of the aforementioned embodiment.

To wit, as shown in FIG. 21, the chromosomes in this embodiment consist of the register values of 14 registers 5R corresponding to 14 element parameter values. Moreover the registers 5R corresponding to the element parameters hold 32-bit floating-point numeric values. Thus the register length (=chromosome length) is 448 bits. Therefore the size of the adjustment search space for optical apparatus 1 in this embodiment is $2^{448} \approx 10^{135}$ (10 to the power of 135), so it need not be said that adjustment using a full search would be impossible.

The upper and lower limits of each register value are determined depending on the precision of the manual rough adjustment at the time of the initial settings, and also depend on the movement range and rotation range determined by the amount of motion or amount of rotation of the optical elements 2 required after rough adjustment. The upper and lower limits of these register values may also become narrower in width as the adjustment by the adjustment apparatus 5 advances. In addition, in the event that the register values obtained in the process of adjustment by the adjustment apparatus 5 are frequently equal to the upper or lower limit, the width of the lower or upper limits may be widened even in the middle of adjustment. Note that in this embodiment, the upper and lower limits for the register values are set to +32.0 and −32.0 from the initial settings, respectively.

As the evaluation function F for individuals in the genetic algorithm used in the process of FIG. 20, a function that expresses how close the light output measured by the observation apparatus 6 is to the ideal output is used and operated after the optical unit is set with the register values that represent the chromosomes of the individuals. Specifically, in an experimental example of this embodiment, a power meter was used as the observation apparatus and the average value of the observed power was used as the fitness of the individual.

The aforementioned evaluation function F is set so that the greater the average power output from the laser apparatus 1L the closer it is to the ideal. For example, if the power of the light output of an optical apparatus set in the register values which represent a certain chromosome is 6.8 mW, then the value of the evaluation function F at that time becomes 6.8.

In order to be used in the process shown in FIG. 20, a plurality of individuals is first prepared using uniformly random numbers as the initial population of the genetic algorithm in Step S1 of FIG. 17. To wit, in this case, this means that the value of each gene of each chromosome in the initial population takes a random real-number value between the upper limit and the lower limit. In this embodiment, the number of individuals in the population was 50.

Thereafter, the laser apparatus 1L is operated with the register values that represent the individuals, and in Step S4 the adjustment apparatus 5 uses the aforementioned evaluation function to calculate the fitness from the results of observation by the observation apparatus 6 from Step S3. Thereafter, the selection in Step S24, crossover in Step S25, mutation in Step S26 and the local learning in Step S28 are performed to create the population of individuals in the next generation (population of candidates for the solution). In this embodiment, 0.5 was used as the crossover rate which is the ratio of the number of crossed individuals to the total number of individuals, and 3.0 was used as the of the Gaussian distribution of normal random numbers added at the time of mutation.

In Step S4, a judgment is made as to whether or not the performance of the laser apparatus 1L satisfies the stipulated specifications as described above, and if the stipulated specifications are satisfied, the adjustment process ends. In addition, if no chromosomes (register values) that satisfy the specifications are obtained even after performing the adjustment process repeatedly for a fixed number of generations, the laser apparatus 1L subject to adjustment is judged to be defective and it is handled as defective in Step S8. Note that the number of generations after which repetition is halted was set to 30 in this embodiment.

Here follows the experimental results in the case when the laser apparatus 1L shown in FIG. 28 (specifically the laser cavity 2R within its optical apparatus 1) was adjusted with the adjustment method using the genetic algorithm of this embodiment. In this experiment, the adjustment light was light from a YVO4 laser with a power of 3.0 W and wavelength of 530 nm, and the output light which passed through a planar coupler with a transmittance of 2.0% was observed with a power meter. This power meter corresponds to the observation apparatus 6 and its results of observation are proportional to the average intensity of the output light from the laser apparatus 1L, so this value is used as the evaluation function.

Figure 30:
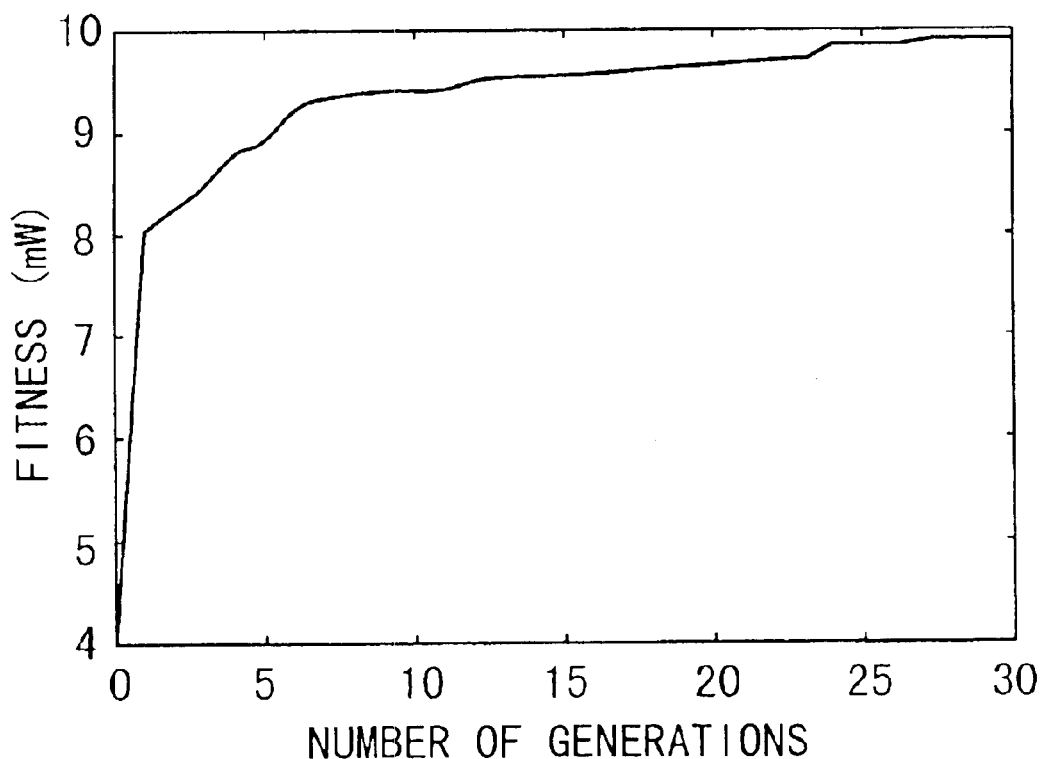
FIG. 30 is a characteristic diagram showing the relationship between the number of generations in the genetic algorithm and the evaluation function value which is the result of adjustment experiments on the optical apparatus in the aforementioned embodiment based on the method of the aforementioned embodiment.

As a result of the aforementioned experiment, where the power at the power meter obtained after the manual rough adjustment was only 4.37 mW, when adjustment of the laser apparatus was performed with a method using the genetic algorithm of this embodiment, the power obtained was 9.96 mW (the actual light output was 9.96/2.0%=498 mW) so the aforementioned specifications were satisfied. FIG. 30 shows the value of the evaluation function F of the best individual among each generation during the experiment. One can see that as the number of generations in the genetic algorithm advances, the power value of the laser output light increases so the evaluation value is improved. For example, where it would have taken a skilled technician using the prior art a long time of one week or more to obtain a power of 9.96 mW, or perhaps this performance would not have been obtained, by means of the method of the present invention, results much better than those in the prior art are obtained automatically in a short time (approximately 3 hours in this experiment). Therefore, this experiment confirms the efficacy of the adjustment method of this embodiment.

As described above, in the laser apparatus 1L of this embodiment, the elements 3M1-4, 3P1 and 3P2 with variable element parameters are used as the plurality of optical elements, and the element parameters of these optical elements 3 were found in order to optimize the performance of the laser apparatus 1L. Therefore, the laser apparatus 1L could be automatically adjusted to satisfy the stipulated specifications with no need for manual adjustment by a skilled technician or high-precision optical elements, and in addition, with no need for a drive mechanism with a high driving precision. This means that higher performance than in the prior art can be obtained with lower costs and less labor than in the prior art.

Furthermore, according to the present invention, even when the values of the element parameters diverge from their optimal values due to movement or transportation of the laser apparatus 1L or due to changes with the passage of time or temperature changes, they can be adjusted automatically with higher performance than in the prior art and with less cost and labor than with the prior art.

Note that in this embodiment, when the cavity 2R of the laser 1L has a prism, the nonlinear correlation among element parameters is stronger than in the case of no prism, so this method is particularly suitable.

Regarding this embodiment, the following variations are possible.

(1) The measurement items for the output light of the laser apparatus 1L measured in the observation apparatus 6 at the time of performing adjustment are not limited to the single item of the intensity of the light pulse, but rather, depending on the required specifications, multiple measurement items may be used, for example: the pulse width of the light pulses, peak value of the intensity of the light pulses, as well as the width of the spectrum of the light pulses, symmetry of the spectrum of the light pulses, stability of the light pulses, amount of noise components in the light pulses, and the like, and thus the adjustment precision can be further improved.

(2) In the aforementioned embodiment, the parameters of the mirrors M1 through M4 and prisms P1 and P2 were made variable, but the parameters of the mirrors 3M1 and 3M2 may also be made variable.

(3) A wave-front controller using a deformable mirror with variable parameters can be provided on the light path of the output light of the laser apparatus 1L, and by also adjusting this wave-front controller according to the method of embodiment 4 to be described later, even better characteristics can be obtained.

In the case of (1) above where multiple measurement items are used, it is possible to use an evaluation function such as that in formula (1) below.

$$F = w_i |X_i - A_i| \quad (1)$$

$$\text{fitness} = 1/(1+F)$$

Where i is the measurement item.

Here, F is the evaluation function value, $w_i$ is the weighting coefficient for the measurement item i, $X_i$ is the value of the result of observation of the measurement item i, and $A_i$ is the ideal value of the measurement item i, while fitness is the fitness in the genetic algorithm. These measurement items may be the average intensity of the output light, the pulse width of the light pulses, peak value of the intensity of the light pulses, the width of the spectrum of the light pulses, symmetry of the spectrum of the light pulses, stability of the light pulses, amount of noise components in the light pulses, and the like. The measurement items should preferably include sufficient items to make an evaluation as to whether or not the functions of the optical apparatus (functions/operation of the optical apparatus demanded of the optical apparatus and set forth by design) satisfy the stipulated specifications (the functions, operation, characteristics required of the optical apparatus enumerated by item, and these items may be indicated by numerical values or by such items as large/small as possible or as high/low as possible).

In the aforementioned embodiments 1 and 2, the genetic algorithm is used as the method of changing the register values from the initial settings of the register group 5RG. However, in the fitness in the genetic algorithm, namely the evaluation function F which expresses just how close the register settings are to the ideal solution, in the event that the number of local optimal solutions is few (generally a single-digit number), the algorithm called the simulated annealing method can be used instead of the genetic algorithm. In addition, even in cases in which the number of local optimal solutions is many, more rapid searches are possible although the performance obtained as a result of adjustment is lower in comparison to the genetic algorithm.

For details of the simulated annealing method, see *Simulated Annealing and Boltzmann Machines* written by E. Aarts and J. Korst and published in 1989 by John Wiley & Sons, for example. Simulated annealing is a type of hill-climbing algorithm improved by using a control parameter called temperature to prevent a search from being misled to local optimal solutions.

In the laser apparatus and adjustment method therefor as embodiment 3 of the present invention to be described below, as shown in FIG. 28, the adjustment apparatus 5 changes the values of the register group 5RG according to this simulated annealing method in a structure similar to the previous embodiment 2. A major characteristic particularly of this embodiment is that the values of the register group 5RG are used directly as the solution candidates in the simulated annealing method. Thereby, as in embodiment 2, there is no need for any processing or the like to convert the solution candidate information into register values. Here also an evaluation function F that expresses how close the solution candidates are to the ideal solution is prepared.

Figure 31:
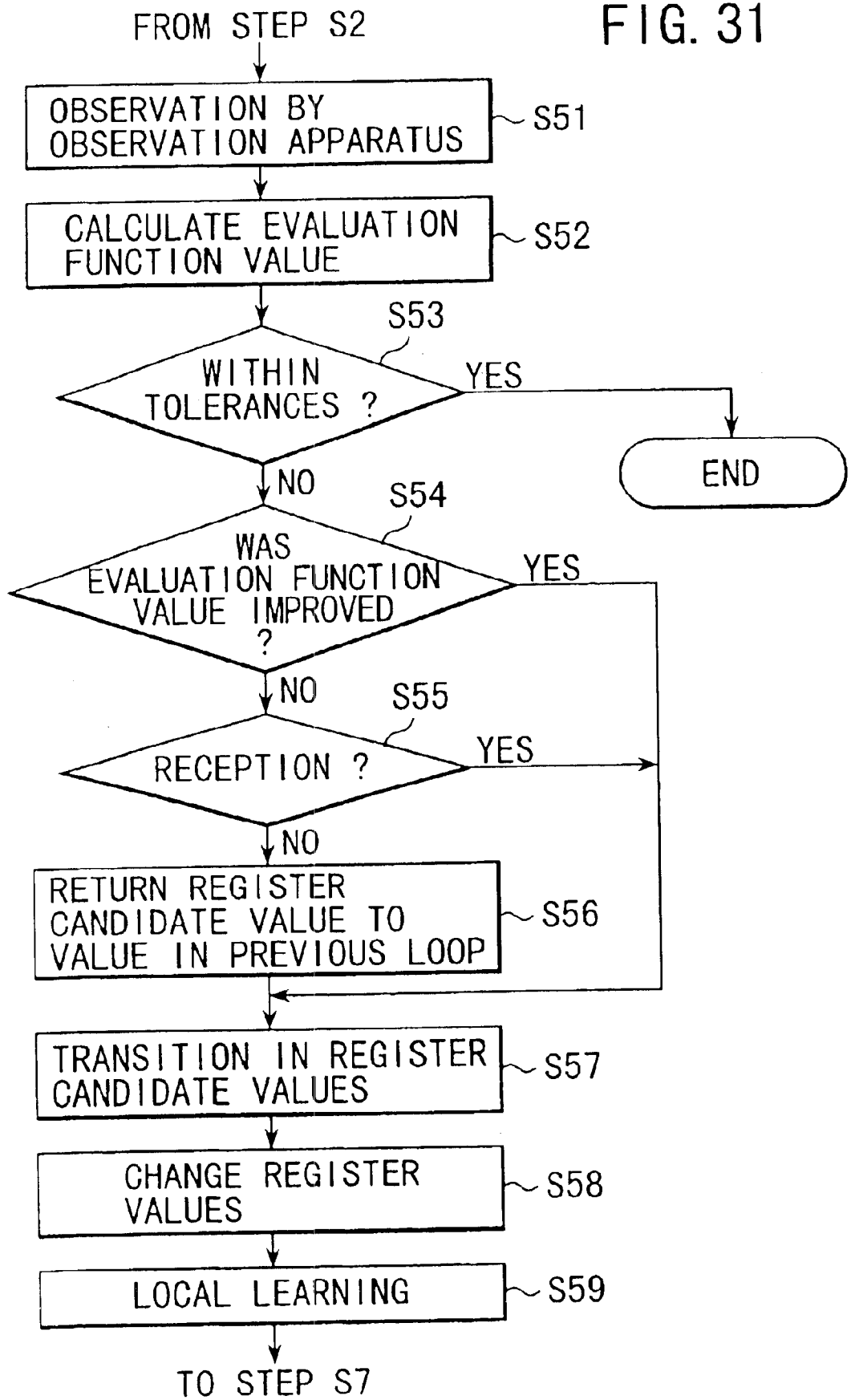
FIG. 31 is a flowchart showing the processing sequence when using the simulated annealing method in embodiment 3 of the optical apparatus and adjustment method therefor of the present invention.

To wit, in the method of this embodiment, the laser apparatus 1L is operated and as shown in FIG. 31, the results of observation by the adjustment apparatus 5 in Step 51 are used by the adjustment apparatus 5 in Step S52 to calculate the evaluation function value for solution candidates using the aforementioned evaluation function F. Thereafter in Step S54, this evaluation function value is compared against the evaluation function value from the previous loop to determine whether or not the value has been improved.

If an improvement was made, the register values at that time are made the next register candidate values and processing proceeds to Step S57, where these register candidate values are subjected to manipulation where a portion of these candidate values is changed. This manipulation is called transition. In this embodiment, the transition used in the simulated annealing method is the same method as in the mutation method in the genetic algorithm explained in FIG. 24.

If the value is not improved in Step S54, in Step S55 a value is calculated for a function called a reception function that has a value domain of greater than or equal to 0 and less than or equal to 1. This function value is compared against the real-number value of a normal random number generated in the range between 0 and 1, and if the random-number value is smaller then reception of the transition results is assumed, and processing advances to Step S57 described above. In this case, the search is temporarily performed in the worsening direction of the evaluation function. If the random-number value is greater than the reception function value, in Step S56 the register candidate value is returned to the register value in the previous loop and then processing advances to Step S57.

The reception function value in loop k is expressed in formula (2) below.

$$\exp\left(\frac{F(k) - F(k-1)}{T(k)}\right) \quad (2)$$

Here, F(k−1) is the value of the evaluation function in the previous loop and F(k) is the value of the evaluation function in the current loop. In addition, T(k) is the parameter called temperature, so the higher the temperature the closer to 1 the value of the reception function becomes. To wit, the higher the temperature the further the search will advance in the worsening direction of the evaluation function. This is performed for the purpose of preventing the search from being misled to local optimal solutions. Thus by setting a high temperature in the initial stages of the search and gradually lowering the temperature as the search advances, one can expect that the true optimal solution will ultimately be reached. This operation is called annealing (simulated annealing).

The simulated annealing method can be used to perform a more efficient search than the genetic algorithm in cases in which the relationship between the performance of the laser apparatus 1L and the optical elements 2 is relatively simple and the evaluation function F of the laser apparatus 1L does not have a large number of local optimal solutions. However, in the event that the evaluation function F has a large number of local optimal solutions it will be trapped in a local optimal solution, so its performance will not be as good as that of the genetic algorithm in realistic periods of time. However, it does have an advantage in that the time required until conversion can be shortened.

Thereafter in Step S58, the register values are changed so that the register candidate values are set as the register values, and in Step S59, the local learning process is performed as used in the genetic algorithm described in FIG. 25. By repeating the above operations until the evaluation function value is high and a satisfactory solution is obtained (the characteristics of the laser apparatus 1L satisfy the stipulated specifications), the laser apparatus 1L can thus be adjusted.

If all possible combinations of values that the settings can take are searched, or if no satisfactory solution is obtained after the process is repeated for a fixed length of time, the laser apparatus 1L subject to adjustment is judged to be defective and defect handling is performed.

Here follows the experimental results in the case when the laser apparatus 1L shown in FIG. 28 (specifically the laser cavity 2R within its optical apparatus 1) was adjusted with the adjustment method using the simulated annealing method of this embodiment. In this experiment, as in the experimental conditions in embodiment 2, the adjustment light was light from a YVO4 laser with a power of 3.0 W and wavelength of 530 nm, and the output light which passed through a planar coupler with a transmittance of 2.0% was observed with a power meter.

Note that the temperature was varied according to equation (3) below.

$$T(k) = 0.1/(k+1) \quad (3)$$

Figure 32:
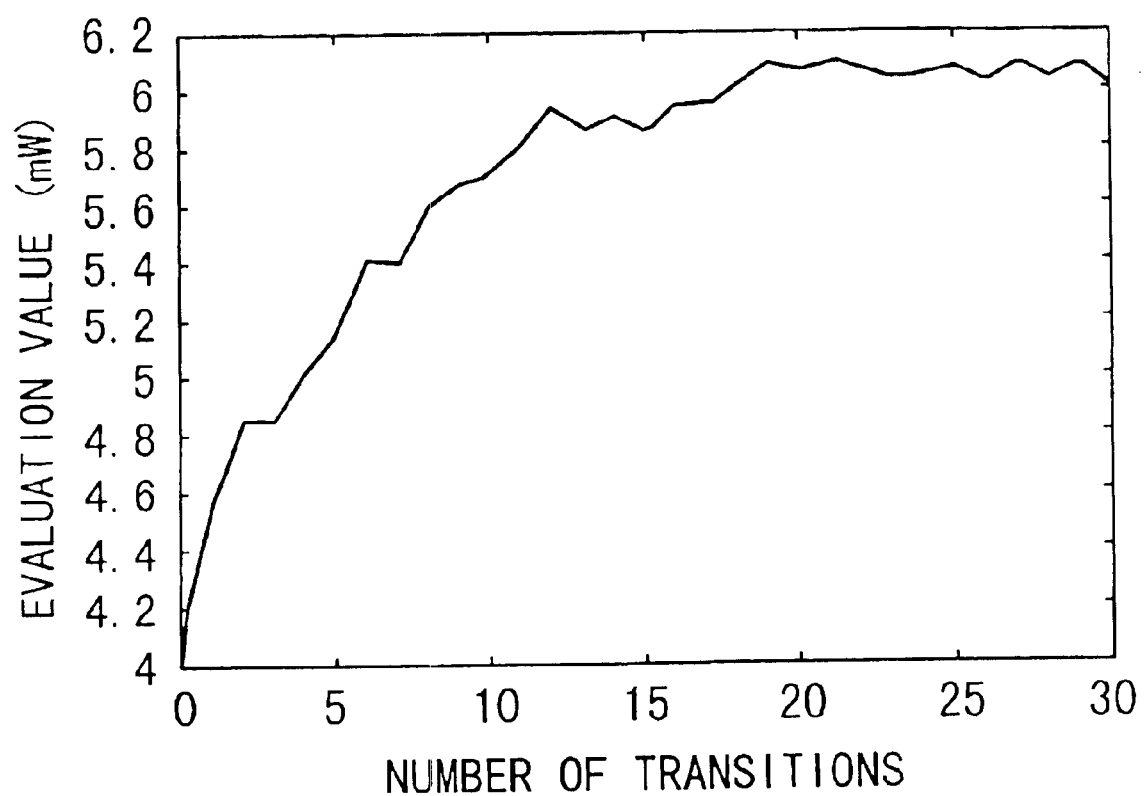
FIG. 32 is a characteristic diagram showing the relationship between the number of transitions in the simulated annealing method and the evaluation function value which is the result of adjustment experiments on the optical apparatus in the aforementioned embodiment based on the method of the aforementioned embodiment.

As a result of the aforementioned experiment, where the power at the power meter obtained after the manual rough adjustment was only 4.14 mW, when adjustment of the laser apparatus was performed with a method using the simulated annealing method of this embodiment, the power obtained was 6.01 mW (the actual light output was 6.01/2.0%=301 mW). FIG. 32 shows the value of the evaluation function F during the experiment as a function of the number of transitions. One can see that as the number of transitions advances, the power value of the laser output light increases so the evaluation value is improved. In comparison to the results of the genetic algorithm 4.14÷9.97×100=60.3% of the performance was obtained. On the other hand, regarding the search time, convergence occurred in a time even before one generation of the genetic algorithm was complete. This experiment confirms the efficacy of the adjustment method of this embodiment.

By means of the aforementioned simulated annealing method, adjustment of the laser apparatus 1L can be performed quickly although the performance obtained is lower than that of the genetic algorithm. While this embodiment was explained using the case of using the laser apparatus shown in embodiment 2 as the optical unit, it need not be said that the optical unit may be a: general one as shown in embodiment 1, and in the same manner, adjustment of the optical unit 1 can be performed quickly although the performance obtained is lower than that of the genetic algorithm.

Here follows a structural example of the main components of a wave-front controller as embodiment 4 of the optical apparatus of this invention. A wave-front controller has the function of controlling the spatial phase of input light, eliminating spatial nonuniformity in phases to obtain output light with a uniform wave front (equiphase surface). Such wave-front controllers are used in exposure apparatus (lithography apparatus) in semiconductor manufacture, wavelength converters, inferometers, spectroscopes, and light amplifiers and as constituent elements of apparatus wherein precise control of the wave front is necessary.

Figure 33:
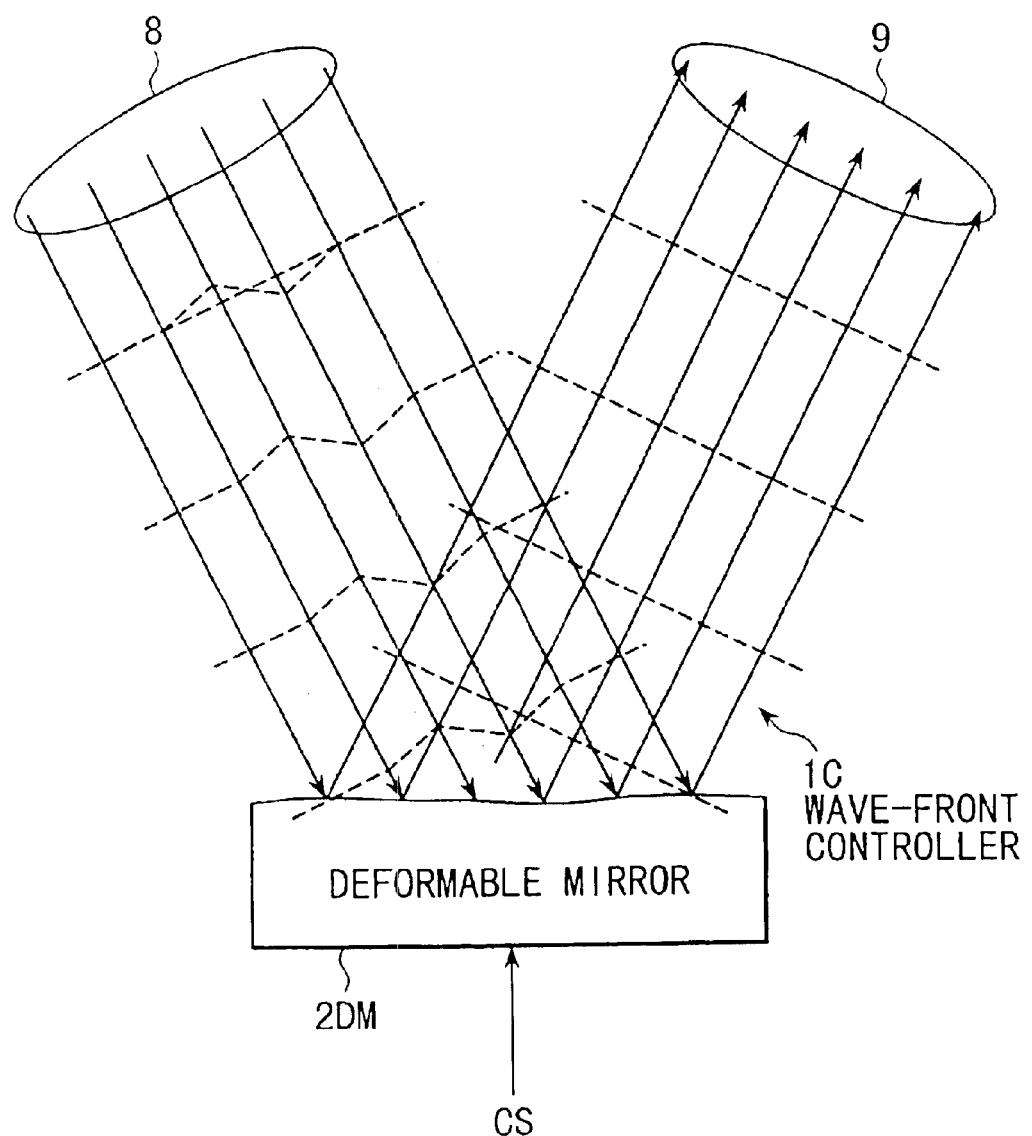
FIG. 33 is a structural diagram showing an example of the structure of a wave-front controller, which is embodiment 4 of the optical apparatus and adjustment method therefor of the present invention.

FIG. 33 shows one example of the main components of the wave-front controller of this embodiment 4, and in FIG. 33, 1C is the wave-front controller, where this wave-front controller 1C is constructed using the wave-front controller 1C instead of the optical unit in embodiment 1. To wit, the structure is that of FIG. 1 with the optical apparatus of FIG. 1 changed to the wave-front controller shown in FIG. 33. In this embodiment, the adjustment apparatus 5 and observation apparatus 6 become external apparatus. Within this wave-front controller 1C, 2DM is a deformable mirror wherein the shape of the mirror surface, expressed by its parameters, can be changed by changing the input of electrical signals, so the parameters can be adjusted by the control signals CS within the FIGS. 8 and 9 represent the input light and output light, respectively, wherein the wave front (equiphase surface) is indicated with dotted lines.

The deformable mirror 2DM has a structure as shown in FIG. 8 of embodiment 1 and the shape of the mirror surface 201 varies depending on the value indicated by the control signal CS. In this embodiment, the number of adjustment locations is 37. Thus in this embodiment, 37 control signals CS and 37 sets of registers 5R for storing these control signals are prepared. The wave-front controller 1C changes the wave front (phase characteristics) of the output light 9 by changing the shape of the mirror surface 201 of the optical elements 2. The specific method of constructing such a wave-front controller are common knowledge, so we shall omit a detailed explanation of such and thus the following is an explanation of the operation of a wave-front controller pertaining to this embodiment.

To wit, here by adjusting the voltage applied to the electrodes 203 in 37 locations on the deformable mirror 2DM, the characteristics of the spatial modes of the wave front of output light 9 can be put into a Gaussian state, and furthermore, the higher-order modes in the spatial modes of the wave front can be reduced. However, when the voltage applied to one of the electrodes 203 is changed, the optimal values for adjustment related to the aforementioned spatial modes of the wave front are also changed. For this reason, in order to adjust the wave-front controller 1C so that the performance satisfies stipulated specifications, the 37 adjustment locations of the deformable mirror 2DM must be adjusted in an overall manner.

Here follows an explanation of the method of adjustment of the present invention in order to adjust the aforementioned wave-front controller 1C as embodiment 4. The adjustment method of this embodiment is fundamentally the same as the adjustment method previously described in embodiment 1.

Once the wave-front controller 1C is installed at the location where its functions are needed, in the inspection process, the adjustment apparatus 5, observation apparatus 6 and adjustment light generator 7 are each connected to its wave-front controller 1C, and the adjustment light generator 7 provides input of adjustment light as the input light 8 of the wave-front controller 1C. The observation apparatus 6 observes the characteristics of the spatial modes of the wave-front of the output light along with the higher-order modes in the spatial modes of the wave front, for example, and provides the results of observation to the adjustment apparatus 5 as values for the evaluation function. The adjustment apparatus 5 uses a weighted evaluation function on the aforementioned plurality of results of observation and performs an evaluation. The adjustment apparatus 5 sets the adjustment values of the deformable mirror 2DM of the wave-front controller 1C according to the same processing sequence shown on FIG. 18.

By means of the method of this embodiment, the characteristics of the optical elements within the wave-front controller 1C (optical apparatus) can be searched for using the optical element 2DM with variable parameters so that the functions of the optical apparatus become optimal. Therefore, the wave-front controller 1C can be automatically adjusted so that it satisfies the stipulated specifications without requiring manual adjustment by a skilled technician or high-precision optical elements, and also without requiring a high-precision drive apparatus. This means that higher performance than with the prior art can be obtained using less labor than that required in the case of the prior art.

The number of adjustment locations of the deformable mirror was 37 in this embodiment, but it need not be said that the number of adjustment locations is irrelevant in the present invention. In addition, this embodiment is particularly suited to the case in which the wave-front controller 1C consists of a deformable mirror that has a large number of adjustment locations. It is most effective if the maximum possible deformation due to adjustment of the deformable mirror is a length roughly the same as the wavelength of the light being handled.

Figure 34:
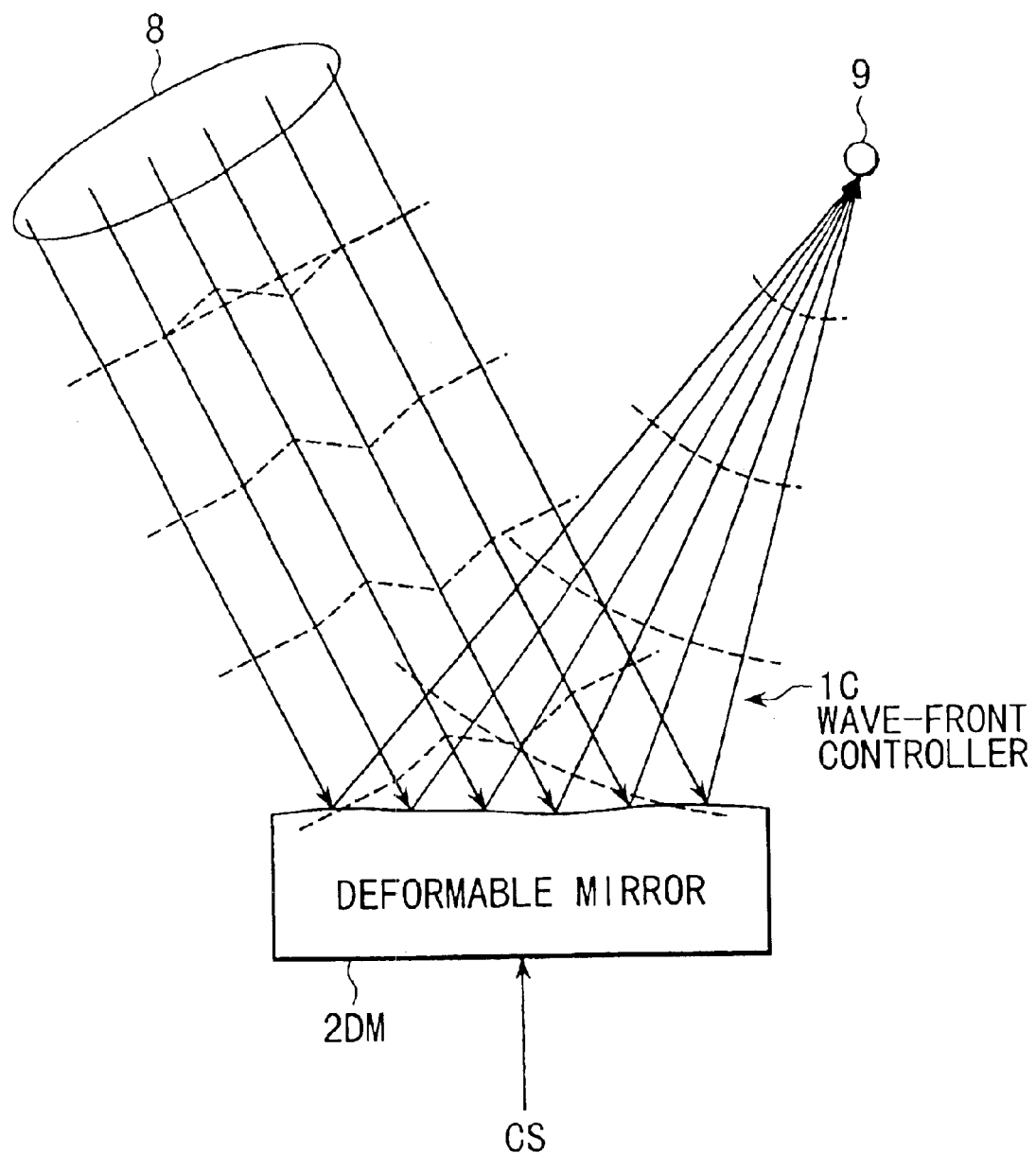
FIG. 34 is a structural diagram showing another example of the structure of a wave-front controller of the aforementioned embodiment.

In this embodiment, it is assumed that the output light 9 is not focused as shown in FIG. 33, but it is also effective in variations such as that shown in FIG. 34 wherein the output light is focused. FIG. 34 shows the case in which the output light of FIG. 33 is focused, and the same reference symbols as on FIG. 33 are applied to the same components.

The wave-front controller 1C can be adjusted in exactly the same manner as in the aforementioned embodiment even in the case in which the output light from the wave-front controller 1C is focused. This variation is particularly effective when the output light 9 is focused on a wavelength conversion crystal or light amplification medium.

In this embodiment, since there is an added meritorious effect in that the shape of the mirror can be controlled freely, adjustment is also effective in obtaining the ideal shape of the mirror. An embodiment in this case is shown in the following embodiment 5.

Figure 35:
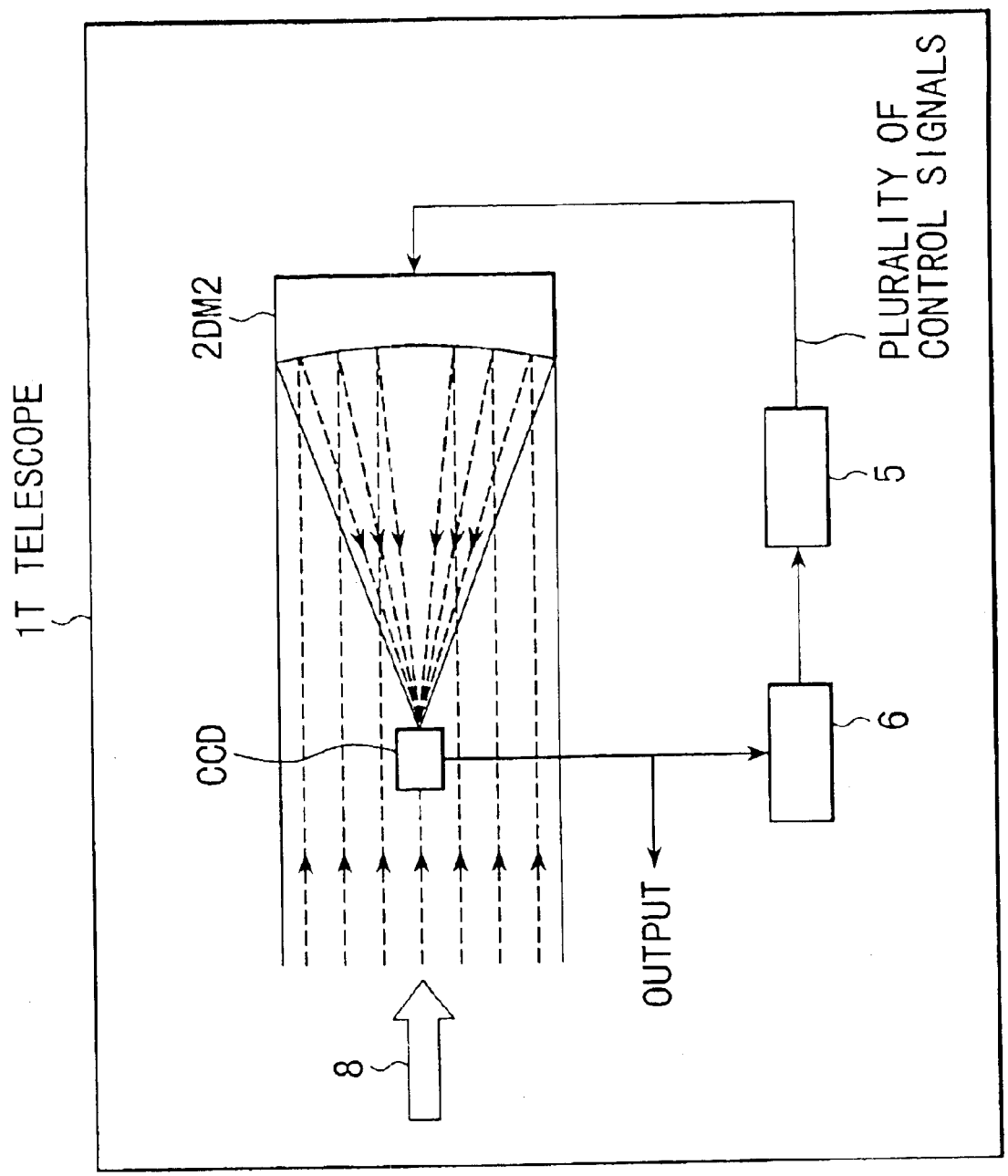
FIG. 35 is a structural diagram showing the structure of embodiment 5 of the optical apparatus and adjustment method therefor of the present invention.

FIG. 35 shows one structural example of a telescope as embodiment 5 of the optical apparatus of the present invention. In FIG. 35, reference symbol 1T denotes a telescope as the optical apparatus (unit), and this telescope 1T is equipped with a concave deformable mirror 2DM2 as the optical element subject to adjustment. Note that in FIG. 35, portions that are the same as those shown in FIG. 1 are given the same symbols. Reference numeral 8 denotes the light incident to the telescope, namely the light from the object being observed by the telescope 1T. Reference symbol CCD denotes an image pickup device disposed on the image plane of the telescope. Here, the intrinsic resolution of the image pickup device CCD is assumed to be sufficiently high. In addition, the electrical signal (image signal) which is the output of the image pickup device is assumed to be the output of the telescope. The observation apparatus 6 and adjustment apparatus 5 used for adjustment are internal apparatus incorporated into the telescope 1T.

The telescope 1T takes in incident light 8 which is light from the object being observed, reflects and focuses this light with the deformable mirror 2DM2 which functions as a concave mirror, and converts this focused light into an electrical image signal with the image pickup device CCD. In this embodiment, adjustment is performed based on an evaluation of the electrical image signal instead of the light output in embodiment 1. In this manner, the output 9 of the optical apparatus of the present invention need not be light only but it also may be an electrical signal or other things other than light.

The characteristic desired of the telescope 1T is for the object being observed to be imaged at as high of resolution as possible. In order to obtain such a characteristic, the focal point of the aforementioned deformable mirror 2DM2 should be focused as close as possible to a single point, and the position of the image plane must be adjusted to coincide with the position of the image pickup device CCD. However, because of errors in manufacturing the telescope, movement of the telescope and temperature changes, the design position of the image pickup device CCD at the ideal image plane does not completely coincide with the actual position of the image pickup device CCD. For this reason, the characteristics of the deformable mirror 2DM2 must be adjusted to match the characteristics of the wave-front controller 1C, and specifically, the amount of deformation at each of the adjustment locations of the deformable mirror 2DM2 must be adjusted.

The deformable mirror 2DM2 may have the same structure as that in the case of FIG. 10 of embodiment 1 or FIG. 34 of embodiment 4. In the same manner as in the case of embodiment 1 and embodiment 4, in this embodiment also the shape of the deformable mirror 2DM2, or namely its parameters are changed depending on the value indicated by the control signal CS.

The control signal CS from the adjustment apparatus 5 varies the voltage of the electrodes 203 of the deformable mirror shown in FIG. 10, thereby changing the shape of the deformable mirror 2DM2. Thereby, the state of the image in the telescope changes and its resolution changes. As a result, the resolution of the telescope can be changed and improved depending on the register values of the register group 5RG.

Here follows an explanation of embodiment 5 of the adjustment method of the present invention for adjusting this telescope 1T. The method of this embodiment is also fundamentally the same as the adjustment method previously described in embodiment 1.

After the telescope 1T is manufactured or moved, or after changes in the temperature or other conditions in which the telescope is used, adjustment light is provided as input to the telescope 1T as incident light 8. Instead of light from an adjustment light generator, this adjustment light may be an actual object being observed as long as the change in the image over time is small. The adjustment light is preferably a high-contrast image and it is preferably light generated from a distance equivalent to the object to be observed by the telescope. Thus, a known fine image, for example a fine checkered pattern placed at a distance or the light from the moon's surface, is used as the adjustment light.

In the event that the shape of the deformable mirror 2DM2 diverges from the ideal shape, the output from the image pickup device CCD will have reduced resolution. Thus the adjustment apparatus 5 may use as the evaluation function the resolution of the image in the image pickup device CCD output from the observation apparatus 6, or specifically the ratio of high-frequency components in the frequency spectrum of the image signal, for example.

In the method of this embodiment, adjustment is executed by using as the evaluation function the resolution obtained in the telescope as above. The adjustment apparatus 5 performs the setting of the parameters of the deformable mirror 2DM2 according to a processing sequence similar to that of the method of embodiment 1.

To wit, in this embodiment, the optical element wherein the shape of the mirror is variable (deformable mirror 2DM2) is used and the shape of this mirror (the parameters of deformable mirror 2DM2) is searched for such that the function (characteristics) of the telescope which is the optical apparatus become optimal. Therefore, by means of this embodiment, errors in the characteristics of the optical elements arising from process ununiformity in the manufacturing process of the telescope 1T, ununiformity in the quality of parts and materials, design errors as well as vibration due to movement and transportation, temperature changes, changes over time and the like can be absorbed, and the telescope 1T can be adjusted so that it has functions that satisfy the stipulated specifications.

As described above, the present invention is also effective in the adjustment of optical elements directly subject to adjustment (deformable mirror 2DM2) so as to compensate for the characteristics (position) of other elements that constitute the optical apparatus (image pickup device CCD) and coact with its circuits.

In this embodiment, it need not be said that the number of adjustment locations in the deformable mirror 2DM2 is irrelevant. In addition, this embodiment is even more suitable when the dimensions of the mirror constituting the telescope are extremely large.

In the present invention, if there is a plurality of conditions under which the optical apparatus is operated, and the results of optimal adjustment of the optical apparatus differ for each of the conditions, it is possible to use the method of preparing a plurality of sets of the register groups 5RG for each optical apparatus, and switching among the register groups 5RG for each condition.

In addition, there are cases wherein the operating characteristics of the optical apparatus change with the temperature of the device, so the results of optimal adjustment of the optical apparatus may also differ with the temperature.

Moreover, there are cases wherein the specifications of the optical apparatus (e.g. the spectral shape of the output pulses of the laser) must have characteristics that differ from those at the beginning.

Figure 36:
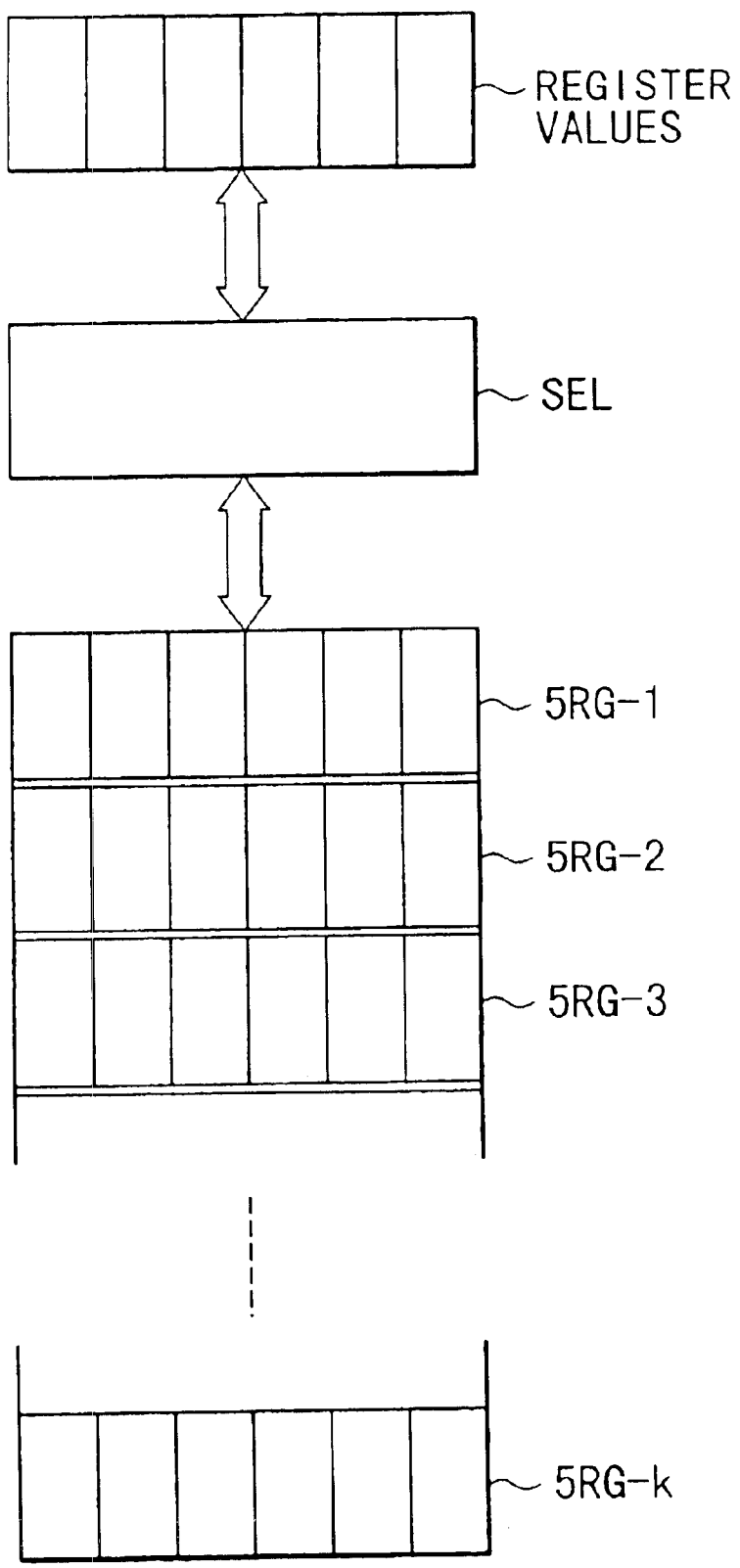
FIG. 36 is an explanatory diagram showing another structure for the registers that can be used in the optical apparatus and adjustment method therefor of the present invention.

FIG. 36 shows a structural example of the case wherein the register groups 5RG are switched for each condition. Here, k is the number of conditions. SEL is a selector that switches the register group 5RG to match the corresponding conditions, and 5-1 through 5-k represent the k register groups 5RG. For convenience, the i in 5-i is called the register number.

The method of adjustment in the case of using such a structure can be as follows, for example. If one wishes to make the characteristics of the device remain constant even if the temperature of the optical apparatus changes, it is possible to establish a correspondence between temperature and register number, and in the inspection process, adjustment may be performed by means of the method of the present invention at temperatures corresponding to each register number and the results of adjustment can be stored in the register groups 5RG-1 through 5RG-k. Then when the optical apparatus is used, the selector SEL can be used to detect the temperature of the circuit and select the corresponding register number.

Note that in the aforementioned adjustment method, it is also possible to omit the adjustment at temperatures corresponding to several register numbers, and in this case, it is sufficient to perform interpolation from the other adjusted register values and store the estimated register values in those registers. As the method of interpolation, linear approximation, spline functions or the like may be used.

It is also possible to switch the characteristics of the optical apparatus in a manner corresponding to a plurality of specification conditions. In this case, it is possible to establish a correspondence between specification condition and register number, and in the inspection process, adjustment may be performed by means of the method of the present invention under specification conditions corresponding to each register number and the results of adjustment can be stored in the register groups 5RG-1 through 5RG-k. Then when the optical apparatus is used, the selector SEL can be used to select the register number corresponding to the specification conditions.

Note that in the aforementioned adjustment method also, it is also possible to omit the adjustment under specification conditions corresponding to several register numbers, and in this case, it is sufficient to perform interpolation from the other adjusted register values and store the estimated register values in those registers.

On the other hand, the drive mechanism 4 in the optical apparatus of this invention can be constructed such that a portion thereof is removable. In this case, after the optical apparatus is adjusted by the method according to this invention, a portion of the drive mechanism 4 can be reused in another drive mechanism 4. To wit, after adjustment, the stage 402 which is the moveable portion of the drive mechanism 4 and the base 401 which is the fixed portion can be fixed with adhesive or screws or the like, and the other portions of the drive mechanism can be removable.

By means of this structural example, a portion of the drive mechanism 4 is removable, so a portion of the drive mechanism 4 can be omitted from the optical apparatus 1 when adjustment is complete, so it is possible to reduce the weight and cost of the optical apparatus 1.

It need not be said that the present invention can be applicable not only to the entire optical apparatus using an optical unit, but also to a portion or any of various portions of the optical apparatus, and the scale of the optical unit is also irrelevant.

The aforementioned is an explanation based on illustrated examples, but this invention is in no way limited to the aforementioned examples, but rather it also includes other modifications easily come upon by a person skilled in the art within the scope of the patent claims.

What is claimed is:

1. A laser apparatus comprising:

a laser unit comprising a plurality of optical elements; and an adjustment apparatus configured to output control signals which, according to a probabilistic search algorithm, make adjustment of parameters of a stipulated number of optical elements among said plurality of optical elements and which search for optimal parameter values at which functions of said laser apparatus satisfy stipulated specifications.

2. The laser apparatus according to claim 1, wherein the probabilistic search algorithm is a genetic algorithm.

3. The laser apparatus according to claim 1, wherein the probabilistic search algorithm is a simulated annealing method.

4. The laser apparatus according to claim 1, wherein said adjustment apparatus uses an evaluation function that performs weighed sum of a plurality of evaluation results of a state of the functions of the laser apparatus.

5. The laser apparatus according to claim 1, wherein the laser unit is an ultrashort pulse laser unit.

6. The laser apparatus according to claim 1, wherein said parameters of the stipulated number of optical elements are positions or orientations of the optical elements.

7. The laser apparatus according to claim 6, wherein at least one of said optical elements is a mirror.

8. The laser apparatus according to claim 6, wherein at least one of said optical elements is a prism.

9. A method of adjusting a laser apparatus that controls a plurality of optical elements constituting a laser unit, comprising the steps of:

sequentially providing control signals that, according to a probabilistic search algorithm, make adjustment of parameters of a stipulated number of optical elements among said plurality of optical elements; and searching for optimal parameter values at which functions of said laser apparatus satisfy stipulated specifications.

10. The method according to claim 9, wherein the probabilistic search algorithm is a genetic algorithm.

11. The method according to claim 9, wherein the probabilistic search algorithm is a simulated annealing method.

12. The method according to claim 9, wherein a function that performs weighed sum of a plurality of evaluation results of a state of the functions of the laser apparatus is used as an evaluation function.

13. The method according to claim 9, wherein the laser unit is an ultrashort pulse laser unit.

14. The method according to claim 9, wherein said parameters of the stipulated number of optical elements are the positions or orientations of the optical elements.

15. The method according to claim 14, wherein at least one of said optical elements is a mirror.

16. The method according to claim 14, wherein at least one of said optical elements is a prism.

17. An adjustment apparatus comprising an electronic computer and recording media which said electronic computer can read, wherein said adjustment apparatus performs adjustment by the method of claim 9.

18. Recording media that store an adjustment program that performs the adjustment according to claim 9.

* * * * *